(12) United States Patent
Lin et al.

(10) Patent No.: US 6,879,703 B2
(45) Date of Patent: Apr. 12, 2005

(54) METHOD AND APPARATUS FOR WATERMARKING IMAGES

(75) Inventors: Ching-Yung Lin, Yonkers, NY (US); Shih-Fu Chang, New York, NY (US)

(73) Assignee: Trustees of Columbia University of the City of New York, New York, NY (US)

( * ) Notice: Subject to any disclaimer, the term of this patent is extended or adjusted under 35 U.S.C. 154(b) by 176 days.

(21) Appl. No.: 10/220,776

(22) PCT Filed: Jan. 10, 2002

(86) PCT No.: PCT/US02/04667
§ 371 (c)(1),
(2), (4) Date: Feb. 11, 2003

(87) PCT Pub. No.: WO02/061669
PCT Pub. Date: Aug. 8, 2002

(65) Prior Publication Data
US 2003/0147547 A1 Aug. 7, 2003

Related U.S. Application Data

(60) Provisional application No. 60/260,721, filed on Jan. 10, 2001.

(51) Int. Cl.[7] .............................................. G06K 9/100
(52) U.S. Cl. ................... 382/100; 380/28; 380/201; 380/217; 380/229; 380/253; 382/166; 382/240; 382/245; 382/250; 382/252; 713/175; 713/176
(58) Field of Search ....................... 380/28, 54, 201, 380/202, 203, 210, 216, 217, 229, 252, 253; 382/100, 166, 168, 240, 245, 248, 250, 251, 275; 713/168, 175, 176, 179

(56) References Cited

U.S. PATENT DOCUMENTS

| | | | |
|---|---|---|---|
| 5,943,422 A | 8/1999 | Van Wie et al. ............. 380/9 |
| 6,047,374 A | 4/2000 | Barton ...................... 713/150 |
| 6,078,664 A | 6/2000 | Moskowitz et al. ........... 380/28 |
| 6,108,434 A | 8/2000 | Cox et al. .................... 382/100 |
| 6,122,403 A | 9/2000 | Rhoads ....................... 382/233 |
| 6,282,300 B1 * | 8/2001 | Bloom et al. ............... 382/100 |
| 6,418,232 B1 * | 7/2002 | Nakano et al. ............. 382/100 |
| 6,487,301 B1 * | 11/2002 | Zhao .......................... 382/100 |
| 6,532,541 B1 * | 3/2003 | Chang et al. ............... 713/176 |
| 6,606,393 B1 * | 8/2003 | Xie et al. .................... 382/100 |
| 6,678,389 B1 * | 1/2004 | Sun et al. ................... 382/100 |
| 6,683,966 B1 * | 1/2004 | Tian et al. .................. 382/100 |
| 6,718,047 B2 * | 4/2004 | Rhoads ....................... 382/100 |
| 6,725,372 B1 * | 4/2004 | Lewis et al. ................ 713/176 |
| 6,757,407 B2 * | 6/2004 | Bruckstein et al. ......... 382/100 |

\* cited by examiner

Primary Examiner—Bhavesh M. Mehta
Assistant Examiner—Gregory Desiré
(74) Attorney, Agent, or Firm—Baker Botts L.L.P.

(57) ABSTRACT

Digital watermarks are embedded in image data (102) in order to enable authentication of the image data and/or replacement of rejected portions of the image data. Authentication codes are derived by comparing selected discrete cosine transform (DCT) (104) coefficients within DCT data (106) derived from the original, spatial-domain image data. The authentication codes thus generated are embedded in DCT coefficients (612) other than the ones which were used to derive the authentication codes. The resulting, watermarked data can be sent or made available to one or more recipients who can compress or otherwise use the watermarked data. Image data derived from the watermarked data—e.g, compressed versions of the watermarked data—can be authenticated by: extracting the embedded authentication codes, comparing DCT coefficients derived from the coefficients from which the original authentication codes were generated; and determining whether the compared DCT coefficients are consistent with the extracted authentication codes.

78 Claims, 16 Drawing Sheets

METHOD AND APPARATUS FOR WATERMARKING IMAGES

CROSS-REFERENCE TO RELATED APPLICATION

This application claims priority to U.S. Provisional Application No. 60/260,721, filed on Jan. 10, 2001, entitled "Watermarking Algorithms and System for Generating Self-Authentication-and-Recovery Images," which is incorporated herein by reference in its entirety.

BACKGROUND OF THE INVENTION

Digital images are vulnerable to tampering such as cropping and replacement of image portions. Such "crop-and-replace" operations can be used to improperly add objects which were not present in the original image, or to improperly remove objects which were present in the original image. Various authentication methods have been used to detect such alterations. For example, a digital signature can be embedded in the image data as a "watermark." Conventional digital signature watermarking techniques tend to detect any and all alterations of the original data.

However, in many cases, certain types of alterations are considered acceptable. For example, unlike crop-and-replace operations, lossy compression processing such as JPEG compression is likely to be performed for legitimate reasons such as efficiency of storage and/or transmission of the data, rather than malicious purposes such as misleading the viewer as to the presence and/or absence of objects and/or people in the scene captured by the image. Similarly, simply changing the encoding format of the image data—e.g., converting a JPEG-encoded image to a JPEG 2000-encoded image or to a GIF-encoded image—is likely to be done for innocent reasons. Likewise, filtering of an image is considered a legitimate alteration for many purposes. For cases in which lossy compression, transformation of data encoding format, and/or image filtering are considered acceptable types of image processing, conventional digital signature watermarking techniques are unsuitable, because such technologies tend to reject any data which has been altered in any manner.

Other methods have been used in order to attempt to enable acceptance of legitimate alterations. For example, in one technique, a digital signature is generated based upon selected image points which are deemed to have a particular relevance. In other techniques, digital signatures have been generated based upon moments and/or edges within an image.

However, in many cases, moment-based digital signature techniques fail to detect important malicious manipulations such as cropping and replacement. Edge-based methods suffer from excessive signature length, inconsistencies in edge detection results, and excessive sensitivity to color alteration.

SUMMARY OF THE INVENTION

It is therefore an object of the present invention to provide an image-processing system which detects improper image alterations such as cropping and replacement of image positions.

It is an additional object of the present invention to provide an image-processing system which accepts data which has been altered in an acceptable manner, such as data which has been processed by lossy compression, transformation of encoding format, or filtering.

These and other objects are accomplished by the following aspects of the present invention.

In accordance with one aspect of the present invention, an image is processed by comparing a first transformed-domain image datum to a second transformed-domain image datum, in order to derive a first authentication code. A replacement code comprising, or derived from, the first authentication code, is used to replace at least a portion of a third transformed-domain image datum, in order to convert the third transformed-domain image datum into a fourth transformed-domain image datum. The first, second, third, and fourth transformed-domain image data are typically DCT coefficients. The first transformed-domain image datum has a first transformed-domain location; the second transformed-domain image datum has a second transformed-domain location; and the fourth transformed-domain image datum has a third transformed-domain location. The first transformed-domain image datum is for deriving a fifth transformed-domain image datum having a fourth transformed-domain location. The second transformed-domain image datum is for deriving a sixth transformed-domain image datum having a fifth transformed-domain location. The fourth transformed-domain image datum is for deriving a seventh transformed-domain image datum having a sixth transformed-domain location. The first and fourth transformed-domain locations are approximately equal, the second and fifth transformed-domain locations are approximately equal, and the third and sixth transformed-domain locations are approximately equal. The fifth, sixth and seventh transformed-domain image data are for being authenticated by an authentication procedure in which: (1) an authentication code extraction function is used to extract a second authentication code from the seventh transformed-domain image datum; (2) the fifth and sixth transformed-domain image data are compared in order to derive a first comparison result; and (3) based upon the second authentication code, a set of one or more acceptable values of the first comparison result are selected. If the first comparison result is not within the set of acceptable values, the authentication procedure determines that at least one of the fifth, sixth and seventh transformed-domain data has been improperly altered.

In accordance with an additional aspect of the present invention, an image is processed by using an encoding function to encode a first set of transformed-domain image data, in order to derive a set of image data recovery codes. The first set of transformed-domain image data is included in a second set of transformed-domain data which is typically a set of DCT coefficients derived from a set of spatial domain image data. The set of image data recovery codes includes a first image data recovery code. A replacement code is used to replace at least a portion of a first transformed-domain image datum, in order to convert the first transformed-domain image datum into a second transformed-domain image datum. The first transformed-domain image datum is included in a third set of transformed-domain image data derived from the first set of transformed-domain image data. The replacement code comprises, or is derived from, the first image data recovery code. The second transformed-domain image datum is for deriving a third transformed-domain image datum. The first set of spatial domain image data is for deriving a fourth set of transformed-domain image data. The third transformed-domain image datum is for deriving, by a recovery procedure, an approximation data set approximating the first set of transformed-domain image data. The approximation data set can be used to replace the fourth set of transformed-domain image data. In the recovery procedure, a recovery code extraction function is used to extract a second image data recovery code from the third transformed-domain image datum. The second image data recovery code is approximately equal to the first image data recovery code. A decoding function is used to decode the second image data recovery code, in order to derive the approximation data set. The decoding function is a functional inverse of the encoding function.

In accordance with another aspect of the present invention, an image is processed by quantizing a first set of transformed-domain image data based on a first quantization step size, in order to derive a second set of transformed-domain image data. The second set of transformed domain image data includes at least a first transformed-domain image datum. A replacement code is used to replace at least a portion of the first transformed-domain image datum, in order to convert the first transformed-domain image datum into a second transformed-image datum. The second transformed-domain image datum is included in a third set of transformed-domain image data. The replacement code comprises, or is derived from, a watermark code. The third set of transformed-domain data is for being processed by an alteration procedure for deriving a fourth set of transformed-domain image data. The alteration procedure comprises at least one of: (1) a second quantization procedure based on a second quantization step size, the second quantization step size being no greater than the first quantization step size, (2) a data encoding format transformation, and (3) an image filtering procedure. The fourth set of transformed-domain image data includes at least a third transformed-domain image datum which is derived from the second transformed-domain image datum. The third transformed-domain image datum is for being processed by a watermark extraction procedure which extracts the watermark code from the third transformed-domain image datum. The watermark extraction procedure comprises the steps of: (1) requantization the third transformed-domain image datum based on the first quantization step size, for generating a fourth transformed-domain image datum; and (2) processing the fourth transformed-domain image datum by a watermark extraction function, for deriving an extracted code approximately equal to the watermark code.

BRIEF DESCRIPTION OF THE DRAWINGS

Further objects, features, and advantages of the present invention will become apparent from the following detailed description taken in conjunction with the accompanying figures showing illustrative embodiments of the invention, in which.

DETAILED DESCRIPTION OF THE INVENTION

Figure 1:
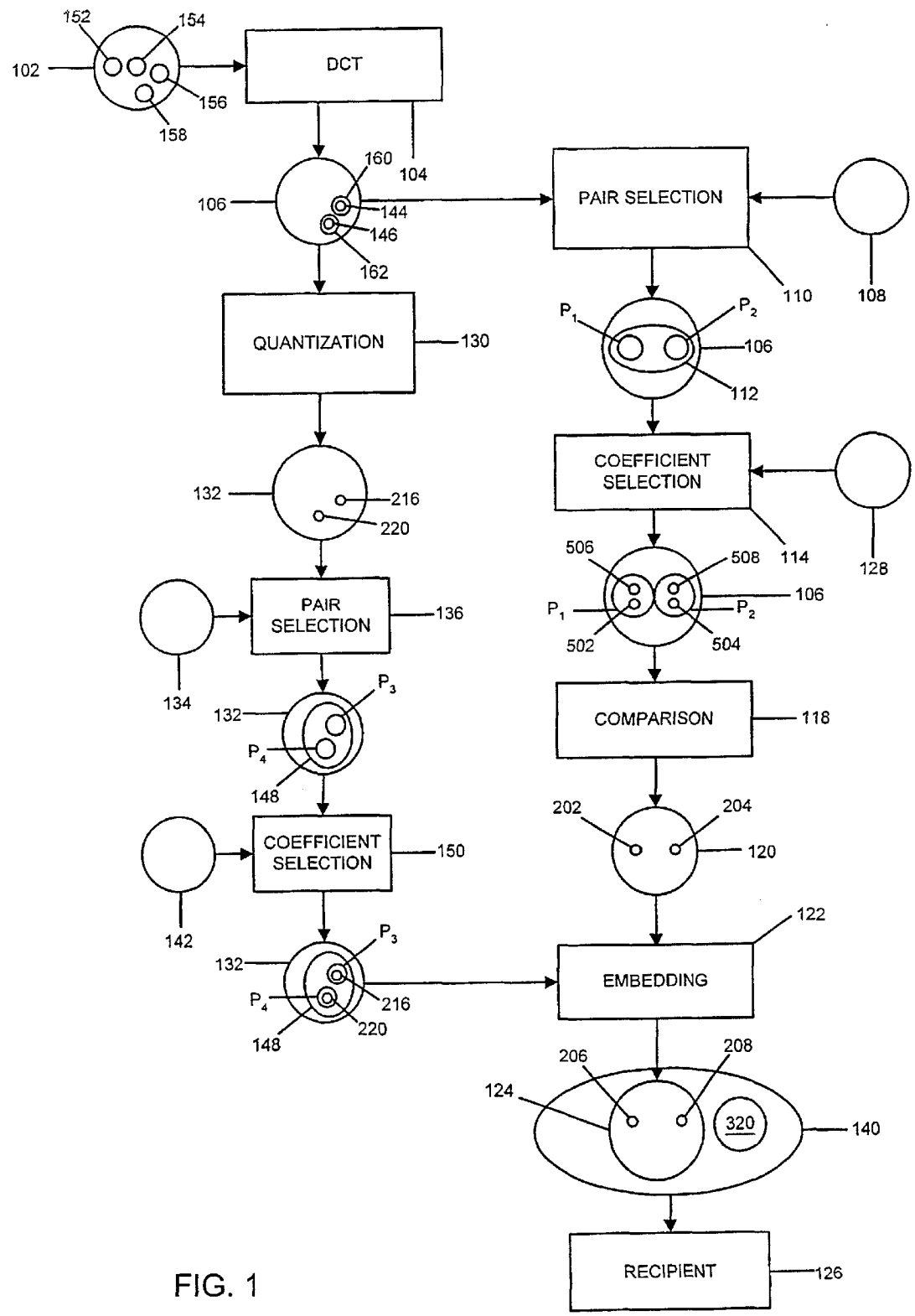
FIG. 1 is a block diagram illustrating an exemplary image-processing procedure in accordance with the present invention.
Figure 4:
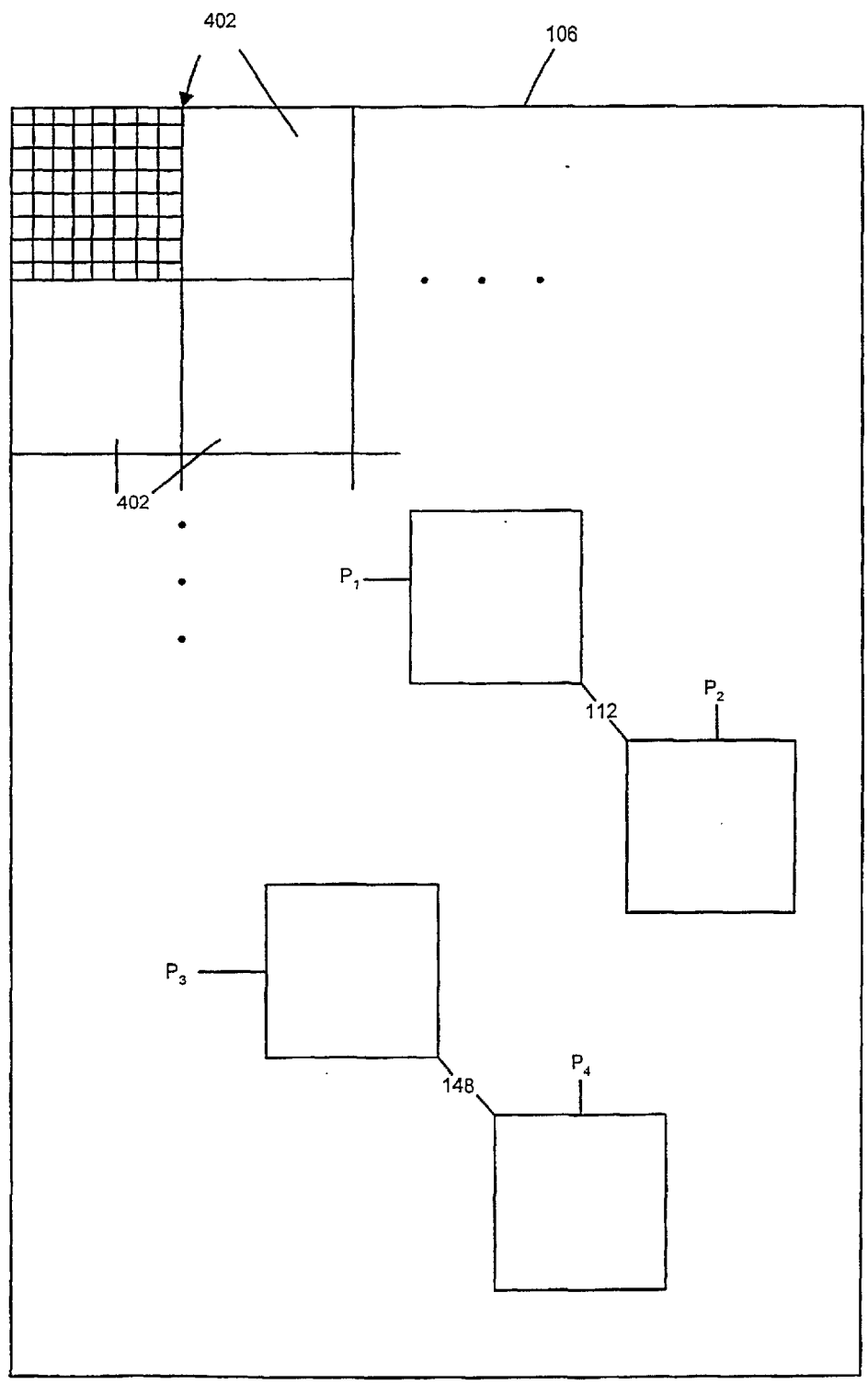
FIG. 4 is a block diagram illustrating still another exemplary image-processing procedure in accordance with the present invention.

In accordance with the present invention, authentication data are generated and embedded as watermark codes in an image in order to enable later authentication of the watermarked image and/or images derived from the watermarked image. The authentication data are derived from the image in which they are to be embedded. FIG. 1 illustrates an exemplary procedure for generating such authentication data and embedding the authentication data in an image. The original, spatial domain image data 102 is processed using a domain transformation procedure for converting the spatial domain image data 102 into transformed-domain image data 106. In the illustrated example, a discrete cosine transform (DCT) 104 is used to process the spatial domain data 102, in order to derive DCT data 106. The spatial domain data 102 are typically divided into 8×8 blocks. Each 8×8 block of spatial domain data is separately processed by the DCT procedure, to generate an 8×8 block 402 of DCT coefficients, as illustrated in FIG. 4. For example, spatial domain blocks (e.g., 8×8 squares of pixels) 152, 154, 156, and 158 are transformed by the DCT procedure 104 in order to derive transformed-domain data sets $P_1$, $P_2$, 160, and 162, respectively. In this example, each of these sets is an 8×8 block of DCT coefficients.

Figure 6:
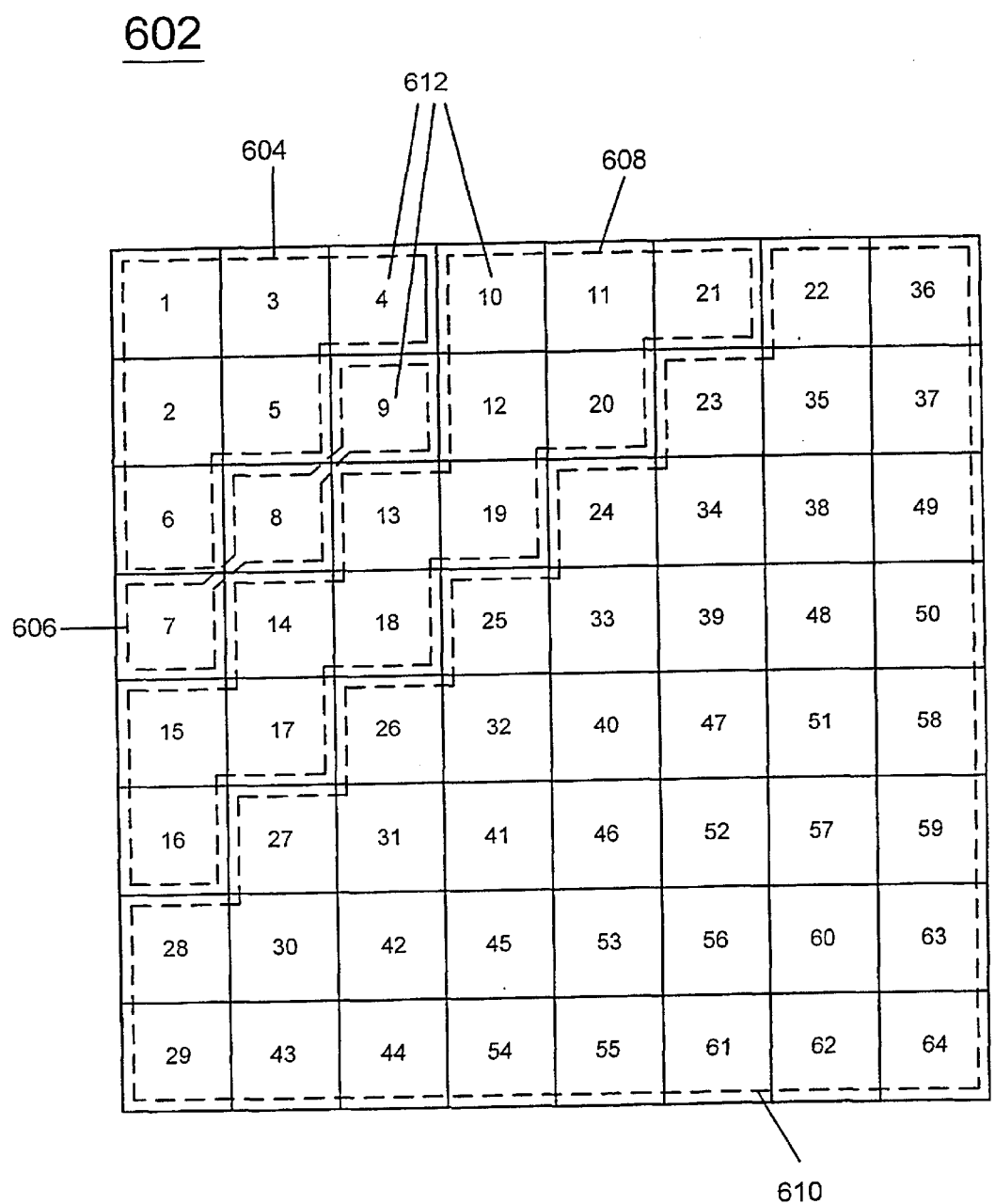
FIG. 6 is a diagram illustrating an exemplary manner of dividing a set of DCT coefficients into regions in accordance with the present invention.

FIG. 6 illustrates a typical 8×8 block 602 of DCT coefficients 612. This set 602 is divided into four regions (i.e., portions) 604, 606, 608, and 610. The first portion 604 contains the coefficients used to derive authentication codes—also referred to herein as "feature codes"—in accordance with the procedure illustrated in FIG. 1. The second portion 606 contains the coefficients into which authentication/feature codes—typically feature codes generated from other blocks—are to be embedded. The third portion 608 contains the coefficients into which image recovery data is to be embedded, as is discussed in further detail below with respect to the recovery data embedding and recovery procedures. The fourth region 610 contains those coefficients which are simply used as image data, and are not used for deriving or embedding authentication and/or recovery codes. As indicated by the arrangement of the numbers 1–64 in the illustrated block 602, the order/sequence in which the coefficients are arranged and indexed follows the standard, well-known "zig-zag" pattern which is widely used in image processing. With reference to the aforementioned zig-zag order, coefficients 1–6 are used to derive feature codes; feature codes from other blocks are embedded in coefficients 7–9; recovery codes derived from other blocks are embedded in coefficients 10–21; and coefficients 22–64 are not used to derive or embed feature codes or recovery data.

Referring again to FIG. 1, a pair selection procedure 110 is used for selecting pairs of DCT coefficient blocks, based on a secret DCT-domain block pair mapping 108. For example, as illustrated in FIGS. 1 and 4, blocks $P_1$ and $P_2$ are associated together to form a combined set: block pair 112. The DCT-domain block pair mapping 108 can be generated using a variety of different methods. For example, the mapping 108 can be generated by assigning a number to each block and then, for each block, picking an associated block based upon a random number or a sequence of random numbers. Such a random number or sequence can be generated by: (1) a random number generator, (2) a quasi-random number generator, (3) a password-based number sequence generator, or (4) any other well-known method for generating random numbers or sequences of numbers. The block pair mapping 108 can also be based upon a code typed in by a user. In fact, as will be readily understood by those skilled in the art, a secret pattern such as the DCT-domain block pair mapping 108 illustrated in FIGS. 1 and 4 can be generated using a wide variety of well-known methods for generating patterns, numbers, and/or sequences of numbers. Preferably, the mapping is stored in a look-up table (LUT).

Figure 5A:
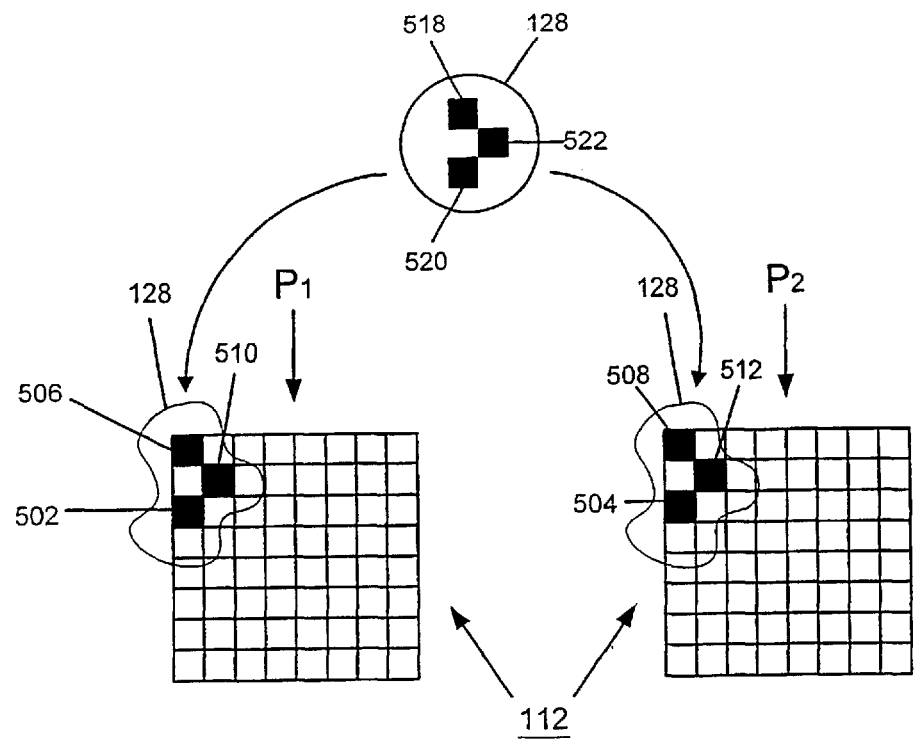
FIG. 5A is a diagram illustrating an exemplary secret coefficient selection pattern for selecting DCT coefficients in procedure 114 illustrated in FIG. 1.

Once pairs of DCT coefficient blocks are selected, the DCT data 106 is further processed by a coefficient selection procedure 114 in order to select the specific coefficients which will be used to derive authentication data. A secret transformed-domain location selection pattern 128 specifies the transformed-domain locations—in this example, DCT-domain locations—of one or more selected transformed-domain image data—in this example, DCT coefficients—in each block. The transformed-domain location selection pattern 128 can, for example, be a randomly ordered or quasi-randomly ordered list—e.g., {1, 6, 5}—of selected index numbers of the zig-zag order illustrated in FIG. 6. An example of such a selection pattern 128 is illustrated in FIG. 5A. The illustrated, exemplary, secret selection pattern comprises three datum selection locations 518, 520, and 522 which specify the locations of coefficients 506, 502, and 510, respectively. The aforementioned locations are specified with respect to the DCT-domain coordinate system of DCT coefficient block $P_1$. The same datum selection locations 518, 520, and 522, in the DCT-domain coordinate system of DCT coefficient block $P_2$, are used to select coefficients 508, 504, and 512, respectively. Each selected coefficient in a selected block is compared to the corresponding selected coefficient in the corresponding selected block (procedure 118 in FIG. 1). For example, as illustrated in FIG. 5A, coefficient 506 is compared to coefficient 508, coefficient 502 is compared to coefficient 504, and coefficient 510 is compared to coefficient 512. The results of the respective comparisons are used as authentication codes. For example, as illustrated in FIG. 1, the comparison of DCT coefficients 506 and 508 generates authentication code 202 and the comparison of DCT coefficients 502 and 504 generates authentication code 204. The transformed-domain locations of coefficients 502, 504, 506, and 508 are preferably secret so that the locations can only be determined if the secret block pair mapping 108 and secret selection pattern 128 are known.

Similarly to the block pair mapping 108 discussed above, the secret coefficient selection pattern 128 can be generated using a variety of different methods. For example, the pattern 128 can be based upon a random number generated by: (1) a random number generator, (2) a quasi-random number generator, (3) a password-based number sequence generator, or (4) any other well-known method for generating random numbers or sequences of numbers. The secret selection pattern 128 can also be based upon a code typed in by a user. In fact, as will be readily understood by those skilled in the art, a secret pattern such as the secret coefficient selection pattern 128 can be generated using a wide variety of well-known methods for generating patterns, numbers, and/or sequences of numbers. Preferably, the pattern 128 is stored in an LUT. Typically, the pattern 128 includes a relatively small subset of the coefficients in a given block—i.e., not all of the coefficients in the block are used for authentication code generation.

Optionally, the comparison procedure 118 can simply compare the respective sizes of two coefficients and generate a single-bit feature code having a value of one or zero, depending upon which coefficient is larger. For example, the comparison procedure 118 can yield an authentication bit having a value of 1 if coefficient 506 is greater than or equal to coefficient 508, and 0 if coefficient 506 is less than coefficient 508. Alternatively, the comparison procedure 118 can yield a bit having a value of 1 if coefficient 508 is greater than or equal to coefficient 506, and 0 if coefficient 508 is less than coefficient 506. Furthermore, although the exemplary comparison procedure discussed above derives single-bit authentication codes, other types of comparison procedures can be used. For example, the comparison procedure 118 can be configured to yield one of three different values,—e.g., 1, 0, or −1—depending upon whether coefficient 506 is, respectively, greater than, less than, or equal to coefficient 508. Such a comparison procedure is typically considered to generate 1.5 bits of information per comparison. An additional example of a 1.5 bit-per-comparison procedure is one which uses a threshold. In such a procedure, the difference of coefficients 506 and 508 is computed, and the comparison procedure 118 generates one of three possible values—e.g., 1, 0, or −1—depending upon whether the difference is, respectively, greater than the threshold, less than the threshold, or equal to the threshold. In fact, the size of the authentication codes need not be limited to limited to 1, 1.5, or even 2 bits. For example, an authentication code can be a multi-bit number representing the difference between the bits 506 and 508 being compared.

Figures 9A, 9B:
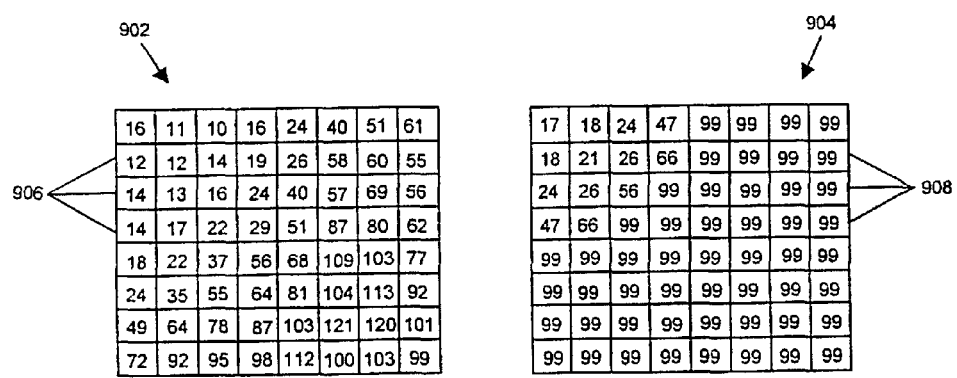
FIG. 9A is a diagram illustrating an exemplary arrangement of quantization step sizes or quantizing DCT coefficients.
FIG. 9B is a diagram illustrating an additional exemplary arrangement of quantization step sizes for quantizing DCT coefficients.

Once the feature codes 120 are derived, an embedding procedure 122 is used to embed the codes 120 into DCT-domain data 132 derived from the original spatial-domain data 102. The derivation of the DCT data 138 into which the feature codes 120 are to be embedded can be further understood with reference to FIG. 1. The DCT coefficients 106 derived from the original spatial-domain data 102 are quantized using a selected set of quantization steps. For example, as illustrated in FIG. 1, unquantized coefficients 144 and 146 in blocks 160 and 162, respectively, are quantized to generate quantized coefficients 216 and 220, respectively. Preferably, the quantization steps used in the quantization procedure 130 are based upon the well-known JPEG compression quantization tables. For example, FIGS. 9A and 9B illustrate the standard JPEG quantization tables 902 and 904 corresponding to a JPEG quality factor (QF) of 50. As will be readily understood by those skilled in the art, the quantization tables 902 and 904 illustrated in FIGS. 9A and 9B contain the quantization step sizes 906 and 908 used to quantize an 8×8 block of DCT coefficients. The quantization table 902 illustrated in FIG. 9A is used to quantize an 8×8 block of DCT coefficients representing the luminances of the pixels in the 8×8, spatial-domain block of pixels from which the DCT coefficients were derived. The quantization table 904 illustrated in FIG. 9B is used to quantize an 8×8 block of DCT coefficients representing the chrominance of the pixels in the 8×8, spatial-domain pixel block from which the DCT coefficients were derived.

The QF of a set of DCT-domain coefficients representing a JPEG-encoded image is a commonly-used indicator of the quality of the encoded image. QF=100 indicates the highest quality, and lower quality factors indicate reduced quality, typically due to compression of the data. JPEG data is typically compressed by increasing the quantization step sizes and re-quantizing the coefficients. For most common applications, the preferred QF typically ranges from 50 to 80, depending on the user's desire for high resolution, traded off against the user's desire to reduce the size of the image data file.

In general, the spatial-domain pixel data from which a set of DCT coefficients is derived can represent the luminance or chrominance of the respective pixels, and/or can represent the brightness of particular color channel—e.g., red, green, or blue—in a pixel. It is to be noted that the terms "image data" and "pixel data" as used herein are not meant to refer only to the absolute brightness or luminance of a pixel or a color channel within a pixel, nor are the aforementioned terms meant to refer only to the absolute chrominance or color value of a pixel. Rather, the terms "image data" and "pixel data" are meant to include both absolute and relative values of brightness, chrominance, and/or other image variables. For example, image data can include a set of difference or error pixels representing the differences and/or errors between respective pixels of two images. The two images used to generate the difference or error pixels can be, for example, an actual image and an estimated image.

It is also to be noted that image data can, but need not, be in the spatial domain—e.g., each datum representing the brightness, color, and/or color channel value of a pixel as seen by the typical viewer of the image. Image data can also include transformed-domain data such as DCT coefficients, discrete Fourier transform coefficients, discrete wavelet transform coefficients, and/or any type of data having been processed by a domain transformation such as a DCT, a discrete Fourier transform, a discrete wavelet transform, etc.

Referring again to FIG. 1, the quantized DCT coefficients 132 are processed using a pair selection procedure 136 to select pairs of coefficient blocks—e.g., pair 148 of blocks $P_3$ and $P_4$—into which the feature codes 120 will be embedded. The pair selection procedure 136 is preferably similar or identical to the pair selection procedure 110 used to select the respective pairs of DCT coefficient blocks used to derive the feature codes 120. Similarly to pair selection procedure 110, pair selection procedure 136 preferably uses a secret DCT-domain block pair mapping 134 which forms an association between blocks $P_3$ and $P_4$, and also forms an association between block pair 112 and block pair 148. The secret DCT-domain block pair mapping 134 can be created using the same types of mapping generation techniques discussed above with respect to mapping 108.

Figure 5B:
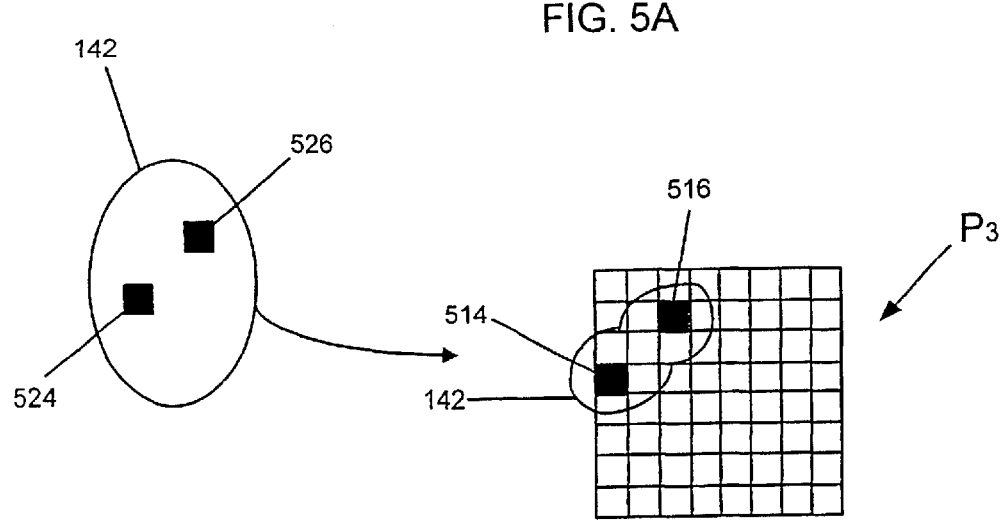
FIG. 5B is a diagram illustrating an exemplary secret coefficient selection pattern for selecting DCT coefficients in procedure 122 illustrated in FIG. 1.

Preferably, not every DCT-domain coefficient of a selected pair of DCT-domain coefficient blocks is used for embedding a feature code. Referring now to FIGS. 1 and 6, the input coefficients 216 and 220 into which the feature codes 202 and 204 are to be embedded are selected by a coefficient selection procedure 150. The selection procedure 150 can optionally select the coefficients 216 and 220 simply based on the zig-zag order described above with respect to FIG. 6. For example, coefficients 7, 8, and 9 illustrated in FIG. 6 can be used in their standard zig-zag order: 7, 8, and 9. Alternatively, or in addition, the coefficient selection procedure 150 can use a secret transformed-domain location selection pattern 142 for selecting the coefficients to be used for embedding feature codes. The pattern 142 also specifies the order in which the coefficients are to be used. The transformed-domain location selection pattern 142 can, for example, be a randomly ordered or quasi-randomly ordered list—e.g., {7, 9}—of selected index numbers of the zig-zag order illustrated in FIG. 6. The selection pattern 142 can be generated using the same random methods discussed above with respect to the selection pattern 128 used to select the coefficients from which the feature codes are derived. An exemplary secret transformed-domain location selection pattern 142 is illustrated in FIG. 5B. The illustrated pattern 142 includes datum selection locations 524 and 526 which specify the transformed-domain—e.g., DCT-domain—locations of coefficients 514 and 516, respectively, in the coordinate system of block $P_3$. Data 514 and 516 are a subset of the set 606—illustrated in FIG. 6—of coefficients designated for embedding feature codes in block $P_3$.

The transformed-domain locations of coefficients 216 and 220 are preferably secret so that the locations can only be determined if the secret block pair mapping 134 and secret selection pattern 142 are known.

Figure 2:
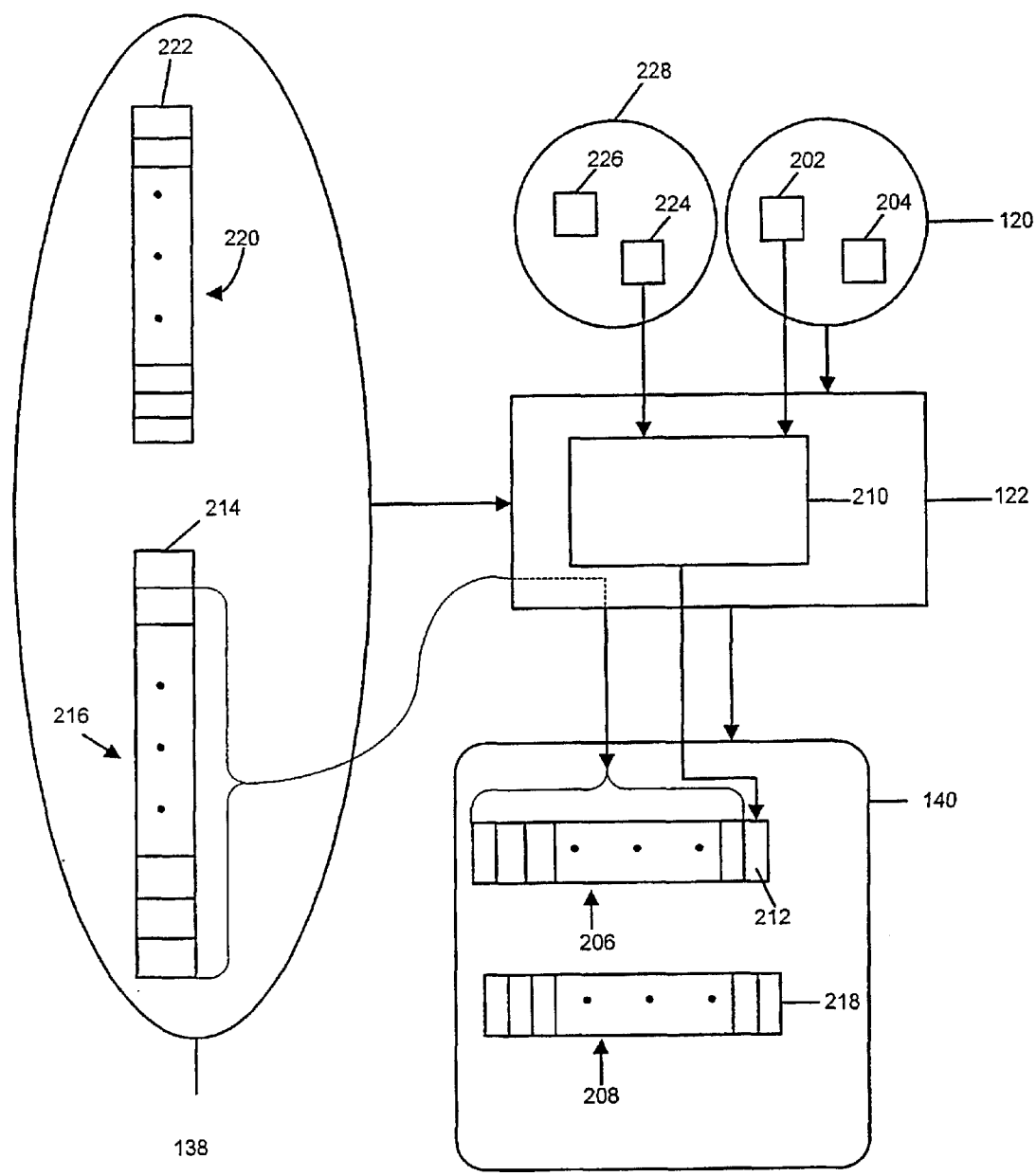
FIG. 2 is a block diagram illustrating an additional exemplary image-processing procedure in accordance with the present invention.

FIG. 2 illustrates an example of an embedding procedure 122 for use in the procedure illustrated in FIG. 1. A set of feature codes 120 derived from DCT-domain image data is received into the embedding procedure 122. The set of feature codes 120 includes, for example, features codes 202 and 204 which are to be embedded into non-spatial-domain data such as DCT coefficients 216 and 220, respectively. Consider, for example, feature code 202 which is to be embedded into DCT coefficient 216 of block $P_3$. The embedding procedure 122 includes a function 210 which operates upon the feature code 202. The function 210 can, optionally, also operate upon one or more bits 224 and 226 of a secret key 228. The function 210 generates a replacement code 212 which replaces the LSB 214 of the DCT-domain coefficient 216, thus deriving a new coefficient 206 having an LSB which is equal to the result 212 of the function 210. The function 210 can, for example, be a replacement operation which simply replaces the LSB 214 with the feature code 202. Such a replacement function can also be viewed as an identity operation which receives the feature code 202 and outputs a replacement code 212 equal to the feature code 202.

Alternatively, or in addition, the function 210 can be a binary operation such as, for example, an "exclusive OR" (XOR) operation receiving as inputs a feature code 202 and a bit 224 of a secret key 228. If such a function is used, the replacement code 212 equals the output of the XOR operation. The function 210 similarly processes additional feature codes such as feature code 204, and additional bits (e.g., bit 226) of the secret key 228, to derive additional coefficients in which feature codes are embedded. For example, the LSB of coefficient 208 is replacement code 218 which has replaced the LSB 222 of input coefficient 220.

Figure 14:
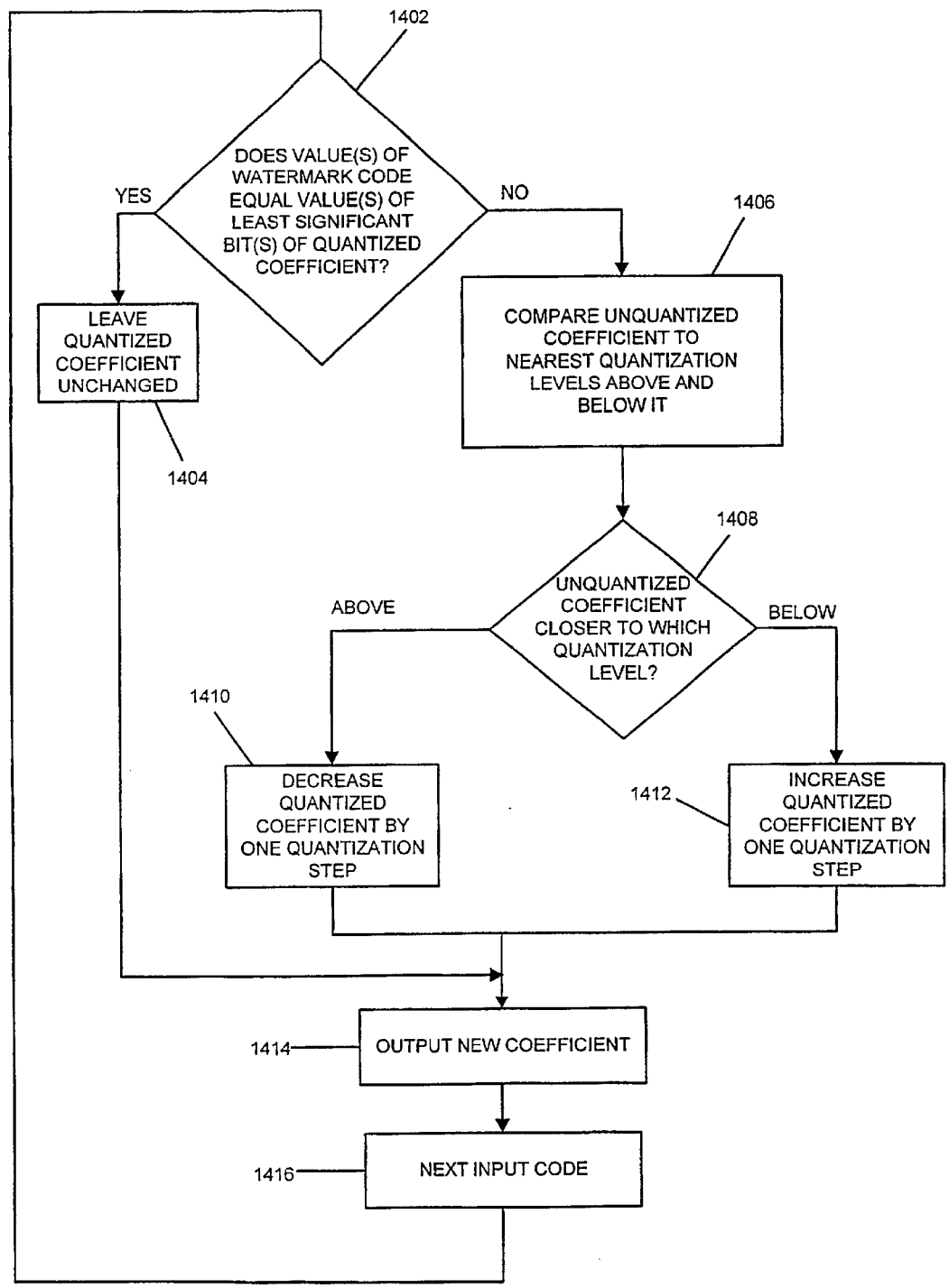
FIG. 14 is a block diagram illustrating an exemplary procedure for embedding feature codes and/or image data recovery codes in image data coefficients in accordance with the present invention.

It is to be noted that the above-described procedures of replacement of the LSB of an input coefficient are not the only methods for embedding a feature code in accordance with the present invention. For example, the embedding procedure 122 can take into account the value of the original, unquantized coefficient which was used to derive the quantized input coefficient into which the authentication code is to be embedded. An example of such an embedding procedure 122 is illustrated in FIG. 14. The illustrated procedure 122 can be used for embedding authentication feature codes, and also for embedding other types of watermark codes such as image data recovery codes, as discussed in further detail below. An object of the procedure 122 illustrated in FIG. 14 is to generate a quantized output coefficient which not only contains the embedded watermark code, but is also as close as possible to—i.e., has the smallest possible error with respect to—the original, unquantized coefficient which was used to derive the quantized input coefficient. The watermark code—i.e., the authentication code, recovery code, or recovery code portion—is embedded by changing one or more bits of the quantized input coefficient. If the value of the watermark code to be embedded equals the value(s) of the least significant bit or bits of the quantized coefficient (step 1402), then the coefficient is left unchanged (step 1404). On the other hand, if the value of the watermark code does not equal the value(s) of the least significant bit or bits, then the quantized coefficient is changed in such a way as to minimize the impact of the embedded watermark upon the appearance of the resulting image. For example, if 1-bit watermark codes are used, then each watermark code can have a value of 1 or 0. If the watermark code and the LSB of the quantized coefficient have the same value (step 1402), the coefficient is left unchanged (step 1404). If the watermark code and the aforementioned LSB have different values (step 1402), the procedure 122 compares the unquantized coefficient to the nearest quantization levels above and below the unquantized coefficient (step 1406). If the unquantized coefficient is closer to the quantization level below it (step 1408), then it is apparent that the unquantized coefficient has been rounded down in order to derive the quantized input coefficient (step 1408). Accordingly, the quantized coefficient is increased by one quantization step (step 1412), because the resulting difference between the quantized output coefficient and the original, unquantized coefficient will be relatively less if the quantized coefficient is increased—rather than decreased—by one quantization step. On the other hand, if the unquantized coefficient is closer to the quantization level above it (step 1408), then the quantized coefficient is decreased by one quantization step (step 1410), because it is then apparent that the unquantized coefficient was rounded up to derive the original input quantized coefficient; the difference between the quantized output coefficient and the original unquantized coefficient will be relatively less if the quantized coefficient is decreased—rather than increased—by one quantization step. After the procedure 122 determines whether or not to change the input coefficient, and after the coefficient is accordingly changed or not changed, the new coefficient is produced as an output of the embedding procedure 122 (step 1414). The next feature code is processed (step 1416).

It is to be noted that although the watermark embedding procedure illustrated in FIG. 14 leaves the quantized input coefficient unchanged if the watermark value(s) equals the value(s) of the LSB(s) of the quantized input coefficient, and changes the value of the coefficient if the watermark value(s) and the LSB value(s) are unequal, the watermark embedding procedure can just as easily be configured to embed the watermark in an inverted fashion. For example, in the case of a one-bit watermark, the coefficient can be left unchanged if the value of the watermark bit is unequal to the LSB of the coefficient, and the coefficient can be changed according to steps 1406, 1408, 1410, and 1412 if the values of the watermark bit and the LSB are equal.

Similarly to watermarks embedded by simple substitution of the LSB(s) of the coefficient, watermarks embedded using the procedure illustrated in FIG. 14 can also be extracted by simply determining the value(s) of the LSB(s) of the coefficient, because increasing or decreasing the quantized coefficient by one quantization level switches the value of the LSB. Accordingly, regardless of whether the LSB equalled the value of the watermark code before the embedding procedure was performed, the LSB will equal the value of the watermark code after the embedding procedure is performed.

The procedure 122 illustrated in FIG. 14 can be further understood with reference to the following simple example. Consider an input coefficient having a quantization step size of 1, and a quantized value of 7 which equals 111 in binary code. If a single-bit feature code to be embedded in the coefficient has a value of 1, and the LSB of the coefficient is to be set equal to the value of the feature code, then the output coefficient produced by the embedding procedure 122 will retain the value 7, because the LSB of the coefficient already equals 1. On the other hand, if the feature code has a value of 0, then the input coefficient will be either increased or decreased by one quantization level (i.e., adjusted by 1 or −1 in this example) in order to change the value of the LSB to 0. The choice of whether to increase or decrease the coefficient depends upon the value of the original unquantized coefficient. For example, if the original unquantized value was 6.8, then it is known that this coefficient was rounded up to derive the quantized value of 7. In such a case, the output coefficient will be given a value of 6, rather than 8, because 6 is closer to the original, unquantized value of 6.8. On the other hand, if the value of the original, unquantized coefficient was 7.2, then it is known that the unquantized coefficient was rounded down to derive the quantized value of 7. Accordingly, an output value of 8 will produce less error than an output value of 6, and the quantized coefficient of 7 is therefore increased by one quantization level to generate an output coefficient having a value of 8.

It is to be noted that although the particular exemplary procedure 122 illustrated in FIG. 14 generates an unchanged coefficient if the feature code equals the LSB of the input coefficient, and generates a changed coefficient if the feature code does not equal the LSB, the procedure 122 can just as easily be configured to generate a changed coefficient if the feature code equals the LSB, and an unchanged coefficient if the feature code does not equal the LSB.

Furthermore, although the above descriptions of various embedding procedures have emphasized the embedding of a single feature code in a single coefficient, it is also possible to embed a multi-bit feature code in one or more coefficients. For example, an embedding procedure 122 such as illustrated in FIG. 2 can modify the LSB of a first coefficient based upon the value of the first bit of a 2-bit feature code, and can modify the LSB of a second coefficient based upon the value of the second bit of the 2-bit feature code. In addition, a feature code can be designed to be a pre-defined function of the LSBs of two coefficients. Such a feature code is embedded by modifying the two LSBs as needed, such that the pre-defined function of the two LSBs has a value equal to that of the feature code. For example, the value of the F of the feature code can be defined as a binary function (e.g., XOR) of the LSBs of two coefficients (i.e., $F=LSB_1$ XOR $LSB_2$). One of the respective LSBs is modified if necessary, such that the value of the function $LSB_1$ XOR $LSB_2$ equals the value F of the feature code.

The embedding procedure 122 processes the other feature code 204 in a similar manner, embedding the feature code 204 into another DCT-domain coefficient 220 having an LSB 222. The LSB 222 and the feature code 204 are processed by the function 210 to generate a new LSB 218. The new LSB 218 is used to replace the old LSB 222 of the input coefficient 220, thereby generating a new DCT-domain coefficient 208.

Referring again to FIG. 1, the embedding procedure 122 generates a set 140 of watermarked data which includes coefficients 124 in which authentication codes (i.e., feature codes) have been embedded. For example, data set 124 includes coefficients 206 and 208—illustrated in FIG. 2—in which authentication codes 202 and 204, respectively, have been embedded. If the data recovery methods of the present invention—discussed in further detail below—are to be used, then the set 140 of watermarked data also includes a set 320 of coefficients in which image recovery data is embedded. The watermarked data 140 can, for example, be sent to a recipient 126, or can be stored or otherwise used.

Figure 10:
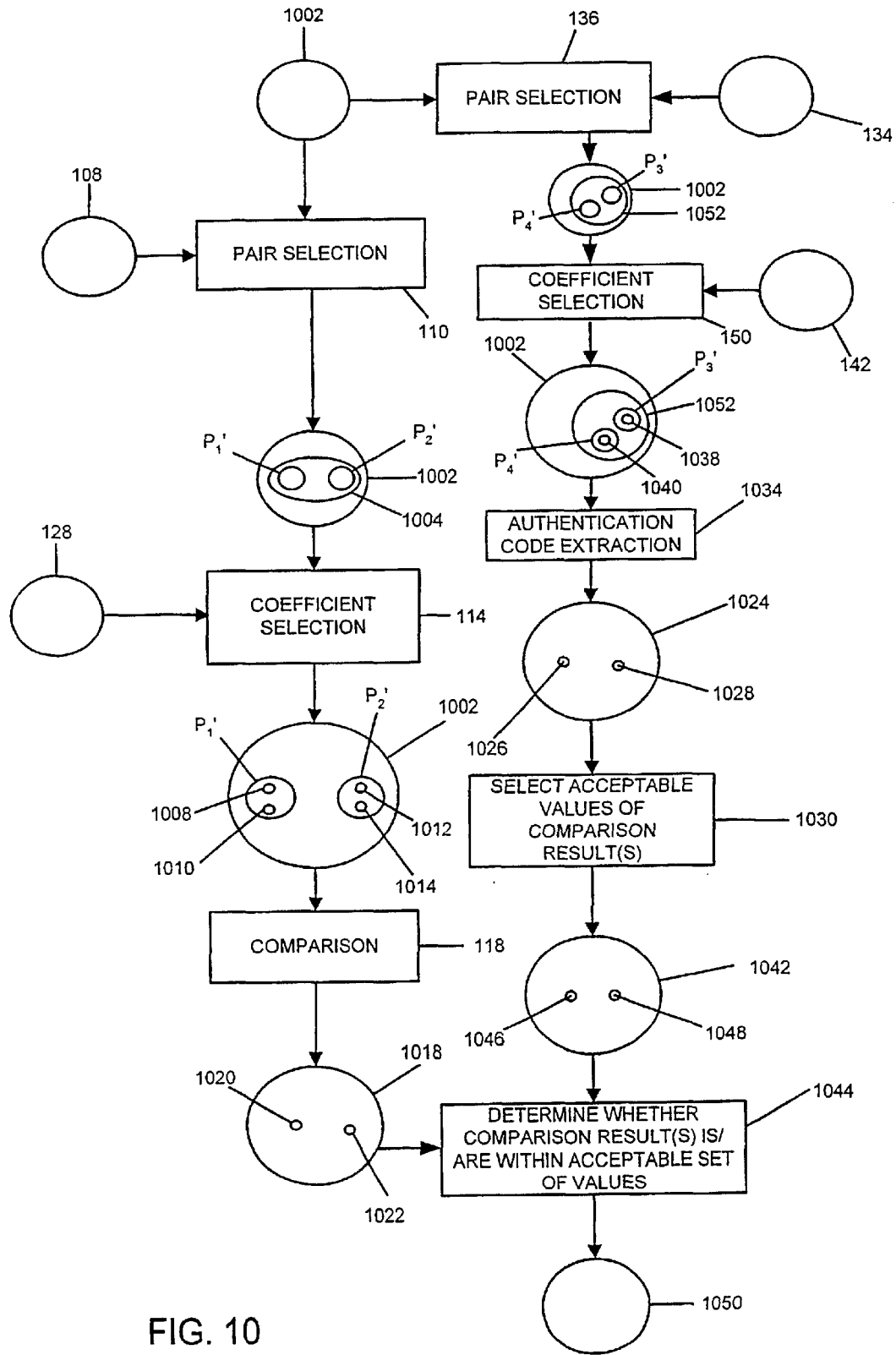
FIG. 10 is a block diagram illustrating an exemplary procedure for extracting authentication codes and using the authentication codes to authenticate image data in accordance with the present invention.

FIG. 10 illustrates an exemplary procedure for extracting authentication/feature codes and using the extracted codes to authenticate a set of image data. The image data being authenticated is typically a set of DCT coefficients or other transformed-domain image data derived from a set of spatial-domain image data. A JPEG-encoded image typically comprises one or more 8×8 blocks of DCT coefficients, each block being a set of quantized DCT coefficients derived from a corresponding 8×8 block of spatial-domain pixel data. In the procedure illustrated in FIG. 10, DCT-domain image data 1002 contains embedded authentication codes. The authentication codes are extracted and used to determine whether or not one or more 8×8 blocks of the DCT domain data 1002 have values consistent with the extracted authentication codes. The authentication procedure illustrated in FIG. 10 includes pair selection procedures 110 and 136, coefficient selection procedures 114 and 150, and a comparison procedure 118, all of which are similar or identical to the corresponding procedures in the authentication code generation and embedding procedure illustrated in FIG. 1. In the simple case in which the data 1002 has not been manipulated at all, a matched pair of coefficients can be compared in order to derive a comparison result which is identical to the authentication code which was derived from the corresponding two coefficients when the image was first watermarked by the procedure illustrated in FIG. 1. The comparison result thus generated should therefore match the authentication code extracted from the datum derived from—and in this case, equal to—the coefficient in which the original authentication code was embedded. However, as will be seen by the ensuing discussion, the procedure illustrated in FIG. 10 does not necessarily require an exact match between the new comparison result and the extracted authentication code.

In the illustrated procedure, the set 1002 of DCT data to be authenticated is processed using the same pair selection procedure 110, coefficient selection procedure 114, and comparison procedure 118 as those used in the authentication code generation and embedding procedure illustrated in FIG. 1. Furthermore, in both the feature code generation/embedding procedure illustrated in FIG. 1 and the authentication procedure illustrated in FIG. 10, the same DCT-domain block pair mapping 108 is used for selection of data blocks containing coefficients to be compared. Similarly, in both the code generation/embedding procedure and the authentication procedure, the same secret coefficient selection pattern 128 is used for coefficient selection 114. The pair selection procedure 110 processes the DCT data 1002, grouping the data 1002 into block pairs such as the illustrated pair 1004 of blocks $P_1'$ and $P_2'$. The locations of blocks $P_1'$ and $P_2'$ in the DCT domain are preferably identical to those of blocks $P_1$ and $P_2$ illustrated in FIG. 4. The coefficient selection procedure 114 uses the secret coefficient selection pattern 128 to select pairs of coefficients to be compared. For example, coefficients 1008 and 1012 are selected to be compared to each other, and coefficients 1010 and 1014 are also selected to be compared to each other. Each selected pair of coefficients is compared by the comparison procedure 118, thereby generating a set 1018 of comparison results. For example, the comparison of coefficients 1008 and 1012 yields the comparison result 1020, and the comparison of coefficients 1010 and 1014 yields the comparison result 1022.

The illustrated procedure also processes the same DCT-domain data 1002 using a pair selection procedure 136 similar or identical to the pair selection procedure 136 used in the authentication code generation and embedding procedure illustrated in FIG. 1. Furthermore, the same block pair mapping 134 is used in both the authentication procedure and the feature code generation and embedding procedure. In the authentication procedure illustrated in FIG. 10, the mapping 134 indicates, for example, the DCT-domain locations of blocks $P_3'$ and $P_4'$. Blocks $P_3'$ and $P_4'$ are derived from the blocks $P_3$ and $P_4$ in which the feature codes derived from blocks $P_1$ and $P_2$ were embedded in the watermarking procedure illustrated in FIG. 1. Blocks $P_3'$ and $P_4'$ are included in a block pair 1052. The block pair mapping 134 forms an association between block pair 1052 and the block pair 1004 containing blocks $P_1'$ and $P_2'$ which are derived from blocks $P_1$ and $P_2$, respectively.

Because blocks $P_1'$ and $P_2'$ were selected based on the same secret mapping 108 as blocks $P_1'$ and $P_2$ of data set 106 (illustrated in FIG. 1), it is known that blocks $P_1'$ and $P_2'$ have the same DCT-domain locations as blocks $P_1'$ and $P_2$. Similarly, because blocks $P_3'$ and $P_4'$ of data set 1036 (illustrated in FIG. 10) were selected based on the same secret mapping 134 as blocks $P_3$ and $P_4$ of data set 132 (illustrated in FIG. 1), it is known that blocks $P_3'$ and $P_4'$ have the same DCT-domain locations as blocks $P_3$ and $P_4$. Accordingly, pair selection procedure 136 selects pair 1052 of blocks $P_3'$ and $P_4'$ as the block pair which is expected to contain the embedded authentication codes corresponding to the block pair 1004 containing blocks $P_1'$ and $P_2'$. A coefficient selection procedure 150 utilizes coefficient selection pattern 142 to select the coefficients in which authentication codes 1024 are expected to be embedded. The coefficient selection pattern 142 indicates which coefficient in a particular block pair (e.g., $P_3'$ and $P_4'$) is expected to contain a feature code associated with a particular coefficient pair in blocks $P_1'$ and $P_2'$. For example, based upon pattern 142, the comparison result 1020 derived from coefficients 1008 and 1012 is expected to correspond to a feature code 1026 embedded in a particular coefficient 1038 in block $P_3'$. The coefficient selection procedure 150 therefore selects that coefficient 1038 to be processed by an authentication code extraction procedure 1034. Similarly, the comparison result 1022 is expected to correspond to a feature code 1028 embedded in coefficient 1040 of block $P_4'$, and the coefficient selection procedure 150 therefore selects that coefficient 1040 to be processed by the authentication code extraction procedure 1034. The authentication code extraction procedure 1034 is used to extract the authentication codes 1026 and 1028, respectively, from the selected coefficients 1038 and 1040.

The authentication procedure should accept data which has been altered by acceptable processing such as compression, encoding format transformation, and filtering, yet reject data which has been altered by improper procedures such as cropping and replacement. Accordingly, each of the extracted authentication codes 1024 is used (in procedure 1030) to select one or more acceptable values 1042 of the comparison results 1018 generated by the comparison procedure 118. The determination of the range of acceptable values is based upon the invariant properties of data compressed using quantization-based (e.g., JPEG-type) compression. For example, if a DCT coefficient such as coefficient 506 illustrated in FIG. 1 is greater than another DCT coefficient such as coefficient 508 illustrated in FIG. 1, and both coefficients are quantized using the same quantization levels (e.g., using the same quantization step size), then the quantized coefficient derived from coefficient 506 will never be less than the quantized coefficient derived from coefficient 508. In other words, quantization never reverses the sign of the inequality between two data. Furthermore, if the coefficients 506 and 508 are quantized, and then compressed by re-quantizing them using a different quantization step size, such an operation will also never reverse the sign of the inequality. In other words, the sign of an inequality between two data is invariant under quantization-type compression such as, for example, JPEG-type compression. In contrast, improper manipulation such as cropping and replacement is very likely to reverse the sign of the inequality, because such an operation typically has up to a 50% chance of altering the relative sizes of two coefficients. Consider, for example, the case of a 1-bit feature code (e.g., code 1026) derived by comparing two transformed-domain image data such as two DCT coefficients. In this example, the feature code has a value of 1 if the first coefficient is greater than or equal to the second coefficient, and a value of −1 if the first coefficient is less than the second coefficient. Because of the above-described invariant property of the sign of an inequality between two quantized data, if the feature code has a value of one, then any comparison result associated with the extracted feature code must also have a value of one, and can never have a value of −1 unless the data set/block being tested has been improperly altered. On the other hand, if the extracted feature code has a value of −1, then there are no restrictions on whether the comparison result can have a value of 1 or −1, because it is possible for compression to make two coefficient values equal within the precision of the selection quantization step size. Accordingly, if 1-bit feature codes are being used, and feature code 1026 has a value of 1, then the only acceptable value 1046 of the corresponding comparison result 1020 is 1. On the other hand, if the extracted feature code 1026 has value of −1, then the set of acceptable values 1046 of the comparison result 1020 consists of 1 and −1. The same principles are used to determine a set of acceptable values of each of the other comparison results. For example, set 1048 contains the acceptable values of comparison result 1022.

As discussed above, the system can be configured to use feature codes with more than one bit. For example, consider an embodiment in which a feature code is given a value of 1 if the first coefficient being compared is greater than the second coefficient, a value of 0 if the two coefficients are equal, and a value of −1 if the first coefficient is less than the second coefficient. If, in the coefficient pair used to generate a feature code, the first coefficient is greater than the second coefficient, then in any coefficient pair derived from the original pair, the corresponding first coefficient will always be greater than or equal to the corresponding second coefficient, unless improper manipulation (e.g., malicious tampering) has occurred. Similarly, if the first coefficient in the original pair is less than the second coefficient, then in the pair derived from the original pair, the first coefficient will always be less than or equal to the second coefficient, unless malicious tampering has occurred. Accordingly, in the above-described case, if the extracted feature code 1026 has a value of 1, then the set of acceptable values 1046 of the corresponding comparison result 1020 consists of 1 and 0, and does not include −1. Similarly, if the extracted authentication code 1026 has a value of −1, then the set of acceptable values 1046 of the comparison result 1020 consists of −1 and 0, and does not include 1. If the extracted authentication code 1026 has a value of 0, then the set of acceptable values 1046 of the comparison result 1020 consists only of 0. Each comparison result (e.g., result 1020 or 1022) is checked to determine whether it fits within the set of acceptable values corresponding to that result (e.g., set 1046 or 1048, respectively) (step 1044). The result 1050 of the determination is an indication of whether there has been improper alteration of one or more of the three blocks involved in the authentication process. For example, consider a case in which block pair mapping 134 and coefficient selection pattern 142 indicate that a particular pair of coefficients 506 and 508 in the block pair $P_1$ and $P_2$—from which blocks $P_1'$ and $P_2'$ were presumably derived—were used to generate an authentication code which should be stored in a particular coefficient (e.g., coefficient 1038) in block $P_3'$. If the corresponding pair of coefficients (e.g., coefficients 1008 and 1012) in blocks $P_1'$ and $P_2'$ generate a comparison result (e.g., result 1020) which fails to pass the testing procedure 1044 based on the extracted authentication code (e.g., code 1026), then it is apparent that one or more of blocks $P_1'$, $P_2'$ and $P_3'$ contain improperly altered data.

Figure 12:
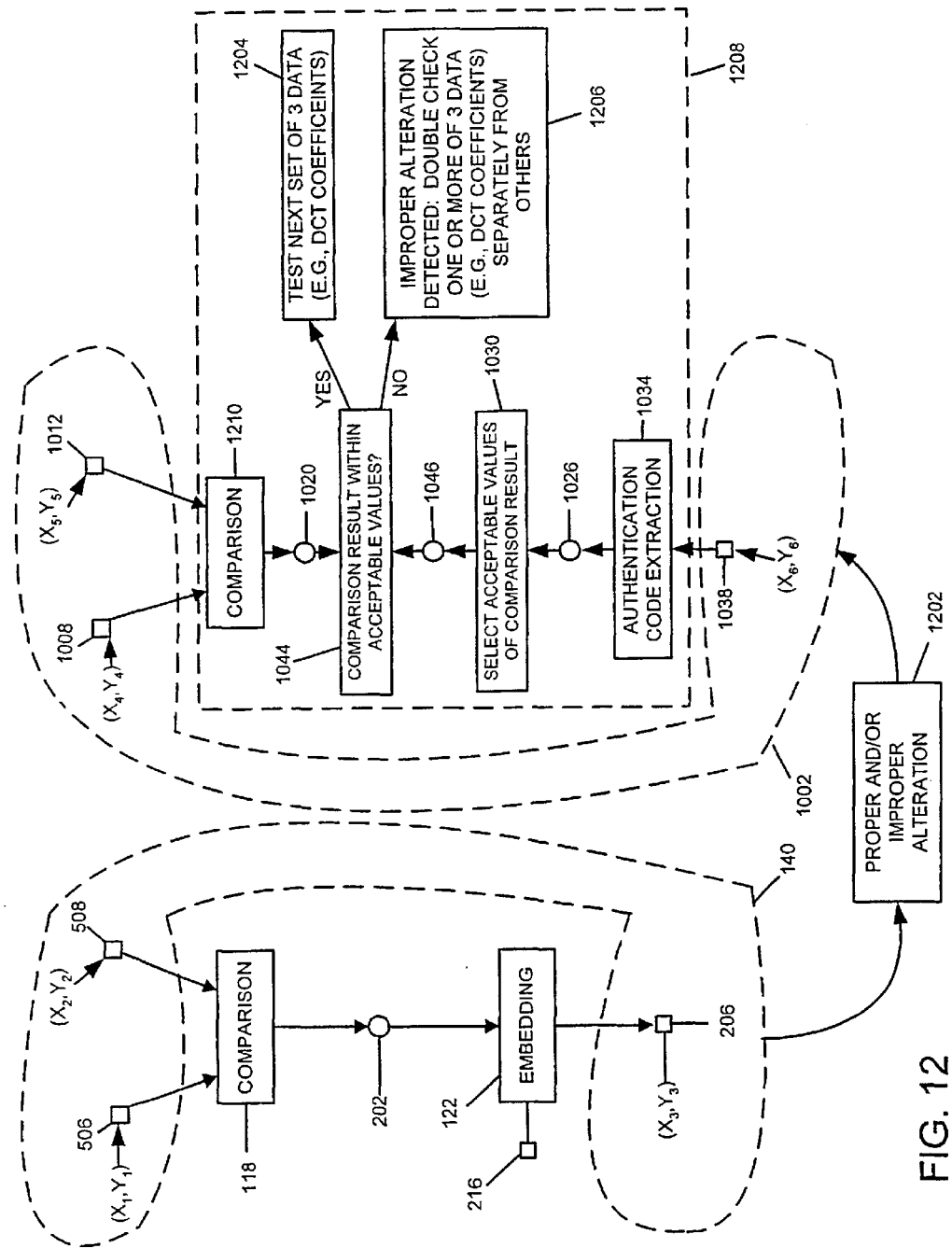
FIG. 12 is a block diagram illustrating an exemplary procedure for deriving an authentication code, embedding the authentication code in image data, and using the authentication code to authenticate data derived from the image data.

The general principles of authentication code generation/embedding procedures and authentication procedures of the present invention can be further understood with reference to the block diagram of FIG. 12. In the illustrated example, a set 140 of data contains three or more transformed-domain image data such as DCT coefficients 506, 508, and 206. The data set 140 is altered (process 1202) in either a proper or an improper manner, thereby causing data set 1002 to be derived. Each of the DCT coefficients has a particular location in a transformed domain—in this case, the DCT domain. For example, coefficient 506 has DCT-domain coordinates $X_1$ and $Y_1$, which represent, respectively, the horizontal and vertical location coordinates of coefficient 506. Coefficient 508 has DCT-domain location coordinates $X_2$ and $Y_2$. Coefficient 206 has DCT-domain location coordinates $X_3$ and $Y_3$. The values of data 506 and 508 are compared by a comparison procedure 118, in order to derive a first authentication code 202. Using an embedding procedure 122, the first authentication code 202 is embedded into an additional transformed-domain image datum (DCT coefficient 216), in order to derive datum 206.

FIG. 12 also illustrates a procedure 1208 for authenticating the set 1002 of transformed-domain image data derived from data set 140. Data set 1002 includes transformed-domain image data (e.g., DCT coefficients) 1008, 1012, and 1038 which are presumably derived from data 506, 508, and 206, respectively. However, if improper alteration has occurred in the alteration process 1202, one or more of data 1008, 1012, and 1038 may have been generated by tampering with one or more of data 506, 508, and 206. Transformed-domain image datum 1008 has transformed-domain (in this example, DCT-domain) location coordinates $X_4$ and $Y_4$ which equal $X_1$ and $Y_1$. Datum 1012 has DCT-domain location coordinates $X_5$ and $Y_5$, which equal $X_2$ and $Y_2$. Datum 1038 has DCT-domain coordinates $X_6$ and $Y_6$ which equal $X_3$ and $Y_3$. Using an authentication code extraction procedure 1034, a second authentication code 1026 is extracted from datum 1038. If datum 1038 has not been improperly altered, the second authentication code 1026 should be equal to the first authentication code 202. Transformed-domain image data 1008 and 1012 are compared (in procedure 1210) in order to derive a comparison result 1020. Preferably, the comparison procedure 1210 used in the authentication procedure 1208 is similar or identical to the comparison procedure 118 used to derive the first authentication code 202.

Based upon the second authentication code 1206, a set 1046 of acceptable values of the comparison result 1020 is selected (procedure 1030). The selection of the set 1046 of acceptable values is based upon the invariant properties of data comparison results (e.g., results 202 and 1020) under lossy compression, discussed in detail above with respect to FIG. 10. Comparison result 1020 is tested to determine whether it falls within the set 1046 of acceptable values (procedure 1044). If the value of the comparison result 1020 is within the set 1046 of acceptable values, then there is not yet any evidence of improper alteration. The authentication procedure 1208 therefore moves on to process the next set of three image data within data set 1002 (procedure 1204). On the other hand, if the value of the comparison result 1020 is not within the set 1046 of acceptable values of the comparison result 1020, then improper alteration has been detected. Accordingly, in order to determine which of the three data 1008, 1012, and 1038 has been improperly altered, each of these three data is double-checked separately from the other two data (procedure 1206). The double-checking procedure 1206 authenticates each of the three data 1008, 1012, and 1038 using additional transformed-domain image data from other coefficient blocks.

Figure 13:
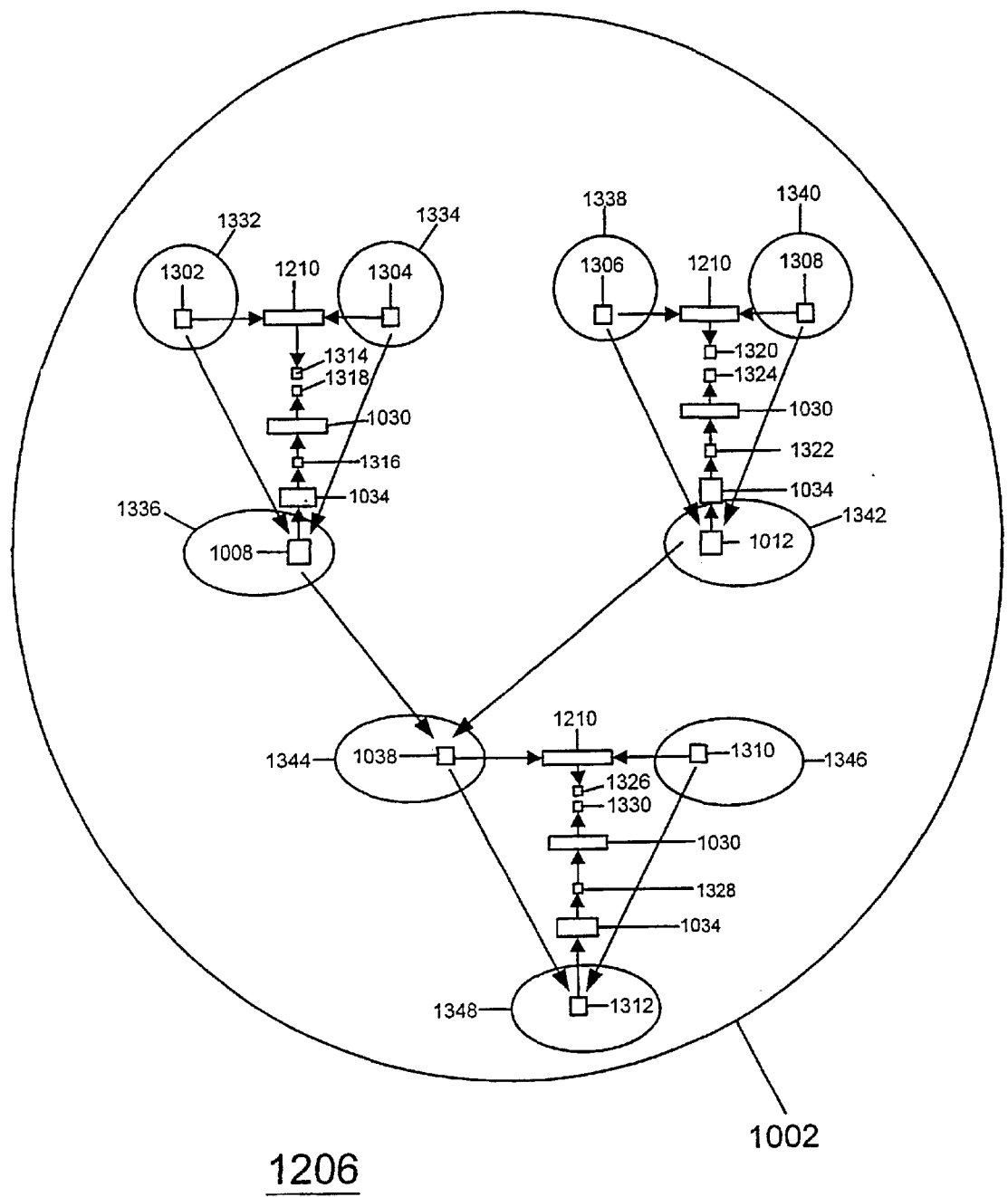
FIG. 13 is a block diagram illustrating an exemplary procedure for authenticating watermarked data in accordance with the present invention.

FIG. 13 illustrates the operation of an exemplary double-checking procedure 1206. The double-checking procedure 1206 is used to isolate the improperly manipulated datum or data from among three transformed-domain data 1008, 1012, and 1038 which together have failed the authentication procedure 1208 illustrated in FIG. 12. In order to test datum 1008 separately from data 1012 and 1038, the procedure 1206 uses the above-described mappings and patterns 108, 128, 134, and 142 to select two coefficients 1302 and 1304 (in data set 1002) which are derived from the coefficients (in data set 140) used to derive the authentication code which is presumably embedded in datum 1008. The authentication procedure 1208 illustrated in FIG. 12 is repeated, except that this time the values of data 1302 and 1304 are compared in order to derive a comparison result 1314, and an authentication code 1316 is extracted from datum 1008. Authentication code 1316 is used to select a set 1318 of acceptable values of the comparison result 1314 extracted from datum 1008. If the comparison result 1314 derived from data 1302 and 1304 falls within the set 1318 of acceptable values of the comparison result 1314, then this is taken as evidence that datum 1008 has not been improperly altered. On the other hand, if comparison result 1314 does not fall within the set 1318 of acceptable values, then this is taken as evidence that datum 1008 has been improperly altered.

A crop-and-replace operation tends to modify several data (e.g., several coefficients) in the same local region. Therefore, if one coefficient in a block has been improperly altered, it is very likely that several other coefficients in that block have also been improperly altered. Accordingly, all coefficients in a block are preferably accepted or rejected together. For example, if datum 1008 has been improperly altered, and is within block 1336, then the entire block 1336 is preferably rejected. Similarly, if datum 1302 in block 1332 has been improperly altered, then the entire block 1332 is preferably rejected. Likewise, if datum 1304 in block 1334 has been improperly altered, then the entire block 1334 is preferably rejected. Therefore, the double-checking procedure illustrated in FIG. 13 is preferably performed not only on data 1302, 1304, and 1008; rather, the same test is preferably performed on all pairs of authentication code generation coefficients in data sets/blocks 1332 and 1334, using authentication codes extracted from the respective associated coefficients in data set 1336. If each tested coefficient pair from data sets 1332 and 1334, and each authentication code extracted from the respective associated coefficients in set 1336, are successfully authenticated by the authentication procedure 1208, then it is determined that data set 1336 has not been improperly altered. It is therefore determined that one or both of data sets 1342 and 1344, which include data 1012 and 1038, respectively, have been improperly altered.

A similar test is performed by extracting an authentication code 1322 from datum 1012 and generating a comparison result 1302 by comparing data 1306 and 1308 derived from the data (in set 140) from which the authentication code 1322 embedded in datum 1012 was presumably derived. If the comparison result 1320 falls within a set 1324 of acceptable results based upon authentication code 1322, then this is taken as evidence that datum 1012 has not been improperly altered. On the hand, if comparison result 1320 does not fall within the set 1324 of acceptable results, then this is taken as evidence that datum 1012 has been improperly altered.

Data 1306, 1308, and 1012 are included in sets 1338, 1340, and 1342, respectively. Therefore, the authentication test is performed for all pairs of authentication code generation coefficients in data sets 1338 and 1340, using authentication codes extracted from the respective associated coefficients in data set 1342. If each tested coefficient pair from data sets 1338 and 1340, and each authentication code extracted from the respective associated coefficients in set 1342, are successfully authenticated by the authentication procedure 1208, then it is determined that data set 1342 has not been improperly altered. If data set 1342 has not been improperly altered, it is accordingly determined that one or both of data sets 1336 and 1344 have been improperly altered.

In order to test datum 1038 separately from data 1008 and 1012, mapping 108 and selection pattern 128 are used to determine a coefficient 1310 (within data set 1002) which is associated with datum 1038. Mapping 134 and selection pattern 142 are used to determine an additional coefficient 1312 which presumably contains an embedded authentication code derived from the data pair (in data set 140) from which data 1038 and 1310 were derived. Data 1038 and 1310 are compared in order to derive a comparison result 1326. An authentication code 1328 is extracted from datum 1312. Based on the authentication code 1328 extracted from datum 1312, a set 1330 of acceptable values of the comparison result 1326 is selected. If the comparison result 1326 falls within the set 1330 of acceptable values, then this is taken as evidence that datum 1038 has not been improperly altered. On the other hand, if data 1038, 1310, and 1312 fail the authentication procedure—i.e., comparison result 1326 does not fall within the set 1330 of acceptable values—then this is taken as evidence that datum 1038 has been improperly altered.

Data 1038, 1310, and 1312 are included in sets 1344, 1346, and 1348, respectively. Therefore, the authentication test is performed for all pairs of authentication code generation coefficients in data sets 1344 and 1346, using authentication codes extracted from the respective associated coefficients in data set 1348. If each tested coefficient pair from data sets 1344 and 1346, and each authentication code extracted from the respective associated coefficients in set 1348, are successfully authenticated by the authentication procedure 1208, then it is determined that data set 1344 has not been improperly altered. If data set 1344 has not been improperly altered, it is accordingly determined that one or both of data sets 1336 and 1342 have been improperly altered.

If, by the above-described double-checking procedure, it is determined that any two of the data sets 1336, 1342, and 1344 have not been improperly altered, yet data 1008, 1012, and 1038 together have failed the authentication procedure, then it is a reasonable conclusion that the third set—i.e., the set which did not pass the double-checking procedure—has been improperly altered. For example, if sets 1332, 1334, and 1336 together pass the double-checking procedure, and sets 1338, 1340, and 1342 together also pass the double-checking procedure, then it is determined that set 1344 has been improperly altered. Similarly, if sets 1332, 1334, and 1336 together pass the double-checking procedure, and sets 1344, 1346, and 1348 together also pass the double-checking procedure, then it is determined that set 1342 has been improperly altered. Likewise, if sets 1338, 1349 and 1342 together pass the double-checking procedure, and sets 1344, 1346, and 1348 together also pass the double-checking procedure, then it is determined that set 1336 has been improperly altered.

In accordance with an additional aspect of the present invention, image recovery data can be derived and embedded into an image in order to enable at least partial recovery of an image which has been subject to malicious tampering. The recovery data is derived from the same image used to derive the watermarked image. As discussed in further detail below, the recovery data need not be, and in fact preferably are not, embedded in the same coefficients as the authentication data. As a result, as discussed above with respect to the authentication procedure, recovery data and authentication data can be embedded in the same image.

Figure 3:
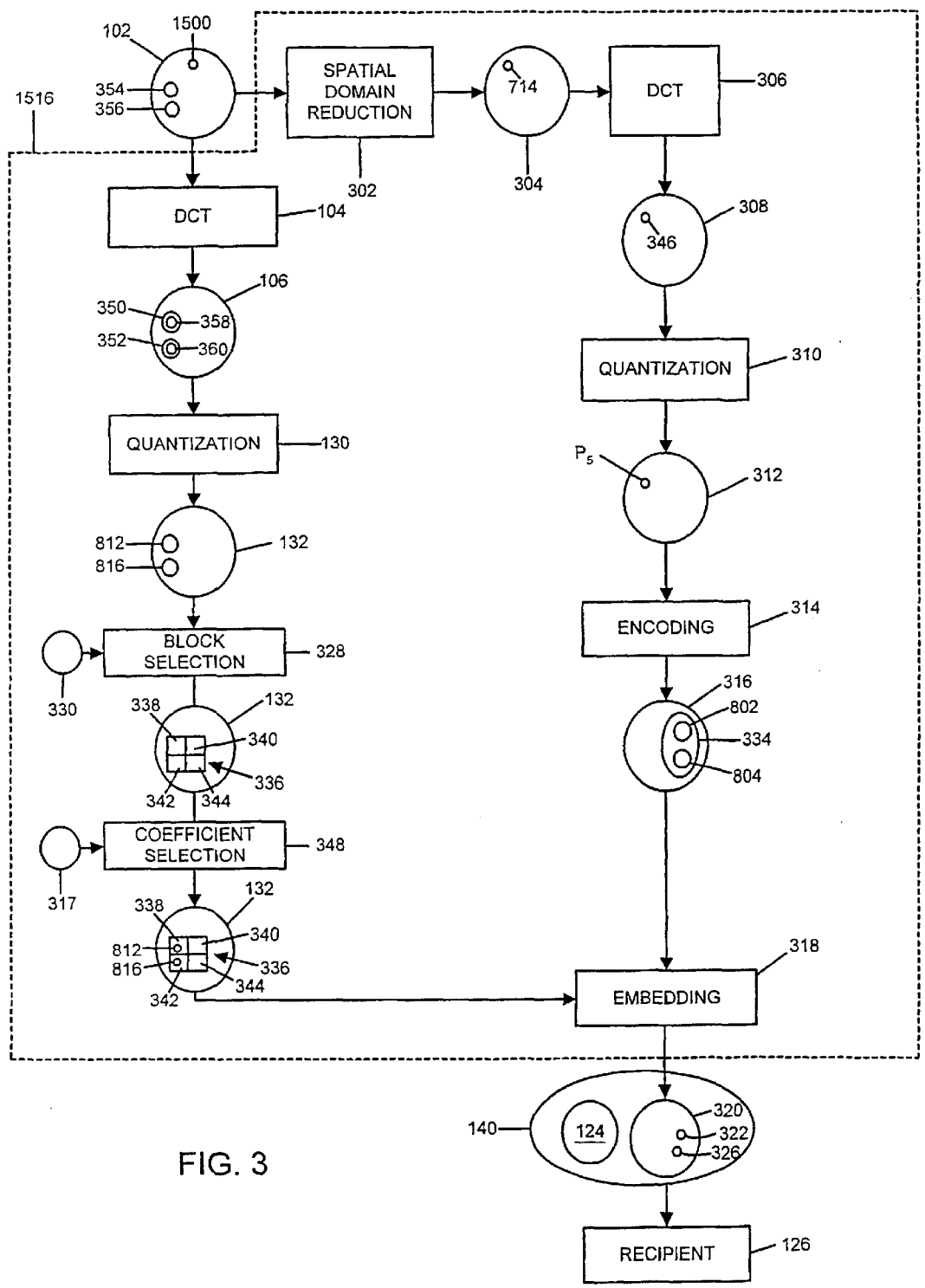
FIG. 3 is a block diagram illustrating yet another exemplary image-processing procedure in accordance with the present invention.
Figure 7:
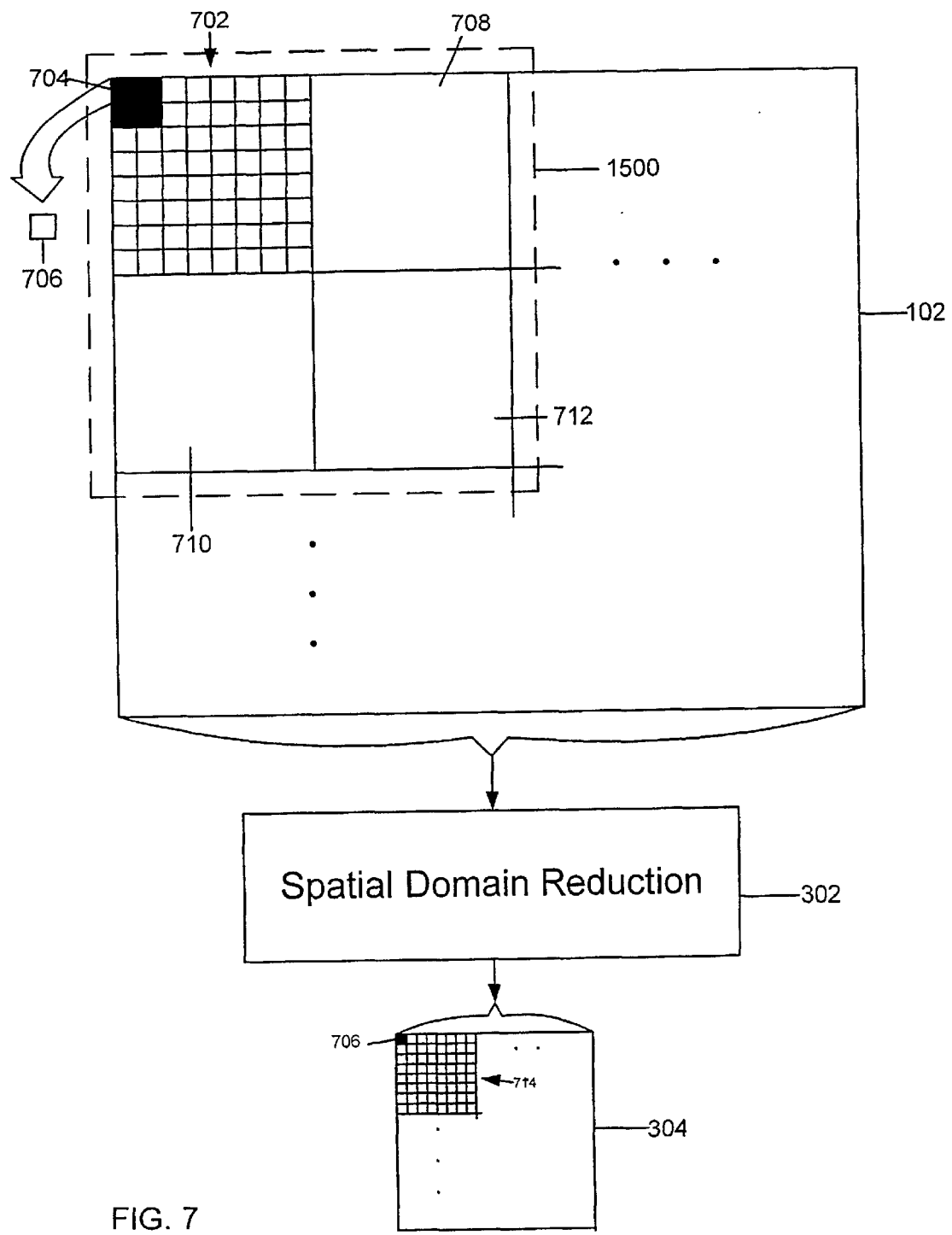
FIG. 7 is a block diagram illustrating an exemplary procedure for spatial domain reduction of image data for use in the procedure illustrated in FIG. 3.

An example of a procedure 1516 for generating and embedding recovery data is illustrated in FIG. 3. In order to reduce the amount of image data to be processed, the original, spatial domain image data 102 is reduced using a spatial domain reduction procedure 302, in order to derive a reduced-size, spatial domain version 304 of the original image 102. FIG. 7 further illustrates the operation of the spatial-domain reduction procedure. The original, spatial domain image data 102—which can, for example, represent the luminance or chrominance of a pixel, or the luminance of a particular pixel color channel such as red, green, or blue—is divided into a number of 8×8 pixel blocks. Considering, for example, pixel block 702, the pixel values of this block 702 are combined by dividing the block 702 into a number of four-pixel groups, and averaging the four pixels in each group. For example, the illustrated 2×2 pixel group 704 is averaged to generate a single, averaged pixel 706. Ultimately, a set 1500 of four blocks 702, 708, 710, and 712 of the original set 102 of spatial domain image data are thus reduced to a single block 714 in the reduced set 304 of spatial domain image data.

Returning now to FIG. 3, the reduced set 304 of spatial-domain data—which includes reduced set 714 derived from set 1500—is processed using a DCT procedure 306 in order to derive a set 308 of DCT coefficients. The set 308 of coefficients includes a data set 346 (in this example, an 8×8 block) of coefficients derived from the reduced spatial domain data set 714. The DCT coefficients 308 are quantized using a quantization procedure 310 similar to the quantization procedure 130 discussed above with respect to the authentication data generation and embedding procedure illustrated in FIG. 1. The set 312 of quantized coefficients includes a quantized set (in this example, an 8×8 block) $P_5$ which is a quantized version of set 346. The quantized DCT-coefficient data 312 are divided into 8×8 coefficient blocks—including block $P_5$—and each block is encoded using an encoding procedure 314, thereby deriving a set 316 of encoded recovery data. For example, illustrated block $P_5$ of the quantized data 312 is encoded to derive recovery code set 334. The recovery code set 334 typically includes several recovery codes (e.g., codes 802 and 804), each of which includes one or more bits. In order to encode a DCT-coefficient block, the coefficients are arranged in the zig-zag order discussed above with respect to FIG. 6. The resulting sequence of coefficient values—based on the zig-zag order—is encoded using a method which generates a code set having a size (i.e., a number of digits or bits) which is smaller than the size of the DCT coefficient block. For example, entropy coding such as the widely-used Huffman coding scheme or the JPEG entropy coding scheme can be used. Preferably, the JPEG entropy coding scheme is used, except that higher-frequency coefficients—i.e., coefficients near the end of the zig-zag order—are truncated in order to conserve embedding space. For example, AC coefficients 2–43 in the zig-zag order can be used, whereas coefficients 44–64 can be omitted. Furthermore, each DC coefficient—represented by coefficient 1 in the zig-zag order—is preferably quantized using 6 bits, and is preferably encoded independently from the other coefficients in the block, in order to enable each block to be independently decoded later. Separate encoding of DC coefficients reduces the likelihood of error propagation in a manipulated image, because if the encoding of a first DC coefficient depends upon the value of a second DC coefficient, then any error in decoding the second coefficient will likely be propagated into the value of the decoded first DC coefficient.

An embedding procedure 318 embeds recovery code set 334 in a selected set 336 of four 8×8 blocks 338, 340, 342, and 344 of coefficients within a set 132 of quantized DCT coefficients, thereby generating one or more coefficients 332 and 326 containing portions of the embedded recovery code set 334. The other recovery code sets within set 316 are similarly embedded in other selected sets of coefficient blocks in order to derive the full set 320 of coefficients having embedded recovery codes. Typically each recovery code set is distributed among four adjacent 8×8 blocks of the quantized coefficients 132.

The quantized DCT coefficients 132 are derived by transforming the original spatial domain image data 102 into a different domain, and quantizing the resulting, transformed-domain data. For example, in the procedure illustrated in FIG. 3, a DCT procedure 104 processes the spatial domain data 102 in order to generate a set 106 of unquantized DCT coefficients. In the illustrated procedure, spatial domain blocks (i.e., 8×8 sets) 354 and 356 of set 102 are transformed in order to derive transformed-domain blocks (i.e., 8×8 sets) 350 and 352, respectively, which are within set 106. The unquantized DCT coefficients 106 are quantized by quantization procedure 130 which derives a set 132 of quantized coefficients. For example, unquantized coefficients 358 and 360 of sets 350 and 353, respectively, are quantized for deriving quantized coefficients 812 and 816, respectively. The set of four blocks into which each recovery code set is to be embedded is selected by a block selection procedure 328. The selection 328 is based on a mapping 330 between the recovery code sets and the respective corresponding coefficients which are to be used for embedding the codes. In order to minimize the visual impact of the recovery code watermarks on the resulting image, the mapping is designed to select embedding coefficients which—in the coordinates of the image—are as far as possible from the coefficients used to derive the recovery codes being embedded. For example, recovery codes derived from the left side of the image should be embedded on the right side of the image. Recovery codes derived from near the middle of the image should be embedded near the edge of the image. As an additional example, in the case of a square-shaped image having M×M blocks of data, M/2 is the preferred minimum distance between the location of a particular block and the region in which the recovery data associated with that block is embedded.

For each block, a coefficient selection procedure 348 selects the coefficients into which the recovery codes are to be embedded. For example, in the procedure illustrated in FIG. 3, the coefficient selection procedure 348 selects coefficient 812 in block 338, and coefficient 816 in block 342. Optionally, the coefficients can be selected according to the zig-zag order illustrated in FIG. 6. For example, coefficients 10–21 of illustrated block portion 608 can simply be used in numeric order. Alternatively, or in addition, the coefficient selection procedure 348 can select coefficients according to a secret transformed-domain (e.g., DCT-domain) selection pattern 317. Such a selection pattern 317 can, for example, be a randomly ordered or quasi-randomly ordered list—e.g., {18, 12, 15}—of selected index numbers of the zig-zag order illustrated in FIG. 6. The selection pattern 317 can be generated using a variety of random and/or quasi-random number generation techniques, as discussed in detail above with respect to the selection patterns 128 and 142 illustrated in FIG. 1. The transformed-domain locations of coefficients 812 and 816 are preferably secret so that the locations can only be determined if mapping 330 and selection pattern 317 are known.

Figure 8:
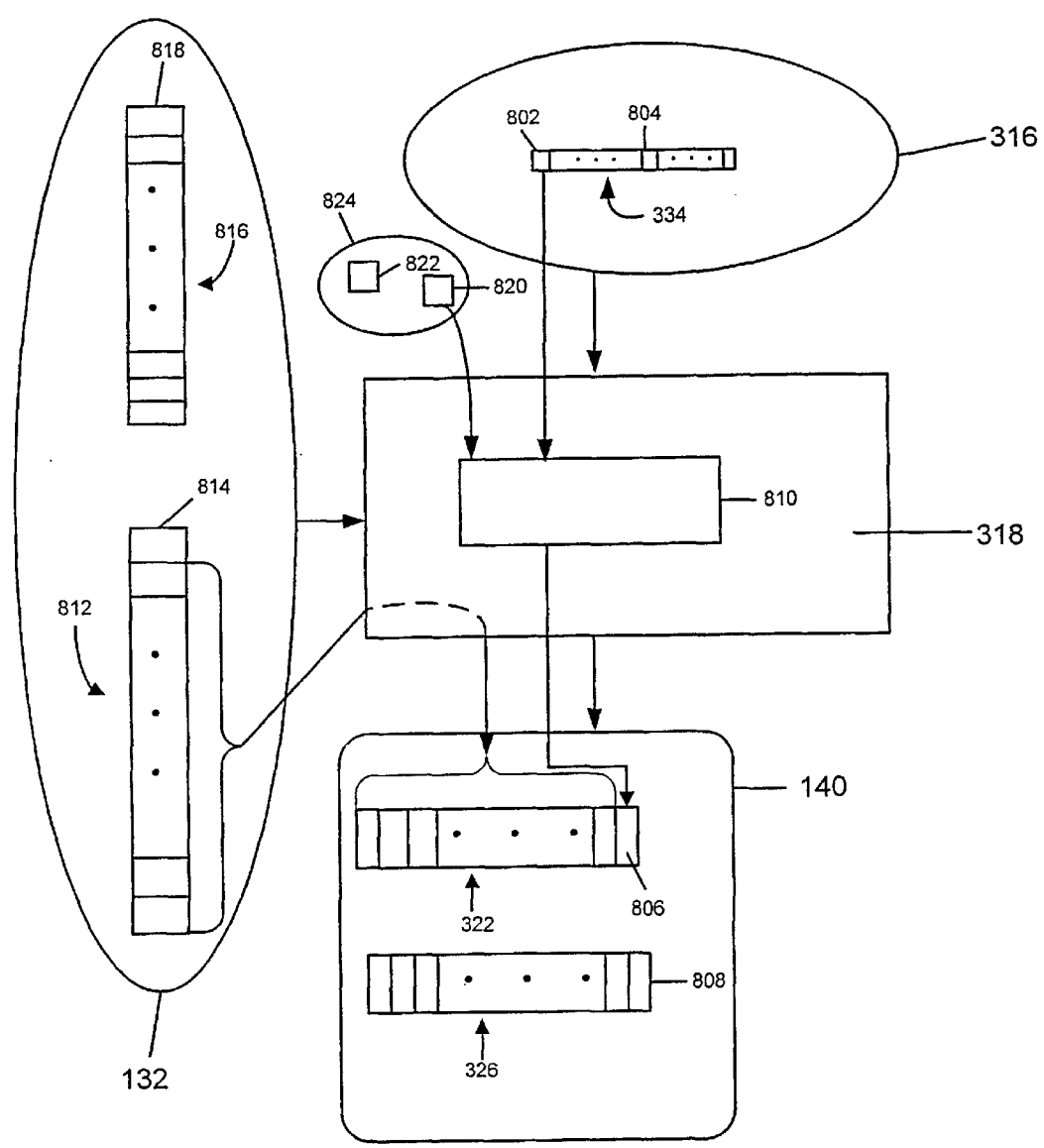
FIG. 8 is a block diagram illustrating an exemplary embedding procedure for use in the procedure illustrated in FIG. 3.

Preferably, the recovery data embedding procedure 318 is similar or identical to the authentication data embedding procedure 122 discussed above with respect to FIGS. 1, 2, and 14. FIG. 8 illustrates an exemplary embedding procedure 318 for use in the procedure 1516 illustrated in FIG. 3. A set 316 of recovery code sets is received into the embedding procedure 318. The set 316 of recovery code sets includes, for example, recovery code set 334 containing recovery codes 802 and 804 which are to be embedded into transformed-domain image data such as DCT coefficients 812 and 816. For example, recovery code 802 (e.g., a 1-bit code) is embedded into DCT coefficient 812 as follows. The embedding procedure 318 includes an embedding function 810 which operates upon the recovery code 802. The embedding function 810 produces a replacement code 806 which replaces the LSB 814 of the DCT-domain coefficient 812 to generate a new coefficient 322 having an LSB which is equal to the result 806 of the function 810. The embedding function 810 of the recovery code embedding procedure can be any of the functions discussed above with respect to function 210 of the authentication code embedding procedure 122. For example, function 810 can be a replacement operation which simply replaces the LSB 814 with the recovery code 802. Alternatively, or in addition, the function 810 can be a binary operation such as, for example, an XOR operation which receives as inputs the recovery code 802 and a bit 820 of a secret key 824.

The function 810 processes additional recovery codes such as code 804, and optionally, additional portions of the secret key 824, such as bit 822, to derive additional coefficients containing embedded recovery codes. For example, coefficient 326 includes replacement code 808 which has replaced the original LSB 818 of the input coefficient 816.

It is to be further noted that, similarly to the feature code embedding procedure 122 discussed above, the recovery code embedding procedure 318 illustrated in FIG. 3 can, for example, be the procedure illustrated in FIG. 14, discussed in detail above with respect to the feature code embedding procedure 122.

Figure 11:
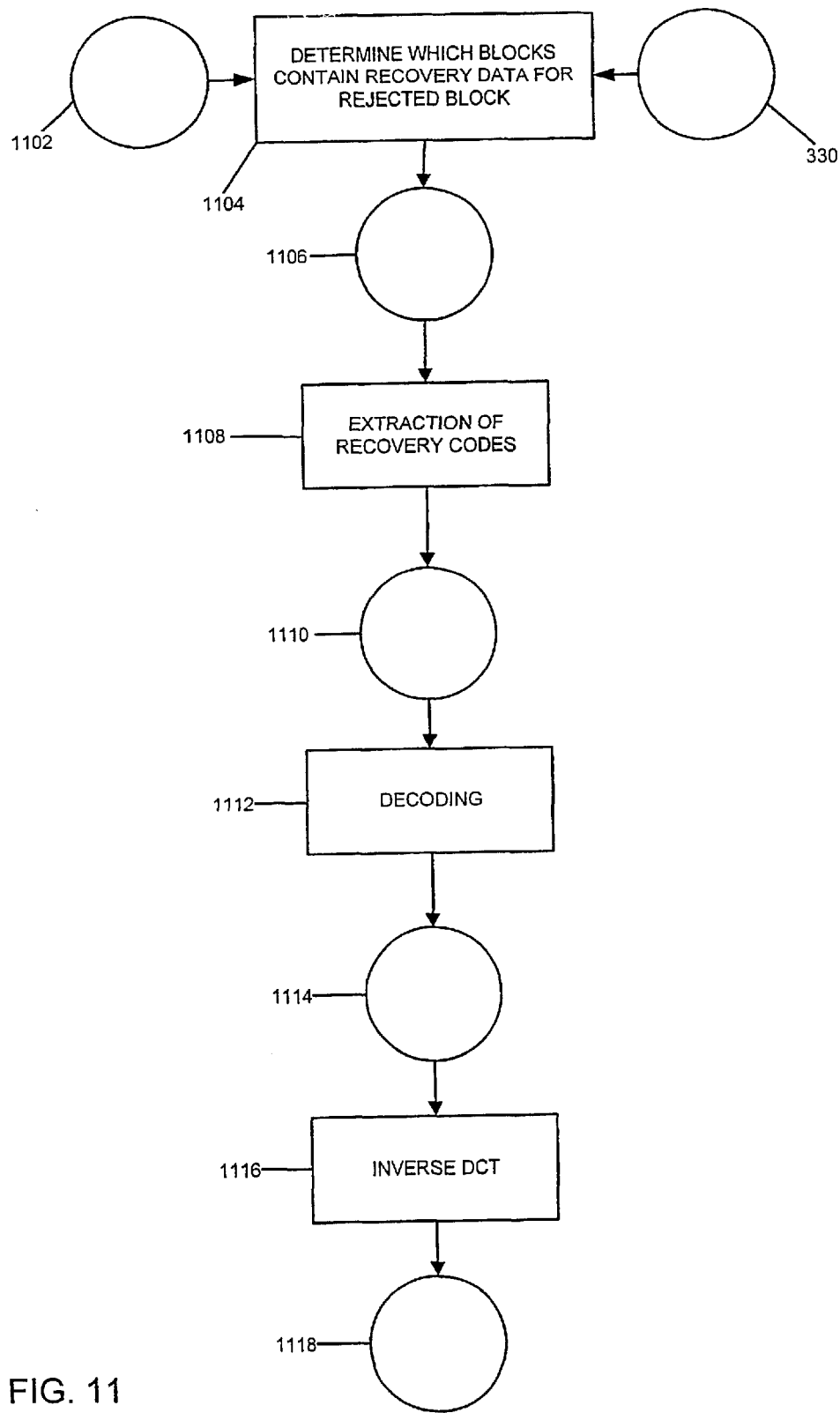
FIG. 11 is a block diagram illustrating an exemplary procedure for extracting recovery codes and using the recovery codes to recovery image data in accordance with the present invention.

If the authentication procedure discussed above with respect FIG. 10 determines that a particular block of DCT coefficients has been improperly altered, and the block is therefore rejected, the image portion associated with that block can be partially recovered by extracting the embedded recovery codes and using the extracted recovery codes to re-create a lower-resolution version of the original image portion. An exemplary procedure for generating the lower-resolution replacement data is illustrated in FIG. 11. The watermarked data 1102 is processed by a procedure 1104 for determining which other blocks contain the recovery data for the rejected block. The location of the recovery data is determined based on a mapping 330, which is preferably the same mapping used to select blocks for embedding recovery codes in the procedure 1516 illustrated in FIG. 3. The blocks 1106 containing the recovery data are processed by an extraction procedure 1108 which extracts the recovery codes 1110 from the coefficients 1106 in which the recovery codes 1110 are embedded. A decoding procedure 1112 processes the recovery codes 1110, converting them back into DCT-domain coefficients 1114. The decoding procedure 1112 can use a standard Huffman decoding procedure, or a standard JPEG entropy decoding procedure. The decoding procedure 1112 illustrated in FIG. 11 is the inverse of the encoding procedure 314 used in the recovery data generation and embedding procedure 1516 illustrated in FIG. 3. The DCT coefficients 1114 thus derived by the decoding procedure 1112 can be used to replace the coefficients of the rejected block. Although the recovered coefficients 1114 constitute a smaller amount of data, and therefore have lower resolution, than the initially rejected coefficients, the recovered coefficients 1114 can be used to approximate the lost image portion. To display the replacement image portion, the recovered coefficients 1114 are processed using an inverse DCT procedure 1116 which derives a spatial-domain image portion 1118 for replacing the rejected portion.

Figure 15:
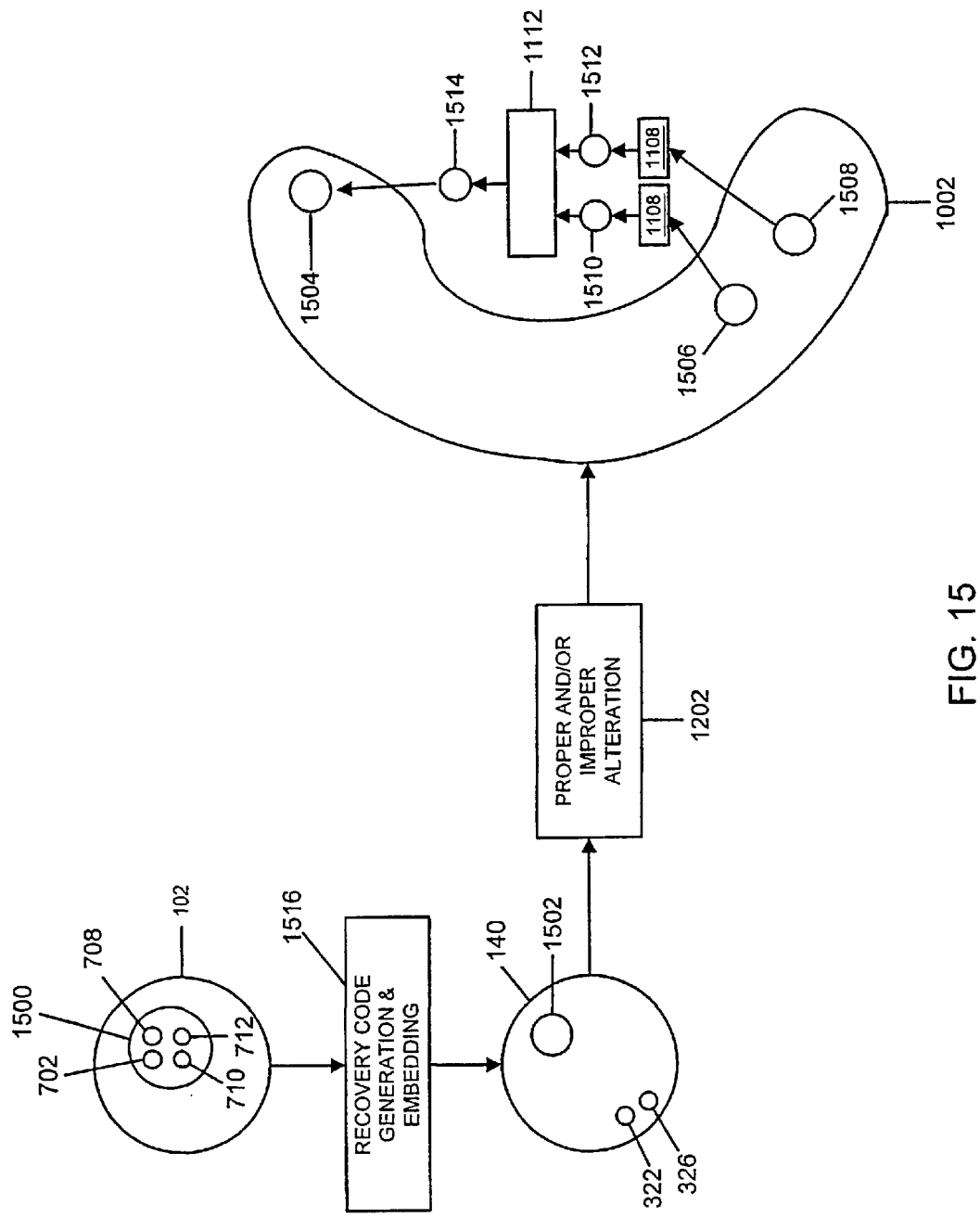
FIG. 15 is a block diagram illustrating an exemplary procedure for watermarking and authenticating image data in accordance with the present invention.

The operation of the image data recovery procedure illustrated in FIG. 11, as used in conjunction with the recovery code generation/embedding procedure 1516 illustrated in FIG. 3, can be further understood with reference to FIG. 15. The original, spatial domain image data 102 is processed using the recovery code generation/embedding procedure 1516, in order to derive watermarked data 140. As illustrated in FIGS. 3 and 7, the original spatial domain data 102 includes data set 1500 which is used to derive recovery codes 802 and 804; these recovery codes 802 and 804 are embedded in coefficients 322 and 326, respectively. The watermarked data set 140 includes coefficients 322 and 326, as well as DCT data set 1502 derived from spatial domain data set 1500. Similarly to the procedure illustrated in FIG. 12, the watermarked data 140 is potentially subject to alteration 1202 which can include proper and/or improper alteration. The alteration process 1202 generates data set 1002 which is derived from the original watermarked data set 140. Data set 1002 includes coefficients 1506 and 1508 derived from coefficients 322 and 326, respectively, of the original watermarked data set 140. Data set 1002 also includes data set 1504 derived from data set 1502 within the original watermarked data set 104. Coefficients 1506 and 1508 are each processed using an extraction procedure 1108 to extract recovery codes 1510 and 1512, respectively.

Recovery codes 1510 and 1512 are processed by a decoding procedure 1112, to derive an approximation data set 1514. The approximation data set 1514 is used to replace data set 1504 if data set 1504 is rejected by an authentication procedure such as the authentication procedures illustrated in FIGS. 10, 12, and 13.

Figure 16:
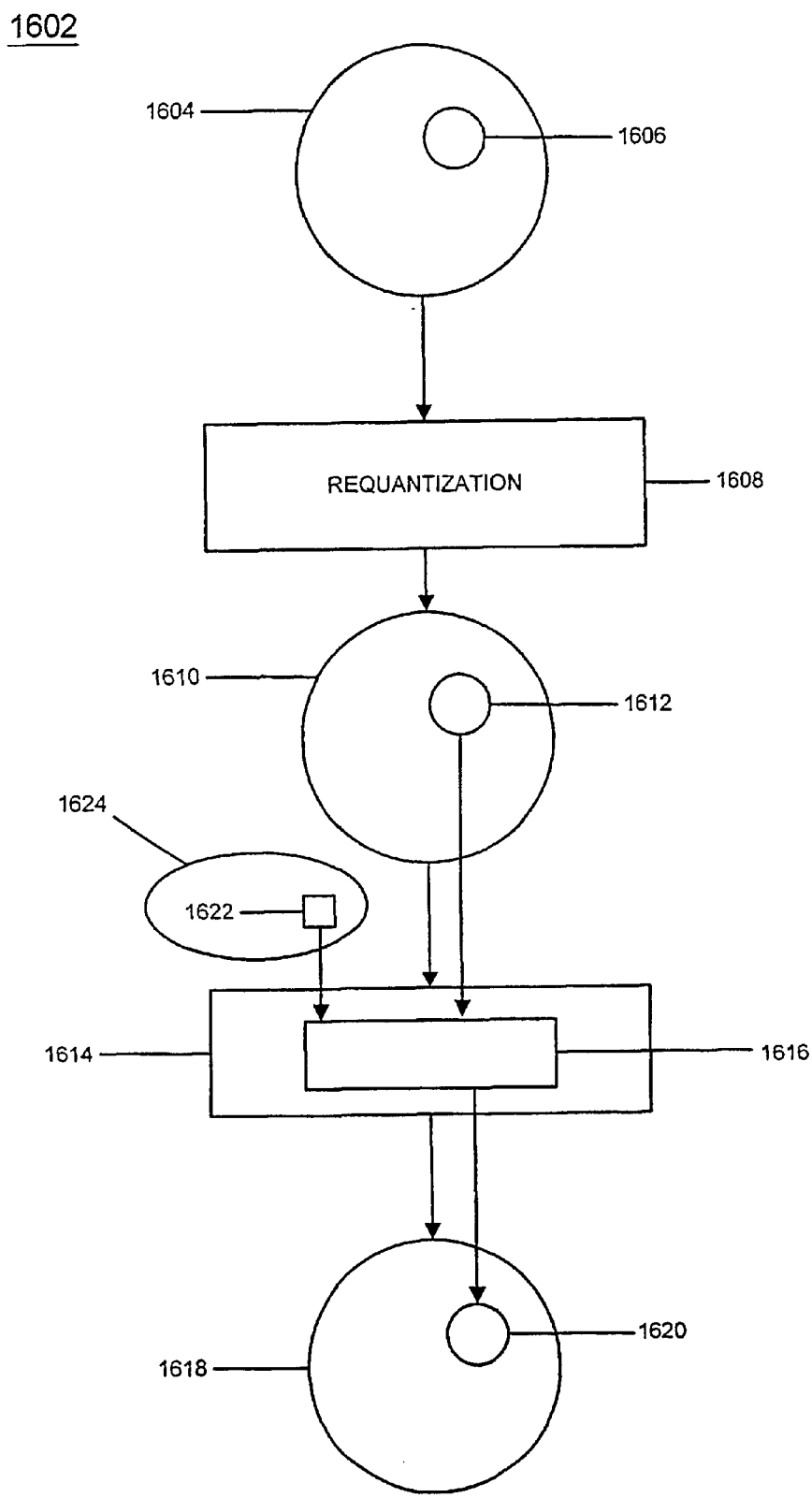
FIG. 16 is a block diagram illustrating an exemplary watermark extraction procedure for use in the procedures of FIGS. 10–13 and 15.

FIG. 16 illustrates an exemplary watermark extraction procedure 1602 which can be used as the authentication code extraction procedure 1034 illustrated in FIGS. 10, 12, and 13, and/or can be used as the recovery code extraction procedure 1108 illustrated in FIGS. 11 and 15. An exemplary data set 1604 being processed by the extraction procedure 1602 includes at least one coefficient 1606 in which a watermark code—e.g., an authentication code or a recovery code—is embedded. The watermarked data set 1604 is requantized by a requantization procedure 1608. The requantization procedure 1608 uses the same quantization step size or sizes as used by the quantization procedure 130 (illustrated in FIGS. 1 and 3) which prepared the original transformed-domain data 106 for watermarking. The requantization procedure 1608 generates a set 1610 of requantized data including requantized datum 1612. A watermark extraction function 1614 is used to extract a set 1618 of watermarks from the requantized data 1610. For example, the watermark 1620 embedded in requantized datum 1612 is extracted by the watermark extraction function 1614. Typically, if the embedded watermark 1620 is unencrypted, it simply equal to the LSB of the requantized datum 1612. In such a case, the watermark extraction function 1614 simply outputs the LSB of each of the data 1610 from which watermarks 1618 are being extracted. Alternatively, or in addition, the embedded watermarks can be encrypted. If so, the watermark extraction function can include a binary function 1616 which receives the requantized coefficient 1612 or the LSB of the requantized coefficient 1612, along with a portion 1622 (e.g., a bit or set of bits) of a secret key 1624. The secret key 1624 is the same key which was originally used to encrypt the watermark data when they were initially embedded. For example, if secret key 228 (illustrated in FIG. 2) was used to encrypt a set of authentication data, then the secret key 1624 used to extract the data is preferably identical to secret key 228. Similarly, if a secret key 824 (illustrated in FIG. 8) was used to encrypt recovery data when the recovery data was initially embedded, then secret key 1624 is preferably identical to secret key 824.

An advantageous feature of the watermark embedding and extraction procedures of the present invention is that even if the watermarked data is altered by certain types of alteration procedures, the watermark codes can be recovered intact, provided that the data bits in which the watermarks are embedded are not changed or deleted. For example, after being watermarked, the data can be requantized by a user, provided that the quantization step sizes used in the requantization are no greater than the quantization step sizes used in the original quantization procedure 130 for preparing the coefficients 106 for watermark embedding. On the other hand, if the step size used to alter a particular coefficient by requantization is larger than the quantization step size used to prepare the coefficient for watermarking, then the bit or bits containing the watermarks—typically, the LSB(s) of the coefficient are likely to be altered or deleted, thereby damaging or destroying the watermark.

Data which has been watermarked in accordance with the present invention can be processed using data encoding format transformation procedures and/or filtering procedures without damaging or destroying the watermark codes. For example, if the watermarked data is originally in JPEG format, the data can be converted to GIF format, JPEG 2000 format, PPM format, and/or TIFF format without compromising the watermarks. In addition, the watermarked data can be filtered by either a spatial domain filter (e.g., an edge-enhancement or smoothing filter) or a frequency domain filter such as a Fourier-domain smoothing filter without preventing the watermarks from being later recovered. It further to be noted that if the watermarked data is altered using a requantization procedure, there are no limitations on the sizes of the requantization steps used to requantize coefficients which do not include embedded watermarks; only the coefficients having embedded watermarks are of concern with respect to requantization step size.

An additional benefit of the watermarking, authentication, and recovery procedures of the present invention is that the authentication and recovery data are contained in the image being authenticated. No additional data is needed, unless the watermarks are encrypted using a secret key such as the secret key 228 or the secret key 824 illustrated in FIGS. 2 and 8, respectively. If a secret key is used to encrypt the watermarked codes, then this secret key is preferably provided to the user or system performing the authentication and/or recovery procedures.

It is to be noted that the terms "set" and "sets" as used herein are not meant to be limited only to sets of two or more data or other items. Rather, these terms are also meant to include sets of one datum or other item. References herein to an "image portion" or a portion of an image can be considered to refer to an entire image and subparts of that image. The term "approximately equal" as used herein to refer to two values is meant to refer to cases in which the two values are either exactly equal or nearly equal. The terms "deriving" and "derived from," as used herein to refer to data or other items, are not meant to exclude cases in which the data or other items are equal.

It will be appreciated by those skilled in the art that the methods of FIGS. 1–16 can be implemented on various standard computer platforms and processors operating under the control of suitable software defined by FIGS. 1–16. The software can be written in a wide variety of programming languages, as will also be appreciated by those skilled in the art. In some cases, dedicated computer hardware, such as a peripheral card in a conventional personal computer, can enhance the operational efficiency of the above methods. Exemplary software for carrying out and using the present invention has been written in the well-known "C" programming language; the source code of this software is set forth in the Appendices attached hereto. The source code of the procedures for generating and embedding the authentication and recovery codes is provided in Appendix A. The source code of the procedures for authenticating watermarked data and for generating recovery data to replace rejected data sets is provided in Appendix B. The source code of the procedures for encoding and decoding recovery data is provided in Appendix C. Appendix C includes source code of DCT and inverse DCT procedures, and other procedures related to the watermarking, authentication, and data recovery techniques of the present invention.

Although the present invention has been described in connection with specific exemplary embodiments, it should be understood that various changes, substitutions, and alterations can be made to the disclosed embodiments without departing from the spirit and scope of the invention as set forth in the appended claims.

APPENDIX A:

SOURCE CODE OF SOFTWARE FOR GENERATING AND EMBEDDING AUTHENTICATION AND RECOVERY CODES

```
5    /* This is a color & BW watermark embedder by CYLin */ include <stdio.h>
     #include <string.h>
     #include <math.h>
10   #include "idct.c"
     #include "fdctint.c"
     #include "writejpg.c"

#define iCbOffset 128   /* Must be integer */
15   #define iCrOffset 128 define CodesPerBlock 3
     #define NoNoiseCoefNum 28

20   /* Threshold for Photoshop 3.0: max:85, high:75, med:58, low:40 */
     #define defaultMQFset1 85  /* changed from 90 -> 85, 809 */
     #define defaultMQF2set1 85 /* changed from 90 -> 85, 809 */
     #define defaultMQFset2 75  /* changed from 80 -> 70, 809 */
     #define defaultMQF2set2 85 /* changed from 80 -> 75, 809 */
25   #define defaultMQFset3 67  /* insert a new level, high, 809 */
     #define defaultMQF2set3 75 /* insert a new level, high, 809 */
     #define defaultMQFset4 58  /* changed from 70 -> 58, 809 */
     #define defaultMQF2set4 75 /* changed from 80 -> 75, 809 */
     #define defaultMQFset5 40  /* changed from 50 -> 40, 809 */
30   #define defaultMQF2set5 75 define RecoveryQualityFactor 25
     #define TruncateRecCoefNum 28
     #define DCBitsNum 6 /* This is fixed for PCM of DC */
35
     #define MappingDefaultType 1
     #define MaxForcedIteration 6
     #define MaxEmbedBlockIteration 20

40   #define NotUseZero 0 define CutOutofBoundPixels 1
     #define AllowedUpperBound 251
     #define AllowedLowerBound 4
45
     int MinQualityFactor, MinQF2;
     int EmbedRecoveryBits, StEmbedPos, EndEmbedPos, StEmbedRecPos;

50
     void GetDCTcoefficients( Img, x0, y0, block, vratio, hratio, isgray)
```

```
    int **Img, x0, y0, block[64], vratio, hratio, isgray;
    {
      int ii, jj, k, l, blockCb[64], blockCr[64], line[8];
      int PxR, PxG, PxB;
5

/*  for(jj=0; jj<vratio; jj++)
         for(ii=0; ii<hratio; ii++) { */
         for(k=0; k<8; k++) {
10
            for(l=0; l<8; l++) { line[l] = *(*(Img+x0*8+l)+y0*8+k);

15             if(!isgray) {
               PxR = (line[l] & 0xff0000) >> 16;
               PxG = (line[l] & 0xff00) >> 8;
               PxB = (line[l] & 0xff);
               block[l+k*8] = (int)floor(PxR * 0.299 + PxG * 0.587 + PxB *
20   0.114+0.5)-128;
    /*         blockCb[((l+ii*8)/hratio)+((k+jj*8)/vratio)*8]+=
                  (int)floor(PxR * (-0.168) + PxG * (-0.331) + PxB *
    0.499+0.5);
               blockCr[((l+ii*8)/hratio)+((k+jj*8)/vratio)*8]+=
25                (int)floor(PxR * 0.5 + PxG *(-0.419) + PxB *(-0.081)+0.5);
    */
            }
            else { block[l+k*8]= (line[l] & 0xff)-128;   }
            }
30       }
    /*   }   */
         fdctint(block);
     }

35
    void GetYDCTCbCrComponents( Img, x0, y0, block, blockCb, blockCr)
    int **Img, x0, y0, block[64], blockCb[64], blockCr[64];
    {
40    int ii, jj, k, l, px;
      int PxR, PxG, PxB;

for(k=0; k<8; k++) {
45        for(l=0; l<8; l++) { px = *(*(Img+x0*8+l)+y0*8+k);

PxR = (px & 0xff0000) >> 16;
50          PxG = (px & 0xff00) >> 8;
            PxB = (px & 0xff);
            block[l+k*8] = (int)floor(PxR * 0.299 + PxG * 0.587 + PxB *
    0.114+0.5)-128;
            blockCb[l+k*8]=
55             (int)floor(PxR * (-0.16874) + PxG * (-0.33126) + PxB *
    0.5+0.5+iCbOffset);
            blockCr[l+k*8]=
```

```
                    (int)floor(PxR * 0.5 + PxG *(-0.41869) + PxB *(-
         0.08131)+0.5+iCrOffset);
             }
 5       }
         fdctint(block);
     } int IntValueLimit( px, pxmin, pxmax)
10   int px, pxmin, pxmax;
     {
      int pxout;

pxout= px;
15    if(pxout < pxmin) pxout = pxmin;
      if(pxout > pxmax) pxout = pxmax;
      return pxout;
     }

20
     void GetColorRoundingValues( block, refCb, refCr)
     int block[64], refCb[64], refCr[64];
     {
      int i;
25    int pxY, pxCb, pxCr;
      int PxR, PxG, PxB;

for(i=0; i<64; i++) {
         pxY = block[i] + 128;
30       pxCb = refCb[i] - iCbOffset;
         pxCr = refCr[i] - iCrOffset;
         PxR = IntValueLimit((int)floor( pxY + 1.402* pxCr + 0.5), 0, 255);
         PxG = IntValueLimit((int)floor( pxY - 0.34414 * pxCb -
     0.71414*pxCr + 0.5), 0, 255);
35       PxB = IntValueLimit((int)floor( pxY + 1.772 * pxCb + 0.5), 0,
     255);

block[i] = (int)floor(PxR * 0.299 + PxG * 0.587 + PxB * 0.114+0.5)-
     128;
40       }

} int YCbCr2RGB( Y, Cb, Cr)
45   int Y, Cb, Cr;
     {
      int PxR, PxG, PxB;
         PxR = IntValueLimit((int)floor( Y + 1.402* Cr + 0.5), 0, 255);
         PxG = IntValueLimit((int)floor( Y - 0.34414 * Cb - 0.71414*Cr +
50   0.5), 0, 255);
         PxB = IntValueLimit((int)floor( Y + 1.772 * Cb + 0.5), 0, 255);
      return ( (PxR & 0xff) <<16) | ( (PxG & 0xff)<<8) | (PxB & 0xff) |
     0xff000000;
     }
55
```

```
    void PutWatermarkData( QT, ColorQT, Imwidth, Imheight, hratio,
    vratio, Ncolor,
                    wmkImg, Img, fcodes,  QT2, ColorQT2, RecBlockfcodes,
                    RecBitNum, EmbedBlockMap)
    unsigned char QT[8][8], ColorQT[8][8];
    int Imwidth, Imheight;
    int hratio, vratio;
    int Ncolor;
    int **wmkImg, **Img;
    char *fcodes;
    unsigned char QT2[8][8], ColorQT2[8][8];
    char **RecBlockfcodes;
    int *RecBitNum;
    char *EmbedBlockMap;
    {
    int i,j, x0, y0, isgray, pxl, f1refDCTquant, f1isEven, PxYi, PxYiorg;
    int refDCT[64], refCb[64], refCr[64];
    short V[8][8], V0[8][8], V00[8][8], px;
    int direction, coefcnt, iter, exititer, block[64], fcode[64];
    float refDCTquant, residueDCTquant;
    float diffsum, PSNR;
    int negcnt, usedcount, coefsign;
    char embrecoverybit;

diffsum = 0;

for( y0=0; y0<(Imheight/8); y0++)
        for( x0=0; x0<(Imwidth/8); x0++) { if( *(EmbedBlockMap+ x0+ y0*(Imwidth/8)) == 0) {
            for(i=0;i<8;i++)   for(j=0;j<8;j++)
                *(*(wmkImg+x0*8+i)+y0*8+j)= *(*(Img+x0*8+i)+y0*8+j);
        }
        else { if( Ncolor == 1)
            GetDCTcoefficients( Img, x0, y0, refDCT, vratio, hratio, 1);
            else
            GetYDCTCbCrComponents( Img, x0, y0, refDCT, refCb, refCr);

for(i =0; i<64;i++) fcode[i]=0;
        for(i = StEmbedPos; i <= EndEmbedPos; i++)
            fcode[i] = *(fcodes+CodesPerBlock*(x0+y0*(Imwidth/8))+i-StEmbedPos);

iter=0;
        exititer = 0;

while(exititer == 0) {
        i=0;
        j=0;
        direction=1;
        coefcnt = 0;
```

```
      exititer = 1;
      while (coefcnt<64) {
      if( (coefcnt >= StEmbedPos && coefcnt <= EndEmbedPos) ) { if(refDCT[i+j*8]>=0) coefsign = 1;
         else {coefsign = -1; refDCT[i+j*8] = -refDCT[i+j*8];} refDCTquant = (float)((refDCT[i+j*8]+4)/8)/(float)(QT[i][j]);
         flrefDCTquant = (int)floor(refDCTquant+0.5);
         flisEven = !(flrefDCTquant & 1);
         residueDCTquant = refDCTquant - (float)flrefDCTquant;

/*       if( (x0==17 && y0==4 && coefcnt == 8) ||
             (x0==3 && y0==6 && coefcnt == 8) ||
             (x0==10 && y0==7 && coefcnt == 6) ||
             (x0==15 && y0==18 && coefcnt == 8) ||
             (x0==27 && y0==20 && coefcnt == 6) ||
             (x0==1 && y0==24 && coefcnt == 6))
            printf("%d, %d, %d, %d\n",x0, y0, coefcnt, fcode[coefcnt]);
*/ if(flrefDCTquant!=0 || !NotUseZero) {
         /* Change this line at 10/12, make ">=" ==> even, "<" ==> odd,
      to have less visual impact */
         if ( (!flisEven && fcode[coefcnt] == 1) || (flisEven &&
      fcode[coefcnt] == 0) ) {
            exititer = 0;
            if (residueDCTquant >= 0) flrefDCTquant++;
            else flrefDCTquant--;
         }
         }
         V[i][j] = flrefDCTquant*(QT[i][j])*coefsign;

} else { /* Other coefficients go here */ if( refDCT[i+j*8]>=0) V[i][j] = (refDCT[i+j*8]+4)/8;
         else V[i][j] = (refDCT[i+j*8]-4)/8;

/* Must keep low-freq consistent */
   /*    if( coefcnt < StEmbedPos && V[i][j] != V00[i][j] && iter>=1)
      {
         V[i][j] = V00[i][j];
      }      */
      } if(EmbedRecoveryBits) { if( coefcnt >= StEmbedRecPos && coefcnt <= StEmbedRecPos+
      *(RecBitNum+ x0+y0*Imwidth/8) -1) { if(refDCT[i+j*8]>=0) coefsign = 1;
            else {coefsign = -1; refDCT[i+j*8] = -refDCT[i+j*8];}
```

```
            refDCTquant =
    (float)((refDCT[i+j*8]+4)/8)/(float)(QT2[i][j]);
            f1refDCTquant = (int)floor(refDCTquant+0.5);
            f1isEven = !(f1refDCTquant & 1);
            residueDCTquant = refDCTquant - (float)f1refDCTquant;
            embrecoverybit = *(*(RecBlockfcodes+ x0+y0*Imwidth/8)+
    coefcnt-StEmbedRecPos);
            if(f1refDCTquant!=0 || !NotUseZero) {
            if ( (!f1isEven && embrecoverybit == 0) || (f1isEven &&
    embrecoverybit ==1) ) {
                    exititer = 0;
                    if (residueDCTquant >= 0) f1refDCTquant++;
                    else f1refDCTquant--;
                }
            }
                V[i][j] = f1refDCTquant*(QT2[i][j])*coefsign;
            }
        }

ZigZag(&i,&j,&direction);
        coefcnt++;
    } idct(V);
        for(i=0; i<8; i++) for(j=0; j<8; j++) {
            if (V[i][j]>127) V[i][j]=127;
            if (V[i][j]<-128) V[i][j]=-128;
        }
        for(i=0; i<8; i++) for(j=0; j<8; j++) V0[i][j] = V[i][j];

/*  if(exititer == 0) {       */
        for(i=0; i<8; i++) for(j=0; j<8; j++) {
        px = V[i][j]; block[i+j*8] = (int)px; }

/*  if(x0==0 && y0==0)
        for(j=0; j<8; j++) {printf("\n");
        for(i=0; i<8; i++) printf("%d ",block[i+j*8]); } */ if(Ncolor != 1) GetColorRoundingValues( block, refCb, refCr);

/*  if(x0==0 && y0==0) {printf("\n");
        for(j=0; j<8; j++) {printf("\n");
        for(i=0; i<8; i++) printf("%d ", block[i+j*8]); } } */ fdctint(block);
            for(i=0; i<64; i++) refDCT[i] = block[i];
        iter++;
        if(iter > MaxEmbedBlockIteration) exititer = 1;
    /*  } */

/* printf("(%d,%d,%d) ", x0, y0, iter); */

}
```

```
      for(i=0; i<8; i++) for(j=0; j<8; j++) V[i][j] = V0[i][j];

for(i=0;i<8;i++)
   for(j=0;j<8;j++)
     V[i][j]+=128;

for(i=0;i<8;i++)
   for(j=0;j<8;j++)
   {
     pxl= V[i][j];
     PxYi = (unsigned char)pxl;
     if(Ncolor == 1)
   *(*(wmkImg+x0*8+i)+y0*8+j)= (PxYi<<16) | (PxYi<<8) | (PxYi) |
   0xff000000;
     else {
     *(*(wmkImg+x0*8+i)+y0*8+j)=   YCbCr2RGB( V[i][j],
                                    refCb[i+j*8]-iCbOffset,
   refCr[i+j*8]-iCrOffset);
     }
     }

}
   }

} void GenerateAuthBits( QT, ColorQT, Imwidth, Imheight, hratio,
   vratio, Ncolor,
                    Img, fcodes)
   unsigned char QT[8][8], ColorQT[8][8];
   int Imwidth, Imheight;
   int hratio, vratio;
   int Ncolor;
   int **Img;
   char *fcodes;
   {
   int i,j, x0, y0, refDCT[64], prevDCT[64], isgray, pxl, fIrefDCTquant,
   fIisEven, PxYi, PxYiorg;
   int direction, coefcnt;
   int codecount, prevcoef, refcoef;

if( Ncolor == 1) isgray = 1;
     else isgray = 0;
     codecount = 0;
```

```
    for( y0=0; y0<(Imheight/8); y0++)
    for( x0=0; x0<(Imwidth/8); x0++) {

GetDCTcoefficients( Img, x0, y0, refDCT, vratio, hratio, isgray);

/* if( (x0==31 || x0==30) && y0==31)
    for(j=0; j<8; j++) {
    for(i=0; i<8; i++)
     printf("%d ", refDCT[i+j*8]);
    printf("\n");
    } */ if( x0%2 == 0 ) {
        for(i=0; i<64; i++) prevDCT[i] = refDCT[i];
    }
    else
    {
    i=0; j=0;  direction=1;  coefcnt = 0;
    while (coefcnt< (2*CodesPerBlock) ) {

/* Debug */
    /*   if(x0==5 && y0==0) printf("(%d,%d,%d)", coefcnt,
    (prevDCT[i+j*8]+4)/8, (refDCT[i+j*8]+4)/8); */

/*   if (prevDCT[i+j*8]>=0) prevcoef = (prevDCT[i+j*8]+4)/8;
         else prevcoef = (prevDCT[i+j*8]-4)/8;

if( refDCT[i+j*8]>=0) refcoef = (refDCT[i+j*8]+4)/8;
         else refcoef = (refDCT[i+j*8]-4)/8; */ if (prevDCT[i+j*8]>=0) prevcoef = prevDCT[i+j*8];
         else prevcoef = -prevDCT[i+j*8];

if( refDCT[i+j*8]>=0) refcoef = refDCT[i+j*8];
         else refcoef = -refDCT[i+j*8];

/*   if(x0 == 31 && y0==10) printf("Direct:: prev:%d
    ref:%d\n",prevcoef, refcoef); */ if( prevcoef >= refcoef )   /*Make it more precise */
           *(fcodes+codecount) = 1;
         else
           *(fcodes+codecount) = 0;

ZigZag(&i,&j,&direction);
         coefcnt++;
         codecount++;
      }
    }
    }
    /* printf("\n Authentication Bits from original image: ");
    x0=4; y0=0; coefcnt=2;
    printf("(%d, %d, %d, %d)\n", x0, y0, coefcnt+StEmbedPos, *(fcodes+
    (x0+y0*Imwidth/8)*CodesPerBlock + coefcnt)); */
```

```
    } void MappingPosition(blx ,bly , Imwidth, Imheight, mapmode)
    int *blx, *bly, Imwidth, Imheight, mapmode;
    {
        int M, N;

M = Imwidth / 8;
        N = Imheight / 8;

if(MappingDefaultType == 1) { if(mapmode == 1) { if( *blx < M/2 &&  *bly <N/2 ) { *blx = M/2 - *blx -1; *bly =
    *bly+ N/2;}
            else if( *blx < M/2 && *bly >= N/2) { *blx = M - *blx -1; *bly =
    *bly - N/2;}
            else if( *blx >= M/2 && *bly <N/2) { *blx = M - *blx -1 + M/2;
    *bly = *bly+ N/2;}
            else { *blx = M - *blx - 1; *bly = *bly - N/2;}

}
        else if(mapmode == -1) {
            if( *blx < M/2 && *bly <N/2 ) { *blx = M - *blx -1; *bly = *bly+
    N/2;}
            else if( *blx < M/2 && *bly >= N/2) { *blx = M/2 - *blx -1; *bly =
    *bly - N/2;}
            else if( *blx >= M/2 && *bly <N/2) { *blx = M - *blx -1; *bly =
    *bly+ N/2;}
            else { *blx = M - *blx -1 + M/2; *bly = *bly - N/2;}
        }
        } else if(MappingDefaultType == 2) { if(mapmode == 1) { if( *blx < M/2 &&  *bly <N/2 ) { *blx = M/2 - *blx -1; *bly =
    *bly+ N/2;}
            else if( *blx < M/2 && *bly >= N/2) { *blx = M/2 + *blx; *bly =
    *bly - N/2;}
            else if( *blx >= M/2 && *bly <N/2) { *blx = M - *blx -1 + M/2;
    *bly = *bly+ N/2;}
            else { *blx = *blx - M/2; *bly = *bly - N/2;}

}
        else if(mapmode == -1) {
            if( *blx < M/2 && *bly <N/2 ) { *blx = M/2 + *blx; *bly = *bly+
    N/2;}
            else if( *blx < M/2 && *bly >= N/2) { *blx = M/2 - *blx -1; *bly =
    *bly - N/2;}
            else if( *blx >= M/2 && *bly <N/2) { *blx = *blx -M/2; *bly =
    *bly+ N/2;}
            else { *blx = M - *blx -1 + M/2; *bly = *bly - N/2;}
```

```
        }
      }

} void  RearrangeAuthBits(fcodes, Imwidth, Imheight)
    char *fcodes;
    int Imwidth, Imheight;
    {
    int i, j, k, i1, j1;
    int mapmode;
    char *newfcodes;

mapmode = 1;
        newfcodes = (char *)malloc(CodesPerBlock*Imwidth*Imheight/64);

for(i=0; i< (Imwidth/8); i++)
        for(j=0; j< (Imheight/8); j++)
        for(k=0; k< CodesPerBlock; k++) { i1 = i; j1=j;
        MappingPosition( &i1 , &j1, Imwidth, Imheight, mapmode);

*(newfcodes + (i1+j1*(Imwidth/8))*CodesPerBlock + k) =
           *(fcodes + (i+j*(Imwidth/8))*CodesPerBlock + k);
        } for(i=0; i< (Imwidth/8) *  (Imheight/8) * CodesPerBlock; i++)
           *(fcodes+i) = *(newfcodes+i);
    } void QuantizeDCTcoefficient( DCTcoef, QT)
    int DCTcoef[64];
    unsigned char QT[8][8];
    {
       int i,j;
       int coefsign;
       float refDCTquant;

for(j=0; j<8; j++)
       for(i=0; i<8; i++) {

/*    if(i==0 && j==0) printf(" <%d,", DCTcoef[i+j*8]); */ if(DCTcoef[i+j*8] >=0) coefsign=1;
         else {coefsign=-1; DCTcoef[i+j*8] = -DCTcoef[i+j*8];} refDCTquant = (float)((DCTcoef[i+j*8]+4)/8)/(float)(QT[i][j]);
         DCTcoef[i+j*8] = (int)floor(refDCTquant+0.5) * coefsign;
    /*    if(i==0 && j==0) printf(" %d, %d>", DCTcoef[i+j*8], QT[i][j]);
    */
       }
```

```
    } void TruncateDCTcoefficient( decDCT, trc)
    int decDCT[64];
    int trc;
    {
     int i, j, direction, cnt;

i=0;j=0;direction=1;cnt=0;
     while(cnt<64) {
            if(cnt>=trc) decDCT[cnt]=0;
            ZigZag(&i,&j,&direction);
            cnt++;
     }
    } int GetYvalue(px)
    int px;
    {
    int PxR, PxG, PxB;
            PxR = (px & 0xff0000) >> 16;
            PxG = (px & 0xff00) >> 8;
            PxB = (px & 0xff);
            return (int)floor(PxR * 0.299 + PxG * 0.587 + PxB *
    0.114+0.5);
    } int GetAveragePixel(refImg, i, j, isgray)
    int **refImg, i, j, isgray;
    {
    int avegpx;

if(isgray) avegpx =  ( (*(*(refImg+i*2)+j*2) & 0xff) +
                              (*(*(refImg+i*2+1)+j*2) & 0xff) +
                              (*(*(refImg+i*2)+j*2+1) & 0xff) +
                              (*(*(refImg+i*2+1)+j*2+1) & 0xff) + 2 ) / 4;
       else avegpx =  ( GetYvalue(*(*(refImg+i*2)+j*2)) +
                        GetYvalue(*(*(refImg+i*2+1)+j*2)) +
                        GetYvalue(*(*(refImg+i*2)+j*2+1)) +
                        GetYvalue(*(*(refImg+i*2+1)+j*2+1)) + 2 ) /
    4;
    return avegpx;
    } void GenerateRecoveryBits( QTrec, ColorQTrec, Imwidth, Imheight,
                               hratio, vratio, Ncolor, refImg, RecECBits,
    RecECBitNum)
    unsigned char QTrec[8][8], ColorQTrec[8][8];
    int Imwidth, Imheight;
    int hratio, vratio;
    int Ncolor;
    int **refImg;
```

```
      char **RecECBits;
      int *RecECBitNum;
      {
        int i,j, k, x0, y0, isgray;
 5      int **decImg;
        short V[8][8];
        int decDCT[64], prevDC, tmpDC;
        unsigned char *ecbits;
        int ecbitnums, etotalnums;
10
        decImg=(int **)malloc(Imwidth/2*8L);
        for(i=0;i<Imwidth/2;i++)
         *(decImg+i)=(int *)malloc(Imheight/2*4L);
15
        if( Ncolor == 1) isgray = 1;
        else isgray = 0;

for(j=0; j<Imheight/2; j++)
20      for(i=0; i<Imwidth/2; i++) {
         *(*(decImg+i)+j) = GetAveragePixel(refImg, i, j, isgray);
        }

25      InitialHuffmanTables();

/* RecECBits = (char **)malloc(Imwidth/16*Imheight/16*8L); */
        /* RecECBitNum = (int *)malloc(Imwidth/16*Imheight/16*8L); */
        etotalnums=0;
30
        isgray=1; /*because we only embed one channel now */ for(y0=0; y0<Imheight/16; y0++) {
            prevDC=0;
35      for(x0=0; x0<Imwidth/16; x0++) {

GetDCTcoefficients( decImg, x0, y0, decDCT, vratio, hratio,
      isgray);
          QuantizeDCTcoefficient( decDCT, QTrec);
40        TruncateDCTcoefficient( decDCT, TruncateRecCoefNum);

tmpDC = decDCT[0];
        /*   decDCT[0] = decDCT[0] - prevDC;  */ /* DPCM */

45      /*  printf("(DC:%d, diffDC:%d) ",tmpDC, decDCT[0]); */ ecbits = (unsigned char *)malloc(1024L);

GetBlockEntropyCode(decDCT, ecbits, &ecbitnums, DCBitsNum);
50
          *(RecECBits+ x0 + y0*Imwidth/16) = (char *)malloc(ecbitnums);
          for(k=0; k<ecbitnums; k++)
              *(*(RecECBits+ x0 + y0*Imwidth/16) +k) = (char)*(ecbits+k);
          *(RecECBitNum + x0 + y0* (Imwidth/16)) = ecbitnums;
55      /*  printf("((%d,%d,%d))\n",x0,y0,*(RecECBitNum + x0 + y0*
      (Imwidth/16))); */
```

```
        prevDC = tmpDC;
        free(ecbits);
        etotalnums +=ecbitnums;
    }
}
    free(decImg);
    printf("\nTotal Embedded Bits: %d\n", etotalnums +
CodesPerBlock*Imwidth*Imheight/64);
} void  RearrangeRecoveryBits(recfcodes, recfcodenum,
                            recblockfcodes, recblbitnum, Imwidth,
Imheight)
char **recfcodes;
int *recfcodenum;
char **recblockfcodes;
int *recblbitnum;
int Imwidth, Imheight;
{
int i, j, k, i1, j1, x0, y0, cntnum;
int mapmode, blockbitno, smbno, sblockno;

mapmode = -1;
    for(j=0; j< (Imheight/8); j++)
    for(i=0; i< (Imwidth/8); i++) { x0=i; y0=j;
        MappingPosition( &x0 , &y0, Imwidth, Imheight, mapmode);

smbno = *(recfcodenum+ (x0/2)+ (y0/2)*(Imwidth/16));
        blockbitno = smbno / 4;
        sblockno = x0%2 + (y0%2)*2;
        if( sblockno < ( smbno %4) ) blockbitno++;

/*      printf("(%d,%d,%d,%d,%d) \n",i,j,x0,y0,smbno); */

*(recblbitnum + i + j*Imwidth/8) = blockbitno;

*(recblockfcodes + i + j*Imwidth/8) = (char
*)malloc(blockbitno);
        for( cntnum = 0; cntnum< blockbitno ; cntnum++)
            *(*(recblockfcodes + i + j * Imwidth/8) + cntnum)
                = *(*(recfcodes + x0/2 + (y0/2) * (Imwidth/16)) +
cntnum*4 + sblockno);

/*      if((x0/2)==0 && (y0/2)==0) {
            printf("\n[");
            for( cntnum = 0; cntnum< blockbitno ; cntnum++)
                printf("%d", *(*(recblockfcodes + i + j * Imwidth/8) +
cntnum));
            printf("]]\n");
        } */
```

```
        }

} void GetQualityFactors(QRmode)
    int QRmode;
    {
    if(QRmode == 4) {  MinQualityFactor = defaultMQFset5;
                       MinQF2 = defaultMQF2set5; }
     else if(QRmode == 3) {  MinQualityFactor = defaultMQFset4;
                       MinQF2 = defaultMQF2set4; }
     else if(QRmode == 2) {  MinQualityFactor = defaultMQFset3;
                       MinQF2 = defaultMQF2set3; }
     else if(QRmode == 1) {  MinQualityFactor = defaultMQFset2;
                       MinQF2 = defaultMQF2set2; }
     else { MinQualityFactor = defaultMQFset1;
                       MinQF2 = defaultMQF2set1; }
    } int BoundLimit(px, ub, lb)
    int px, ub, lb;
    {
     int pxr, pxg, pxb;
     int repx;

pxr = (px & 0xff0000) >> 16; pxg = (px & 0xff00) >> 8;
     pxb = px & 0xff;
     if(pxr < lb) pxr = lb; if(pxr > ub) pxr = ub;
     if(pxg < lb) pxg = lb; if(pxg > ub) pxg = ub;
     if(pxb < lb) pxb = lb; if(pxb > ub) pxb = ub;
     repx = (px & 0xff000000) | (pxr << 16) | (pxg << 8) | pxb;

return repx;
    } float GetPSNR(refImg, outImg, Imw, Imh)
    int refImg, outImg, Imw, Imh;
    {
    int i, j, px, pxr, pxg, pxb, px1;
    float pxrd, pxgd, pxbd, ErrorSum;

ErrorSum = 0.0;
     for(j=0; j< Imh; j++)
     for(i=0; i< Imw; i++)
        {
            px = *(*(refImg+i)+j);
            pxr = (px & 0xff0000) >> 16; pxg = (px & 0xff00) >> 8;
            pxb = px & 0xff;
```

```
              px1 =   *(*(outImg+i)+j);
              pxrd = (float)((px1 & 0xff0000) >> 16) - (float)pxr;
              pxgd = (float)((px1 & 0xff00) >> 8) - (float)pxg;
              pxbd = (float)(px1 & 0xff) - (float)pxb;
5             ErrorSum += (float)pxrd*pxrd + (float)pxgd*pxgd +
       (float)pxbd*pxbd;
          }
       return 10*log((float)255*255*3*Imw*Imh/ErrorSum) / log(10.0);
      }
10 void embedwatermark(defaultQF, refImg, outImg, Imw, Imh, embedmode,
15     QRmode)
       int defaultQF;
       int **refImg, **outImg;
       int Imw, Imh;
       int embedmode;
20     int QRmode;
       { unsigned char hratio, vratio, Ncolor;
       unsigned char QT[8][8], ColorQT[8][8], mqfpar[4];
25     unsigned char QT2[8][8], ColorQT2[8][8], QTrec[8][8],
       ColorQTrec[8][8];
       int DRI, num, i,j, direction, px, Imwidth, Imheight, mapmode;
       char *fcodes, *prevfcodes, **recfcodes;
       FILE *Infile, *Outfile;
30     int fi, forcediteration, *recfcodenum, *RecBitNum, exitfciter,
       errorfcent, preverfcent;
       char **RecBlockfcodes, *EmbedBlockMap;

35     /* Set Global Parameters */
       if(embedmode == 0) EmbedRecoveryBits = 0;
       else EmbedRecoveryBits = 1;
       StEmbedPos = CodesPerBlock*2;
       EndEmbedPos = CodesPerBlock*3-1;
40     StEmbedRecPos = CodesPerBlock*3;
       GetQualityFactors( QRmode);
       printf("QRmode=%d\n", QRmode);

/*Temp*/
45     defaultQF = MinQualityFactor;

GetQuantizationTable(defaultQF, QT, ColorQT);
       GetQuantizationTable(MinQF2, QT2, ColorQT2);
       GetQuantizationTable(RecoveryQualityFactor, QTrec, ColorQTrec);
50
       /*Decide Color or mono */
       vratio = 1;   hratio = 1; Ncolor = 1; i=0;
       while(i< Imw*Imh && Ncolor ==1) {
          px =   *(*(refImg+(i%Imw))+(i/Imw));
55        if( (px & 0xff) != ((px & 0xff00) >> 8) ||
             ((px & 0xff00) >> 8) != ((px & 0xff0000) >> 16) ||
             (px & 0xff) != ((px & 0xff0000) >> 16) )
```

49

```
            {hratio = 2; vratio = 2; Ncolor = 3;
            /* printf("Color:%d, %d,%d,%d\n", i, (px & 0xff),  ((px &
     0xff00) >> 8),
              ((px & 0xff0000) >> 16)); */
            }
        i++;
      }
  /*  printf("hr=%d, vr=%d, Nc=%d\n\n", hratio, vratio, Ncolor);    */

Imwidth =  (int)Imw;   Imheight = (int)Imh;

/* CutBoundaryPixels for convergence */
    if(CutOutofBoundPixels) {
       for(j=0; j< Imh; j++)
       for(i=0; i< Imw; i++)
       {
          px =  *(*(refImg+i)+j);
          *(*(refImg+i)+j) = BoundLimit(px, AllowedUpperBound,
    AllowedLowerBound);
       }
     }

/* tmp: use monochrome only */
    fcodes = (char *)malloc(CodesPerBlock*Imwidth*Imheight/64);

GenerateAuthBits( QT, ColorQT, Imwidth, Imheight,
                (int)hratio, (int)vratio, Ncolor, refImg, fcodes);

RearrangeAuthBits(fcodes, Imwidth, Imheight);

if(EmbedRecoveryBits) { recfcodenum = (int *)malloc(Imwidth/16*Imheight/16*8L);
         recfcodes = (char **)malloc(Imwidth/16*Imheight/16*8L);
         for(i=0; i<(Imwidth/16*Imheight/16); i++)
            *(recfcodes+i) = (char *)malloc(1024L);

GenerateRecoveryBits( QTrec, ColorQTrec, Imwidth, Imheight,
                (int)hratio, (int)vratio, Ncolor, refImg, recfcodes,
    recfcodenum);

RecBlockfcodes = (char **)malloc(Imheight/8*Imwidth/8*8L);
         RecBitNum = (int *)malloc(Imheight/8*Imwidth/8*8L);

RearrangeRecoveryBits( recfcodes, recfcodenum, RecBlockfcodes,
                        RecBitNum, Imwidth, Imheight);
         free(recfcodes); free(recfcodenum);
     }
```

50

```
    EmbedBlockMap = (char *)malloc(Imwidth/8*Imheight/8);
    for(i=0; i< Imwidth/8*Imheight/8 ; i++) *(EmbedBlockMap+i) = 1;

5   PutWatermarkData( QT, ColorQT, Imwidth, Imheight,
                (int)hratio, (int)vratio, Ncolor, outImg, refImg,
    fcodes,
                QT2, ColorQT2, RecBlockfcodes, RecBitNum,
    EmbedBlockMap);
10
    /*temp for debug */
    vratio = 1;  hratio = 1; Ncolor = 1; i=0;
    while(i< Imw*Imh && Ncolor ==1) {
        px = *(*(outImg+(i%Imw))+(i/Imw));
15      if( (px & 0xff) != ((px & 0xff00) >> 8) ||
            ((px & 0xff00) >> 8) != ((px & 0xff0000) >> 16) ||
            (px & 0xff) != ((px & 0xff0000) >> 16) )
            {hratio = 2; vratio = 2; Ncolor = 3;
    /*      printf("Color:%d, %d,%d,%d\n", i, (px & 0xff),  ((px &
20  0xff00) >> 8),
            ((px & 0xff0000) >> 16)); */
            }
        i++;
    }
25  /* printf("hr=%d, vr=%d, Nc=%d\n\n", hratio, vratio, Ncolor);     */
    printf("PSNR = %f dB\n", GetPSNR(refImg, outImg, Imwidth,
    Imheight));

prevfcodes = (char *)malloc(CodesPerBlock*Imwidth*Imheight/64);
30  forcediteration = 1; exitfciter = 0; preverfcnt =
    CodesPerBlock*Imwidth*Imheight/64;
    while ( !exitfciter && (forcediteration < MaxForcedIteration) ) { for(i=0; i<Imwidth; i++) for(j=0; j< Imheight; j++) *(*(refImg+i)+j)
35  = *(*(outImg+i)+j);

for(i=0; i<CodesPerBlock*Imwidth*Imheight/64; i++)
            *(prevfcodes+i) = *(fcodes+i);

40  GenerateAuthBits( QT, ColorQT, Imwidth, Imheight,
                (int)hratio, (int)vratio, Ncolor, refImg, fcodes);

RearrangeAuthBits(fcodes, Imwidth, Imheight);

45  /* debug */
    /* Outfile = fopen("fcodes.dat","wb");
      for(i=0; i<CodesPerBlock*Imwidth*Imheight/64; i++) {
        fprintf(Outfile, "%c", *(fcodes+i));
      }
50  fclose(Outfile); */ exitfciter = 1; errorfccnt = 0;
    for(i=0; i<CodesPerBlock*Imwidth*Imheight/64; i++) *(EmbedBlockMap +
    (i / CodesPerBlock) ) = 0;
55  for(i=0; i<CodesPerBlock*Imwidth*Imheight/64; i++) {
        if ( *(fcodes+i) != *(prevfcodes+i) ) {
            exitfciter = 0; errorfccnt++;
```

```
       *(EmbedBlockMap + (i / CodesPerBlock) ) = 1; }
    }
    /*  printf("hr=%d, vr=%d, Nc=%d\n\n", hratio, vratio, Ncolor);   */ if( errorfccnt == 0) exitfciter = 1;
    preverfccnt = errorfccnt;

if(!exitfciter)
    PutWatermarkData( QT, ColorQT, Imwidth, Imheight,
                (int)hratio, (int)vratio, Ncolor, outImg, refImg,
    fcodes,
                QT2, ColorQT2, RecBlockfcodes, RecBitNum,
    EmbedBlockMap);

forcediteration ++;

/* if(forcediteration == MaxForcedIteration) {
        printf("Exceed Max Forced Iteration: errorfccnt = %d \n",
    errorfccnt);
      } */

}

/* We cannot calculate the PSNR here because this the refImg has been
  changed */
  /* printf("PSNR = %f dB\n", GetPSNR(refImg, outImg, Imwidth,
  Imheight)); */

}
```

APPENDIX B:

SOURCE CODE OF SOFTWARE FOR AUTHENTICATION OF DATA AND GENERATION OF RECOVERY DATA FOR REPLACING REJECTED DATA SETS

```
/* This is a BW JPEG decoder */ include <stdio.h>
include <string.h>
#include <math.h>
#include "embedwaterglobal.h"

/* Threshold for Photoshop 3.0: max:85, high:75, med:58, low:40 */
#define defaultMQFset1 85  /* changed from 90 -> 85, 809 */
#define defaultMQF2set1 85 /* changed from 90 -> 85, 809 */
#define defaultMQFset2 75  /* changed from 80 -> 70, 809 */
#define defaultMQF2set2 85 /* changed from 80 -> 75, 809 */
#define defaultMQFset3 67  /* insert a new level, high, 809 */
#define defaultMQF2set3 75 /* insert a new level, high, 809 */
#define defaultMQFset4 58  /* changed from 70 -> 58, 809 */
#define defaultMQF2set4 75 /* changed from 80 -> 75, 809 */
#define defaultMQFset5 40  /* changed from 50 -> 40, 809 */
#define defaultMQF2set5 75
define TotalMQFsets 5 define RecoveryQualityFactor 25
define TruncateRecCoefNum 28 /* default 28 */
define DCBitsNum 6 define ClusterThreshold 2  /* default 2 */
define MappingDefaultType 1 define ShowErrorColor 0xffffffff
define ShowNoAuthColor 0xff0000ff define NoAuthRatio 0.95 define DebugNow 0
define DebugJPEG 0 int Tau;
int ErrorBlockNumber;
int DoNotAuthenticate;
int MinQualityFactor, MinQF2;
int EmbedRecoveryBits, StEmbedPos, EndEmbedPos, StEmbedRecPos;
void detectRawwatermarkMain(int **orgImg, int **Img, int Imwidth,
                            int Imheight, int authmode);

void DealErrorMap(markImg, errormap, newerrormap, Imwidth, Imheight)
int **markImg;
char *errormap, *newerrormap;
```

```
      int Imwidth, Imheight;
      {
      int i,j,M,N,ipoint, jpoint,ipoint2, jpoint2, px,py, imin, imax,
          jmin, jmax, neighborweight, in, jn;

M=Imwidth/8;
        N=Imheight/8;

for(i=0;i<M*N;i++) *(newerrormap+i) = *(errormap+i);

/* Use clustering */ for(j=0;j<N;j++)
        for(i=0;i<M;i++) { if( *(errormap+i+j*M) > 0 ) { ipoint = (i/2)*2; jpoint = j;
            ipoint2 = (i/2)*2+1; jpoint2 = j;
            MappingPosition(&ipoint, &jpoint, Imwidth, Imheight, 1);
            MappingPosition(&ipoint2, &jpoint2, Imwidth, Imheight, 1);

if( *(errormap+ipoint+jpoint*M) == 0 &&
      *(errormap+ipoint2+jpoint2*M) == 0 ) {
               /*  *(newerrormap+i+j*M) = 0;   */
               ipoint = i; jpoint = j;
               MappingPosition(&ipoint, &jpoint, Imwidth, Imheight, -1);
               ipoint = (ipoint/2)*2; ipoint2 = ipoint+1;

if( *(newerrormap+ipoint+jpoint*M) >0 ||
      *(newerrormap+ipoint2+jpoint*M) >0 ) {
                  *(newerrormap+i+j*M) = 0;
                  *(newerrormap+ipoint+jpoint*M) += 1;
                  *(newerrormap+ipoint2+jpoint*M) += 1;
               }
               else {
                 neighborweight = 0;
                 imin = ipoint-2; if(imin<0) imin=0;
                 imax = ipoint2+2; if(imax>=M) imax=M-1;
                 jmin = jpoint-2; if(jmin<0) jmin=0;
                 jmax = jpoint+2; if(jmax>=N) jmax=N-1;
                 for( in=imin; in<=imax; in++) for(jn=jmin; jn<=jmax; jn++)
                     neighborweight += *(errormap+in+jn*M);
                 if(neighborweight >= ClusterThreshold) { /* two adajcent
      blocks are error */
                    *(newerrormap+i+j*M) = 0;
                    *(newerrormap+ipoint+jpoint*M) += 1;
                    *(newerrormap+ipoint2+jpoint*M) += 1;
                 }
              }
           }
         }
        }

/* use decision */
        /*  for(j=0;j<N;j++)
```

```
    for(i=0;i<M;i++) { if( *(errormap+i+j*M) > 0 ) {
        ipoint = (i/2)*2; jpoint = j;
        ipoint2 = (i/2)*2+1; jpoint2 = j;
        MappingPosition(&ipoint, &jpoint, Imwidth, Imheight, 1);
        MappingPosition(&ipoint2, &jpoint2, Imwidth, Imheight, 1);

if( *(errormap+ipoint+jpoint*M) == 0 &&
  *(errormap+ipoint2+jpoint2*M) == 0 ) {
          *(newerrormap+i+j*M) = 0;
          ipoint = i; jpoint = j;
          MappingPosition(&ipoint, &jpoint, Imwidth, Imheight, -1);
          ipoint = (ipoint/2)*2; ipoint2 = ipoint+1;
          *(newerrormap+ipoint+jpoint*M) += 1;
          *(newerrormap+ipoint2+jpoint*M) += 1;
        }
      }
    } */

/* label as error */
    ErrorBlockNumber = 0;
    for(j=0;j<N;j++)
    for(i=0;i<M;i++) { if( *(newerrormap+i+j*M) > 0 ) {
        ErrorBlockNumber++;
        for(py=0;py<8;py++)
        for(px=0;px<8;px++)
          *(*(markImg+i*8+px)+j*8+py) = ShowErrorColor;
      }
      if( DoNotAuthenticate) {
        for(py=0;py<8;py++)
        for(px=0;px<8;px++)
          *(*(markImg+i*8+px)+j*8+py) = ShowNoAuthColor;
      }

}
  } void ReadJPGData(Infile,dcV,dcCW,dcsymbol,acV,acCW,acsymbol,
  ColordcV,ColordcCW,Colordcsymbol,ColoracV,ColoracCW,Coloracsymbol,
                   RSTInterval, QT, ColorQT, Imwidth, Imheight, hratio,
  vratio, Ncolor,
                   fcode)
  FILE *Infile;
  unsigned char *dcV[],*dcCW[];
  unsigned int dcsymbol[];
  unsigned char *acV[],*acCW[];
  unsigned int acsymbol[];
  unsigned char *ColordcV[],*ColordcCW[];
  unsigned int Colordcsymbol[];
  unsigned char *ColoracV[],*ColoracCW[];
```

```
      unsigned int Coloracsymbol[], RSTInterval;
      unsigned char QT[8][8], ColorQT[8][8];
      int Imwidth, Imheight;
      int hratio, vratio;
 5    unsigned char Ncolor;
      char *fcode;
      {
        unsigned char ibit[24], DCdifflength, AC1, R, V_length, fp, qtv,
      ImgY, Cb, **Cr, fpsgn;
10      int EOI, bitpos, i,j,k, ii, DCdiffvalue, positive, DClast, lMCU,
            direction, zzlength, EOB, ZRL, zzzrl, MCU, InsertZero, istzero,
      x0,y0,
            Allread, pxl, inMCU, DCCblast, DCCrlast, acount, cloop, PxYi,
      usedcount;
15      float PxRf, PxGf, PxBf;
        unsigned char PxY, PxCb, PxCr;
        short V[8][8], Vprev[8][8], VCbprev[8][8], VCrprev[8][8], vpsgn,
      fal, pxs, pxm;
        int Gotx0y0End, AuthEqualBits, TotalAuthBits;
20
        if(DebugNow) printf("vratio=%d\n", vratio);
        ImgY=(unsigned char **)malloc(Imwidth*8);
        for(x0=0;x0<Imwidth;x0++)
         *(ImgY+x0)=(unsigned char *)malloc(Imheight);
25
        if(Ncolor == 3) {
          Cb=(unsigned char **)malloc(Imwidth/hratio*8);
          for(x0=0; x0<Imwidth/hratio; x0++)
            *(Cb+x0) = (unsigned char *)malloc(Imheight/vratio);
30        Cr= (unsigned char **)malloc(Imwidth/hratio*8);
          for(x0=0; x0<Imwidth/hratio; x0++)
             *(Cr+x0) = (unsigned char *) malloc(Imheight/vratio);
        }

35      for(i=0;i<8;i++) for(j=0;j<8;j++)
              {Vprev[i][j]=0; VCbprev[i][j]=0; VCrprev[i][j]=0;}

40    EOI=0;
      bitpos=0;
      MCU=0;
      inMCU=0;
      lMCU=0;
45    DClast=0;
      DCCblast=0;
      DCCrlast=0;
      acount=0;
      AuthEqualBits = 0; TotalAuthBits = 0;
50    while(EOI!=1)
      { if(RSTInterval>0 && lMCU==RSTInterval)
55    {
       lMCU=0;
       while(EOI != 2) EOI=ReadData(Infile,ibit,&bitpos,EOI);
```

```
/*  printf("RESET !!!, MCU=%d, EOI=%d\n", MCU, EOI); */
/*  if(EOI != 2) MCU -= RSTInterval; */
  EOI =0;
  bitpos=0; DClast=0; DCCblast=0; DCCrlast=0;

} while(bitpos<16)
    EOI=ReadData(Infile,ibit,&bitpos,EOI);

if(inMCU<hratio*vratio)

DCdifflength=GetCodewordLength(Infile,dcV,dcCW,dcsymbol,ibit,&bitpos)
;
  else

DCdifflength=GetCodewordLength(Infile,ColordcV,ColordcCW,Colordcsymbo
l,ibit,&bitpos);

while(bitpos<DCdifflength)
    EOI=ReadData(Infile,ibit,&bitpos,EOI);

DCdiffvalue=GetCodeValue(ibit,&bitpos,DCdifflength);

direction=-1; zzlength=2;  i=1;  j=0; EOB=0;  ZRL=0;
InsertZero=0;
  while(zzlength<=64)
  { if(EOB==0 && ZRL==0 && InsertZero==0)
  {
   while(bitpos<16)
     EOI=ReadData(Infile,ibit,&bitpos,EOI);

if(inMCU<hratio*vratio)
     AC1=GetCodewordLength(Infile,acV,acCW,acsymbol,ibit,&bitpos);
   else AC1=GetCodewordLength(Infile,ColoracV,ColoracCW,Coloracsymbol,ibit,&b
itpos);

R=AC1>>4;
   V_length= AC1 & 0x0f;

if(R==0 && V_length==0)
    EOB=1;
   else if(R==15 && V_length==0)
       { ZRL=1; zzzrl=zzlength;} else if(R!=0)
       { InsertZero=1; istzero=zzlength;}

}
```

```
   /* printf("zzlength=%d, EOB=%d\n", zzlength, EOB); */
     if(zzlength-istzero==R)
        InsertZero=0;

if(EOB==0 && ZRL==0 && InsertZero==0)
     { while(bitpos<V_length)
        EOI=ReadData(Infile,ibit,&bitpos,EOI);   /* Insufficient bits.
   Read more bits */

V[i][j]=GetCodeValue(ibit,&bitpos,V_length);

} else V[i][j]=0;

if(zzlength-zzzrl==15)
        ZRL=0;

// printf("Here!\n");

/* Zig-Zag */

ZigZag(&i,&j,&direction);

zzlength++;
     }

/* Reconstruct DCT Coefficients */ if(inMCU < hratio*vratio) {
     DClast=DClast+DCdiffvalue;
     V[0][0]=DClast;
     }
     else if(inMCU == hratio*vratio) {
     DCCblast = DCCblast + DCdiffvalue;
     V[0][0] = DCCblast;
     }
     else if(inMCU == hratio*vratio+1) {
     DCCrlast = DCCrlast + DCdiffvalue;
     V[0][0] = DCCrlast;
     }
/*  printf("To DCT 1, MCU=%d, Imwidth=%d, hratio=%d, vratio=%d\n",
   MCU, Imwidth, hratio, vratio); */
     /* Current Position */
        x0=MCU%(Imwidth/(8*hratio));
        y0=MCU/(Imwidth/(8*hratio)); /* change from vratio => hratio at
   10/30 */
        if(Ncolor ==3 && inMCU< hratio*vratio) {
        x0=x0*hratio+inMCU%hratio;
```

```
      y0=y0*vratio+inMCU/hratio;
    }

/*Debug */
/*  printf("[%d, %d, %d, %d, %d] \n", x0, y0, MCU, hratio, vratio);
*/

/*  if((x0==4 || x0==5) && y0==0) printf("V(%d,%d) ", x0,
V[0][1]); */

/* Change here */
    if(inMCU< hratio*vratio) { if( x0%2 ==0)
    {
      for(i=0;i<8;i++) for(j=0;j<8;j++) Vprev[i][j] = V[i][j];
    }
    else {
      i=0;j=0;direction=1;fal=0;
      for(cloop=0; cloop< (CodesPerBlock*2); cloop++)
      {

/* 731 change here */
        if(Vprev[i][j]<0) Vprev[i][j] = -Vprev[i][j];
        if(V[i][j]<0) V[i][j] = -V[i][j];
        if(Vprev[i][j]-V[i][j]> Tau) *(fcode +
((x0/2)*2+y0*Imwidth/8)*CodesPerBlock+cloop) = 1;
        else if( Vprev[i][j]-V[i][j]< -Tau ) *(fcode +
((x0/2)*2+y0*Imwidth/8)*CodesPerBlock +cloop) = -1;
        else *(fcode + ((x0/2)*2+y0*Imwidth/8)*CodesPerBlock + cloop) = 0;

/* 1029 Add this */
        if( Vprev[i][j] == V[i][j] ) AuthEqualBits++;
        TotalAuthBits ++;

/*  if(x0 == 31 && y0==10) printf("prev:%d ref:%d\n",
Vprev[i][j]*QT[i][j], V[i][j]*QT[i][j]);  */

ZigZag(&i,&j,&direction);
      }
    }
    } if(Ncolor == 3) {inMCU++; if(inMCU == hratio*vratio+2) {MCU++;
lMCU++; inMCU=0;} }
    else{MCU++;   lMCU++;}

/* Tempory disable this at 10/16 */
/*  printf("EOI=%d, inMCU = %d, MCU=%d\n", EOI, inMCU, MCU);  */
    if(EOI==3) EOI=1;
    if(EOI==1 && inMCU!=0) {EOI=3; fseek(Infile, -2L, SEEK_CUR);}
/*  if(EOI==1 && inMCU!=0) {EOI=0; fseek(Infile, -2L, SEEK_CUR);} */
```

```
    } if(DebugJPEG) { printf("\n Authentication Bits from new image: ");
    for(i=0;i<20;i++) printf("%d", *(fcode+i)); }

DoNotAuthenticate = 0;
    if ( ((float)AuthEqualBits / (float) TotalAuthBits) >= NoAuthRatio)
    DoNotAuthenticate = 1;

} void DetectWatermarkData(Infile,dcV,dcCW,dcsymbol,acV,acCW,acsymbol,

ColordcV,ColordcCW,Colordcsymbol,ColoracV,ColoracCW,Coloracsymbol,
                RSTInterval, QT, ColorQT, Imwidth, Imheight, hratio,
vratio, Ncolor,
                Img, fcode, DeQT, DeColorQT, newerrormap)
FILE *Infile;
unsigned char *dcV[],*dcCW[];
unsigned int dcsymbol[];
unsigned char *acV[],*acCW[];
unsigned int acsymbol[];
unsigned char *ColordcV[],*ColordcCW[];
unsigned int Colordcsymbol[];
unsigned char *ColoracV[],*ColoracCW[];
unsigned int Coloracsymbol[], RSTInterval;
unsigned char QT[8][8], ColorQT[8][8];
int Imwidth, Imheight;
int hratio, vratio;
unsigned char Ncolor;
int **Img;
char *fcode;
unsigned char DeQT[8][8], DeColorQT[8][8];
char *newerrormap;
{
  unsigned char ibit[24], DCdifflength, AC1, R, V_length, fp, qtv,
ImgY, Cb, **Cr, fpsgn;
  int EOI, bitpos, i,j,k, ii, DCdiffvalue, positive, DClast, 1MCU,
      direction, zzlength, EOB, ZRL, zzzrl, MCU, InsertZero, istzero,
x0,y0,
      Allread, pxl, inMCU, DCCblast, DCCrlast, acount, cloop, PxYi,
falbits;
  float PxRf, PxGf, PxBf, ffcbit;
  unsigned char PxY, PxCb, PxCr;
  short V[8][8], Vprev[8][8], VCbprev[8][8], VCrprev[8][8], vpsgn,
fal, pxs, pxm;
  int refDCT[64], isgray, coefcnt, fcbit, usedcount;
  char fc, *fcinimage, *errormap;
  FILE *Outdata;

fcinimage = (char *)malloc(CodesPerBlock);
  errormap = (char *)malloc(Imwidth*Imheight/64);
```

```
        ImgY=(unsigned char **)malloc(Imwidth*8);
        for(x0=0;x0<Imwidth;x0++)
          *(ImgY+x0)=(unsigned char *)malloc(Imheight);

if(Ncolor == 3) {
          Cb=(unsigned char **)malloc(Imwidth/hratio*8);
          for(x0=0; x0<Imwidth/hratio; x0++)
            *(Cb+x0) = (unsigned char *)malloc(Imheight/vratio);
          Cr= (unsigned char **)malloc(Imwidth/hratio*8);
          for(x0=0; x0<Imwidth/hratio; x0++)
            *(Cr+x0) = (unsigned char *) malloc(Imheight/vratio);

isgray =0;
        }
        else {isgray=1;} if(DebugNow) printf("hr=%d, vr=%d, Nc=%d\n", hratio, vratio,
   Ncolor);

for(i=0;i<8;i++) for(j=0;j<8;j++)
            {Vprev[i][j]=0; VCbprev[i][j]=0; VCrprev[i][j]=0;} usedcount = 0;
        falbits=0;

EOI=0; bitpos=0; MCU=0; inMCU=0; lMCU=0; DClast=0; DCCblast=0;
        DCCrlast=0; acount=0;
        while(EOI!=1)
        { if(RSTInterval>0 && lMCU==RSTInterval)
        {
         lMCU=0;
         while(EOI != 2) EOI=ReadData(Infile,ibit,&bitpos,EOI);
         EOI =0;
         bitpos=0; DClast=0; DCCblast=0; DCCrlast=0;
        }

/* Begin entropy-decoding   an 8x8 block */ while(bitpos<16)
            EOI=ReadData(Infile,ibit,&bitpos,EOI);

if(inMCU<hratio*vratio)

DCdifflength=GetCodewordLength(Infile,dcV,dcCW,dcsymbol,ibit,&bitpos)
   ;
          else DCdifflength=GetCodewordLength(Infile,ColordcV,ColordcCW,Colordcsymbo
   l,ibit,&bitpos);
```

61

```
       while(bitpos<DCdifflength)
         EOI=ReadData(Infile,ibit,&bitpos,EOI);

5     DCdiffvalue=GetCodeValue(ibit,&bitpos,DCdifflength);

direction=-1;  zzlength=2;  i=1;  j=0;  EOB=0;  ZRL=0;
       InsertZero=0;
       while(zzlength<=64)
10     { if(EOB==0 && ZRL==0 && InsertZero==0)
       {
        while(bitpos<16)
15        EOI=ReadData(Infile,ibit,&bitpos,EOI);

if(inMCU<hratio*vratio)
          AC1=GetCodewordLength(Infile,acV,acCW,acsymbol,ibit,&bitpos);
       else
20
       AC1=GetCodewordLength(Infile,ColoracV,ColoracCW,Coloracsymbol,ibit,&b
       itpos);

R=AC1>>4;
25     V_length= AC1 & 0x0f;

if(R==0 && V_length==0)
         EOB=1;
30
       else if(R==15 && V_length==0)
            { ZRL=1; zzzrl=zzlength;} else if(R!=0)
35          { InsertZero=1; istzero=zzlength;}

} if(zzlength-istzero==R)
40       InsertZero=0;

if(EOB==0 && ZRL==0 && InsertZero==0)
       {
45
       while(bitpos<V_length)
         EOI=ReadData(Infile,ibit,&bitpos,EOI);

V[i][j]=GetCodeValue(ibit,&bitpos,V_length);
50
       } else V[i][j]=0;

55     if(zzlength-zzzrl==15)   ZRL=0;

/* Zig-Zag */
```

62

```
      zigzag(&i,&j,&direction);
      zzlength++;
}    /* End of entropy decoding an 8x8 block */

/* Reconstruct DCT Coefficients */ if(inMCU < hratio*vratio) {
DClast=DClast+DCdiffvalue;
V[0][0]=DClast;
}
else if(inMCU == hratio*vratio) {
DCCblast = DCCblast + DCdiffvalue;
V[0][0] = DCCblast;
}
else if(inMCU == hratio*vratio+1) {
DCCrlast = DCCrlast + DCdiffvalue;
V[0][0] = DCCrlast;
}

/* Current Position */ x0=MCU%(Imwidth/(8*hratio));
  y0=MCU/(Imwidth/(8*hratio));  /*from vratio=>hratio at 10/30 */ if(Ncolor ==3 && inMCU< hratio*vratio) {
  x0=x0*hratio+inMCU%2;
  y0=y0*vratio+inMCU/2;
}

/* New Watermark Detection */
if(inMCU < hratio*vratio) { for(i=0;i<CodesPerBlock; i++) {
     *(fcinimage+i) = *(fcode + (x0 + y0*(Imwidth/8))*CodesPerBlock
+i);
  } i=0; j=0; direction=1;
fal=0;
coefcnt = 0;
while (coefcnt<64) {
  if( coefcnt >= StEmbedPos && coefcnt <= EndEmbedPos) { ffcbit =
floor(((float)(V[i][j]*QT[i][j])/(float)(DeQT[i][j]))+0.5);
      fcbit = (int)ffcbit;
      fcbit = fcbit & 1;
```

```
                                                         /* Temp: change -1
       to -2 */
                                                         /* to avoid the
       noise  => change back */
 5        /* 10/12: Changed this line: make ">=" ==> even, "<" ==> odd, to
       have less visual impact. Change fcbit => No Change later??*/
            if( ( fcbit == 0 && *(fcinimage+coefcnt- StEmbedPos) == -1) ||
                 (fcbit == 1 && *(fcinimage+coefcnt- StEmbedPos) == 1) )
            {
10     /*   printf("(%d, %d, %d, %d, %d)\n",x0, y0, coefcnt, fcbit,
       *(fcinimage+coefcnt- StEmbedPos)); */
            fal++;
            falbits++;
            }
15     /*   if( (x0==14 && y0==14 && coefcnt == 7) ||
                (x0==25 && y0==25 && coefcnt ==8) )
            {
            printf("oo(%d, %d, %d, %d, %d)\n",x0, y0, coefcnt, fcbit,
       *(fcinimage+coefcnt- StEmbedPos));
20          } */

}
25
         ZigZag(&i,&j,&direction);
         coefcnt++;
       }

30     usedcount = usedcount + CodesPerBlock;

*(errormap+x0+y0*(Imwidth/8)) = fal;

}
35
       /* adjust DC values */ for(j=0;j<8;j++)
       for(i=0;i<8;i++){
40      if(inMCU < hratio*vratio)
         Vprev[i][j]=V[i][j];
         else if(inMCU == hratio*vratio)
          VCbprev[i][j] = V[i][j];
         else if(inMCU == hratio*vratio+1)
45        VCrprev[i][j] = V[i][j];
       }

/* Multiply Quantization Table */
50
       if(inMCU < hratio*vratio)
       for(j=0;j<8;j++)
       for(i=0;i<8;i++)
       {
55      qtv=QT[i][j];
        V[i][j]=V[i][j]*(int)qtv;
       }
```

```
    else
    for(j=0;j<8;j++)
    for(i=0;i<8;i++)
    {
     qtv=ColorQT[i][j];
     V[i][j]=V[i][j]*(int)qtv;
    }

/*  InverseDCT(V);   */
    idct(V);

for(i=0;i<8;i++)
    for(j=0;j<8;j++)
      V[i][j]+=128;

if(inMCU<hratio*vratio)
    for(i=0;i<8;i++)
    for(j=0;j<8;j++)
    {
        pxl= V[i][j];
     /* pxl = V[i][j]+fal*64; */
        if(pxl>255) pxl=255;
        else if(pxl<0) pxl=0;
        *(*(ImgY+x0*8+i)+y0*8+j)= (unsigned char)pxl;
    } else if(inMCU == hratio*vratio)
    for(i=0;i<8;i++)
    for(j=0;j<8;j++)
    {
 /*     pxl= V[i][j]+fal*64; */
        pxl = V[i][j];
        if(pxl>255) pxl=255;
        else if(pxl<0) pxl=0;
        *(*(Cb+x0*8+i)+y0*8+j)= (unsigned char)pxl;
    } else if(inMCU == hratio*vratio+1)
    for(i=0;i<8;i++)
    for(j=0;j<8;j++)
    {
 /*     pxl= V[i][j]+fal*64;    */
        pxl = V[i][j];
        if(pxl>255) pxl=255;
        else if(pxl<0) pxl=0;
        *(*(Cr+x0*8+i)+y0*8+j)= (unsigned char)pxl;
    } if(Ncolor == 3) {inMCU++; if(inMCU == hratio*vratio+2) {MCU++;
lMCU++; inMCU=0;} }
    else{MCU++;   lMCU++;}
```

```
    /* Temporary disable it to see whether it is good */
    if(EOI==3) EOI=1;
    if(EOI==1 && inMCU!=0) {EOI=3; fseek(Infile, -2L, SEEK_CUR);}
    /* if(EOI==1 && inMCU!=0) {EOI=0; fseek(Infile, -2L, SEEK_CUR);} */
    /* printf("x0=%d, y0=%d, EOI=%d, inMCU=%d!!\n", x0, y0, EOI,
inMCU); */
    /* Add this *//* if(hratio == 2 && vratio == 2 && x0 ==
(Imwidth/(8*hratio) -1) && y0 == (Imheight/(8*vratio) -1) && inMCU ==
hratio*vratio + 1) EOI =1;
    else if(hratio == 1 && vratio == 1 && x0 == (Imwidth/(8*hratio) -1)
&& y0 == (Imheight/(8*vratio) -1) } EOI =1;
    */
    }

/* Write Data */
    if(Ncolor ==3) {
     for(j=0;j<Imheight;j++)
     for(i=0;i<Imwidth;i++) {
     PxY= *(*(ImgY+i)+j);
     PxCb = *(*(Cb+(i/hratio))+(j/vratio));
     PxCr = *(*(Cr+(i/hratio))+(j/vratio));
     PxRf =    (float)PxY                          + 1.402
*((float)PxCr - CrOffset);
     PxGf =    (float)PxY - 0.34414* ((float)PxCb - CbOffset) - 0.71414
*((float)PxCr - CrOffset);
     PxBf =    (float)PxY + 1.772   * ((float)PxCb - CbOffset);
     if(PxRf>255.0) PxRf = 255.0; else if(PxRf<0.0) PxRf = 0.0;
     if(PxGf>255.0) PxGf = 255.0; else if(PxGf<0.0) PxGf = 0.0;
     if(PxBf>255.0) PxBf = 255.0; else if(PxBf<0.0) PxBf = 0.0;
     *(*(Img+i)+j)= (((int)floor(PxRf) & 0xff) << 16) |
(((int)floor(PxGf) & 0xff) << 8) | ((int)floor(PxBf) &0xff) |
0xff000000;
     }
    }
     else {
     for(j=0;j<Imheight;j++)
     for(i=0;i<Imwidth;i++) {
     PxY=*(*(ImgY+i)+j);
     PxYi=(int)PxY;
     *(*(Img+i)+j)=(PxYi<<16) | (PxYi<<8) | (PxYi) | 0xff000000;
     }
     }

/* Change this */
    DealErrorMap(Img, errormap, newerrormap, Imwidth, Imheight);

/*Print Data */ if(DebugNow) printf("FAILURE: %d\n",falbits);

}
```

```
    void RearrangeRecoveryBlocks(RecWmkCodes, Imwidth, Imheight )
    char  **RecWmkCodes;
    int Imwidth, Imheight;
    {
5   int i,j,x0,y0, k;
    char **tmpRecWmkCodes;

tmpRecWmkCodes = (char **)malloc(Imwidth/8*Imheight/8 * 8L);
10    for (i=0; i< Imwidth/8*Imheight/8; i++)
         *(tmpRecWmkCodes+i) = (char *)malloc(64 - StEmbedRecPos +1);

for (i=0; i< Imwidth/8*Imheight/8; i++)
        for( j=0; j<  65 -  StEmbedRecPos; j++)
15    *(*(tmpRecWmkCodes+i)+j) = *(*(RecWmkCodes+i)+j);

for(j=0; j<(Imheight/8); j++)
      for(i=0; i<(Imwidth/8); i++) {
20        x0=i; y0=j;
          MappingPosition(&x0, &y0, Imwidth, Imheight, -1); /* Should be
    -1 */
          for( k=0; k< 65 -  StEmbedRecPos; k++)
              *(*(RecWmkCodes+x0+y0*Imwidth/8)+k) =
25                      *(*(tmpRecWmkCodes+i+j*Imwidth/8)+k);
      }
      free(tmpRecWmkCodes);
    }

30
    void ReconstructBlock( RecWmkCodes, x0, y0, V, Imwidth, Imheight,
    RecoverQT)
     char **RecWmkCodes;
35   int x0, y0;
     short V[8][8];
     int Imwidth, Imheight;
     unsigned char RecoverQT[8][8];
    {
40   int i,j, gotEOB, EOBpatterncnt, coefsign;
     char *tmpCodes, currentBit, lastBit;
     char DCvalue;

45   tmpCodes = (char *)malloc(4*(65-StEmbedRecPos));

/* Reconstruct DC value */
       DCvalue = 0;
50     for(i=0; i<DCBitsNum; i++) {
           currentBit = *(*(RecWmkCodes+ 2*x0 + i%2
    +(2*y0+(i/2)%2)*Imwidth/8)+i/4);
          if(i==0) coefsign = 1- 2*currentBit; /* 0 -> 1, 1 -> -1 */
          else DCvalue = (DCvalue << 1) + currentBit;
55     }
       DCvalue = coefsign * DCvalue;
       V[0][0] = (short)DCvalue;
```

```
    for(i=DCBitsNum; i<4*(65-StEmbedRecPos); i++) {
        currentBit = *(*(RecWmkCodes+ 2*x0 + i%2
+(2*y0+(i/2)%2)*Imwidth/8)+i/4);
        *(tmpCodes+i-DCBitsNum) = currentBit;
    }
    /* Decode Huffman Bit Stream until EOB */

DecodeACHuffmanBitStream( tmpCodes,
            4*(65-StEmbedRecPos) - DCBitsNum, V);

/* V is the quantized value of the block */

DequantizeAndShiftDCT( V, RecoverQT);

/*  if(x0==0) printf("[%d, %d, E%d]\n", x0+y0*(Imwidth/16), i);  */ free(tmpCodes);

} void  ScaleBlockByTwo(ImgY, ImgOutY)
short ImgY[8][8];
unsigned char ImgOutY[16][16];
{
 int i,j, i1, j1;
 short px, largepx[16][16];

for(j=0; j<8; j++)
 for(i=0; i<8; i++) {
    i1=i+1; j1=j+1; if(i1>7) i1=7; if(j1>7) j1=7;
    largepx[i*2][j*2] = ImgY[i][j];
    largepx[i*2+1][j*2] = (ImgY[i][j] + ImgY[i1][j] + 1) /2;
    largepx[i*2][j*2+1] = (ImgY[i][j] + ImgY[i][j1] + 1) /2;
    largepx[i*2+1][j*2+1] = (ImgY[i][j] + ImgY[i][j1] +
                             ImgY[i1][j] + ImgY[i1][j1] +2) /4;
 } for(j=0; j<16; j++)
 for(i=0; i<16; i++) {
   px = largepx[i][j];
   if(px<0) px = 0;
   else if(px>255) px = 255;
   ImgOutY[i][j] = (unsigned char)px;
 }

} void ConstructRecoveryImage( RecWmkCodes, RecErrormap, Img, Imwidth,
Imheight)
char **RecWmkCodes;
```

```
   char *RecErrormap;
   int **Img;
   int Imwidth, Imheight;
   {
    int i, j, i1, j1, x0, y0, PxYi;
    char *reconstmap;
    unsigned char QTrec[8][8], ColorQTrec[8][8], ImgOutY[16][16], PxY;
    short ImgY[8][8];

RearrangeRecoveryBlocks( RecWmkCodes, Imwidth, Imheight);

/*  for(y0=0; y0<2; y0++) for(x0=0; x0<2; x0++) {
      for(i=0; i<(64- StEmbedRecPos); i++)
         printf("%d", *(*(RecWmkCodes+x0+y0*Imwidth/8)+i));
      printf("\n====\n" );  } */

InitialHuffmanTables();
    GetQuantizationTable(RecoveryQualityFactor, QTrec, ColorQTrec);

/* For Debug. Set Every block is error to see reconstructed image
    */
   /*  for(j=0; j<(Imheight/8); j++)
      for(i=0; i<(Imwidth/8); i++)
        *(RecErrormap+i+j*(Imwidth/8)) = 1; */ for(j=0; j<(Imheight/8); j++)
    for(i=0; i<(Imwidth/8); i++) { if( *(RecErrormap+i+j*(Imwidth/8)) > 0) { x0=i/2; y0=j/2;
        ReconstructBlock( RecWmkCodes, x0, y0, ImgY, Imwidth, Imheight,
   QTrec);
          ScaleBlockByTwo(ImgY, ImgOutY);
        for(i1=0; i1<8; i1++)
        for(j1=0; j1<8; j1++) {
            PxY=ImgOutY[i1+(i%2)*8][j1+(j%2)*8];
            PxYi=(int)PxY;
            *(*(Img+i*8+i1)+j*8+j1)=(PxYi<<16) | (PxYi<<8) | (PxYi) |
   0xff000000;
        }

}
    }
    free( RecWmkCodes);
   } void
   RecoverManipulatedData(Infile,dcV,dcCW,dcsymbol,acV,acCW,acsymbol,
```

```
        ColordcV,ColordcCW,Colordcsymbol,ColoracV,ColoracCW,Coloracsymbol,
                    RSTInterval, QT, ColorQT, Imwidth, Imheight, hratio,
        vratio, Ncolor,
                    Img, DeQT, DeColorQT, newerrormap)
        FILE *Infile;
        unsigned char *dcV[],*dcCW[];
        unsigned int dcsymbol[];
        unsigned char *acV[],*acCW[];
        unsigned int acsymbol[];
        unsigned char *ColordcV[],*ColordcCW[];
        unsigned int Colordcsymbol[];
        unsigned char *ColoracV[],*ColoracCW[];
        unsigned int Coloracsymbol[], RSTInterval;
        unsigned char QT[8][8], ColorQT[8][8];
        int Imwidth, Imheight;
        int hratio, vratio;
        int Ncolor;
        int **Img;
        unsigned char DeQT[8][8], DeColorQT[8][8];
        char *newerrormap;
        {
           unsigned char ibit[24], DCdifflength, AC1, R, V_length, fp, qtv,
        ImgY, Cb, **Cr, fpsgn;
           int EOI, bitpos, i,j,k, ii, DCdiffvalue, positive, DClast, lMCU,
                direction, zzlength, EOB, ZRL, zzzrl, MCU, InsertZero, istzero,
        x0,y0,
                Allread, pxl, inMCU, DCCblast, DCCrlast, acount, cloop, PxYi,
        falbits;
           float PxRf, PxGf, PxBf, ffcbit;
           unsigned char PxY, PxCb, PxCr;
           short V[8][8], Vprev[8][8], VCbprev[8][8], VCrprev[8][8], vpsgn,
        fal, pxs, pxm;
           int refDCT[64], isgray, coefcnt, fcbit, usedcount;
           char fc, *fcinimage, *recerrormap;
           char **RecWmkCodes;
           unsigned char **recoveryImgY;

/* This function is used for extracting embedded recovery bits */

RecWmkCodes = (char **)malloc(Imwidth/8*Imheight/8 * 8L);
        for (i=0; i< Imwidth/8*Imheight/8; i++)
           *(RecWmkCodes+i) = (char *)malloc(64 - StEmbedRecPos +1);

/* recerrormap = (char *)malloc(Imwidth*Imheight/64);
        DecideRecoveryRegion( newerrormap, recerrormap, Imwidth, Imheight
        ); */ if(Ncolor==1) isgray = 1;
        else isgray=0;

for(i=0;i<8;i++) for(j=0;j<8;j++)
              {Vprev[i][j]=0; VCbprev[i][j]=0; VCrprev[i][j]=0;}
```

```
    EOI=0; bitpos=0; MCU=0; inMCU=0; lMCU=0; DClast=0; DCCblast=0;
    DCCrlast=0;
5   acount=0;
    while(EOI!=1)
    { if(RSTInterval>0 && lMCU==RSTInterval)
10  {
      lMCU=0;
      while(EOI != 2) EOI=ReadData(Infile,ibit,&bitpos,EOI);
      EOI =0;
      bitpos=0; DClast=0; DCCblast=0; DCCrlast=0;
15  } while(bitpos<16)
       EOI=ReadData(Infile,ibit,&bitpos,EOI);

20  if(inMCU<hratio*vratio)

DCdifflength=GetCodewordLength(Infile,dcV,dcCW,dcsymbol,ibit,&bitpos)
    ;
    else
25
    DCdifflength=GetCodewordLength(Infile,ColordcV,ColordcCW,Colordcsymbo
    l,ibit,&bitpos);

while(bitpos<DCdifflength)
30     EOI=ReadData(Infile,ibit,&bitpos,EOI);

DCdiffvalue=GetCodeValue(ibit,&bitpos,DCdifflength);

35  direction=-1;  zzlength=2;  i=1;  j=0;  EOB=0;  ZRL=0;
    InsertZero=0;
    while(zzlength<=64)
    {

40  if(EOB==0 && ZRL==0 && InsertZero==0)
    {
      while(bitpos<16)
        EOI=ReadData(Infile,ibit,&bitpos,EOI);

45  if(inMCU<hratio*vratio)
       AC1=GetCodewordLength(Infile,acV,acCW,acsymbol,ibit,&bitpos);
    else AC1=GetCodewordLength(Infile,ColoracV,ColoracCW,Coloracsymbol,ibit,&b
50  itpos);

R=AC1>>4;
    V_length= AC1 & 0x0f;

55
    if(R==0 && V_length==0)
         EOB=1;
```

```
      else if(R==15 && V_length==0)
          { ZRL=1; zzzrl=zzlength;}
      else if(R!=0)
          { InsertZero=1; istzero=zzlength;}
      } if(zzlength-istzero==R)
        InsertZero=0;

if(EOB==0 && ZRL==0 && InsertZero==0)
      {
      while(bitpos<V_length)
        EOI=ReadData(Infile,ibit,&bitpos,EOI);
      V[i][j]=GetCodeValue(ibit,&bitpos,V_length);
      }
      else V[i][j]=0;

if(zzlength-zzzrl==15)
        ZRL=0;

/* Zig-Zag */
      ZigZag(&i,&j,&direction);
      zzlength++;

}

/* Current Position */ x0=MCU%(Imwidth/(8*hratio));
        y0=MCU/(Imwidth/(8*hratio)); /* changed here at 10/30 */ if(Ncolor ==3 && inMCU< hratio*vratio) {
        x0=x0*hratio+inMCU%2;
        y0=y0*vratio+inMCU/2;
        }

/* New Watermark Detection */
      if(inMCU < hratio*vratio) {
      i=0; j=0; direction=1;
      fal=0;
      coefcnt = 0;
      while (coefcnt<64) {
       if( coefcnt >= StEmbedRecPos) { ffcbit =
    floor(((float)(V[i][j]*QT[i][j])/(float)(DeQT[i][j]))+0.5);
            fcbit = (int)ffcbit;
            fcbit = fcbit & 1;

*(*(RecWmkCodes+x0+y0*Imwidth/8)+ (coefcnt-StEmbedRecPos) ) =
    (char)fcbit;
```

```
        }
        ZigZag(&i,&j,&direction);
        coefcnt++;
      }
    } if(Ncolor == 3) {inMCU++; if(inMCU == hratio*vratio+2) {MCU++;
lMCU++; inMCU=0;} }
    else{MCU++;   lMCU++;}

/*Temporarily disable this at 10/16 */
    if(EOI==3) EOI=1;
    if(EOI==1 && inMCU!=0) {EOI=3; fseek(Infile, -2L, SEEK_CUR);}
    /* if(EOI==1 && inMCU!=0) {EOI=0; fseek(Infile, -2L, SEEK_CUR);} */

}

ConstructRecoveryImage( RecWmkCodes, newerrormap, Img, Imwidth,
  Imheight);

} void detectwatermarkMain(filename, Img, authmode)
char *filename;
int **Img;
int authmode;  /* authmode = 0 => Authentication Only, authmode = 1
=> + Recovery */
{
  unsigned char
data,fp,*HuffmanCodes,*dcV[16],*dcCW[16],*acV[300],*acCW[300];
  unsigned char
*ColordcV[16],*ColordcCW[16],*ColoracV[300],*ColoracCW[300], hratio,
vratio;
  unsigned short int HuffCodeLength, ScanHeadLength, RSTInterval, Imw,
Imh;
  unsigned int dcsymbol[16],acsymbol[16], Colordcsymbol[16],
Coloracsymbol[16];
  unsigned char *dqt, QT[8][8], ColorQT[8][8], HuffCodeType, Ncolor,
DQTType, impar[2];
  int DRI, DNL, num, i,j, direction, DetNoNoiseCoefNum;
  long offset, datastart;
  char *fcode;
  FILE *Infile;
  unsigned char NoNoiseCoef, vratiotemp;
  int quality;
  unsigned char DeQT[8][8], DeColorQT[8][8], DeQT2[8][8],
DeColorQT2[8][8];
  char *Errormap;

Infile=fopen(filename,"rb");
```

```
    /* Read and reconstruct Quantization Tables */
    /* DQT */
    while(Skipto(Infile,0xff,0xdb)!=0){
5   fseek(Infile, 2L, SEEK_CUR);
    fread(&DQTType, 1L, 1, Infile);

dqt=(unsigned char *)malloc(64);
    fread(dqt, 64L, 1L, Infile);
10
    i=0;j=0;direction=1;
    for(num=0;num<64;num++)
    {
    if(DQTType == 0x00)  QT[i][j]=*(dqt+num);
15  else if(DQTType == 0x01) ColorQT[i][j]=*(dqt+num);
    ZigZag(&i,&j,&direction);
    } fread(&DQTType, 1L, 1, Infile);
20  if(DQTType == 0x01) {
    fread(dqt, 64L, 1L, Infile);

i=0;j=0;direction=1;
    for(num=0;num<64;num++)
25  {
    ColorQT[i][j]=*(dqt+num);
    ZigZag(&i,&j,&direction);
    }
    }
30  else {fseek(Infile,-1L,SEEK_CUR);}
    free(dqt);
    }

35  if(DebugNow)
    for(j=0;j<8;j++)
    {
    for(i=0;i<8;i++)
      printf("%d ",QT[i][j]);
40  printf("\n");
    }

/* Read Image Size */
45  fseek(Infile, 0,0);
    while(Skipto(Infile, 0xff, 0xc0)!=0) {
    fseek(Infile, 3L, SEEK_CUR);
    fread(impar, 2L, 1, Infile);
    Imh=impar[1]+impar[0]*256;
50  fread(impar, 2L, 1, Infile);
    Imw=impar[1]+impar[0]*256;
    /* fseek(Infile, 1L, SEEK_CUR); */
    fread(&Ncolor, 1L, 1, Infile);
    /* if(Ncolor == 3) { */
55    fseek(Infile, 1L, SEEK_CUR);
      fread(&vratio, 1L, 1, Infile);
      hratio = vratio >> 4;
```

```
       vratio = vratio & 0xf;
    /* }
       else {hratio=vratio=1;} */
       }
 5     if(DebugNow) printf("ImageSize: width = %d, height = %d, hratio=%d,
       vratio=%d\n", Imw, Imh, hratio, vratio);

/* Read and reconstruct Huffman Tables */
10     fseek(Infile, 0,0);
       while(Skipto(Infile,0xff,0xc4)!=0){   /* DHT */
       fread(impar,2L,1L,Infile);
        HuffCodeLength= impar[1]+impar[0]*256;
       fread(&HuffCodeType,1L,1L,Infile);
15     fseek(Infile,-1L,SEEK_CUR);
       HuffmanCodes=(unsigned char *)malloc((long)HuffCodeLength-2);
       fread(HuffmanCodes, (long)HuffCodeLength-2, 1L, Infile);
       offset=0L;
       if(HuffCodeType == 0x00) {
20      offset=HuffmanRestore(HuffmanCodes,offset,dcV,dcCW,dcsymbol);
        if(offset<HuffCodeLength-2) { /* Add this at 10/29 */
        if(Ncolor==3) {   /* Color Huffman Tables (for photoshop) */ offset=HuffmanRestore(HuffmanCodes,offset,ColordcV,ColordcCW,Colordcs
25    ymbol);
        offset=HuffmanRestore(HuffmanCodes,offset,acV,acCW,acsymbol);

offset=HuffmanRestore(HuffmanCodes,offset,ColoracV,ColoracCW,Coloracs
      ymbol);
30       }
         else offset=HuffmanRestore(HuffmanCodes,offset,acV,acCW,acsymbol);
            /* Read BW AC Huffman Table Only (for photoshop) */
         }
       }
35     else if(HuffCodeType == 0x10) {
         offset=HuffmanRestore(HuffmanCodes,offset,acV,acCW,acsymbol);
       }
         else if(HuffCodeType == 0x01) {

40     offset=HuffmanRestore(HuffmanCodes,offset,ColordcV,ColordcCW,Colordcs
       ymbol);
       }
         else if(HuffCodeType == 0x11) {

45     offset=HuffmanRestore(HuffmanCodes,offset,ColoracV,ColoracCW,Coloracs
       ymbol);
       } free(HuffmanCodes);
50     }

/* for(i=0; i<16; i++) printf("%d ", acsymbol[i]); */

/* Read Defined Restart Interval */
55
       fseek(Infile, 0, 0);
       RSTInterval=0;
```

```
    while(Skipto(Infile,0xff,0xdd)!=0) {   /* DRI */
       fseek(Infile,2L,SEEK_CUR);
       fread(impar,2L,1L,Infile);
       RSTInterval = impar[1]+impar[0]*256;
    } if(DebugNow) printf("Read Huffman Table.\n");

/* Read Image Data */
    if( Skipto(Infile,0xff,0xda) == 0) {
         fseek(Infile, 0, 0); Skipto(Infile,0xff,0xda);
    } /* SOS */ fread(impar,2L,1L,Infile);
    ScanHeadLength = impar[1]+impar[0]*256;

fseek(Infile,(long)ScanHeadLength-2,SEEK_CUR);

datastart = ftell(Infile);

/* Reconstruct Auth Bits */
    fcode = (char *)malloc((int)Imw*(int)Imh/64*CodesPerBlock);

ReadJPGData(Infile,dcV,dcCW,dcsymbol,acV,acCW,acsymbol,

ColordcV,ColordcCW,Colordcsymbol,ColoracV,ColoracCW,Coloracsymbol,
              RSTInterval, QT, ColorQT, (int)Imw, (int)Imh,
              (int)hratio, (int)vratio, Ncolor, fcode);

RearrangeAuthBits(fcode, (int)Imw, (int)Imh);

if(DebugNow) printf("Read Authentication Bits.\n");

/* Extract Authbit Watermark */
    fseek(Infile, datastart, 0 );

quality = MinQualityFactor;
    GetQuantizationTable(quality, DeQT, DeColorQT);
    Errormap = (char *)malloc( (int)Imw * (int)Imh /64);

if(DebugNow)
    for(j=0;j<8;j++)
    {
    for(i=0;i<8;i++)
      printf("%d ",DeQT[i][j]);
    printf("\n");
    } for(j=0; j<Imh; j++) for(i=0; i<Imw; i++) *(*(Img+i)+j) =
    0xff000000;

DetectWatermarkData(Infile,dcV,dcCW,dcsymbol,acV,acCW,acsymbol,

ColordcV,ColordcCW,Colordcsymbol,ColoracV,ColoracCW,Coloracsymbol,
```

```
                RSTInterval, QT, ColorQT, (int)Imw, (int)Imh,
                (int)hratio, (int)vratio, Ncolor, Img, fcode,
                DeQT, DeColorQT, Errormap);

if(DebugNow) printf("Watermark detected. \n");

/* Reconstruct Recovery Bits */
    if(authmode == 1) {
        fseek(Infile, datastart, 0 );

quality = MinQF2;
        GetQuantizationTable(quality, DeQT2, DeColorQT2);

RecoverManipulatedData(Infile,dcV,dcCW,dcsymbol,acV,acCW,acsymbol,

ColordcV,ColordcCW,Colordcsymbol,ColoracV,ColoracCW,Coloracsymbol,
                RSTInterval, QT, ColorQT, (int)Imw, (int)Imh,
                (int)hratio, (int)vratio, Ncolor, Img,
                DeQT2, DeColorQT2, Errormap);
    } fclose(Infile);

} void detectwatermark(filename, Img, orgImg, Imwidth, Imheight,
    authmode, errorBound)
    char *filename;
    int **Img, **orgImg;
    int Imwidth, Imheight, authmode, errorBound;
    {
      Tau = errorBound;
      detectRawwatermarkMain(orgImg, Img, Imwidth, Imheight, 2);
      free(orgImg);
      detectwatermarkMain(filename, Img, authmode);
    } int DetectRawWatermarkData( Imwidth, Imheight,
                hratio,vratio, Ncolor, orgImg, Img, fcode,
                DeQT, DeColorQT, newerrormap)
    int Imwidth, Imheight;
    int hratio, vratio;
    int Ncolor;
    int orgImg, Img;
    char *fcode;
    unsigned char DeQT[8][8], DeColorQT[8][8];
    char *newerrormap;
    {
```

```
    int i,j, x0, y0, refDCT[64], isgray, pxl;
    int direction, coefcnt, V, coefsign;
    int fcbit, usedcount, fal, PxYi, falbits;
    unsigned char **ImgY, PxY;
5   char *errormap, *fcinimage;
    float ffcbit;

/*  ImgY=(unsigned char **)malloc(Imwidth*8);
      for(x0=0;x0<Imwidth;x0++)
10     *(ImgY+x0)=(unsigned char *)malloc(Imheight); */ if( Ncolor == 1 ) isgray = 1;
15  else isgray = 0;

usedcount = 0;
    falbits=0;
    fcinimage = (char *)malloc(CodesPerBlock);
20  errormap = (char *)malloc(Imwidth*Imheight/64);
    for( y0=0; y0<(Imheight/8); y0++)
    for( x0=0; x0<(Imwidth/8); x0++) {

GetDCTcoefficients( orgImg, x0, y0, refDCT, vratio, hratio,
25  isgray);

for(i=0;i<CodesPerBlock; i++) {
       *(fcinimage+i) = *(fcode + usedcount +i);
       }
30 i=0; j=0; direction=1;
    fal=0;
    coefcnt = 0;
35  while (coefcnt<= EndEmbedPos) {
     if( coefcnt >= StEmbedPos && coefcnt <= EndEmbedPos) {
        V = refDCT[i+j*8];
        if(V>=0) coefsign = 1;
        else{ coefsign = -1; V=-V;}
40      V=(V+4)/8; V=V*coefsign;
    /*      ffcbit =
    floor(((float)(V*QT[i][j])/(float)(DeQT[i][j]))+0.5); */
        ffcbit = floor( ( (float)V / (float)(DeQT[i][j]) )+0.5);
        fcbit = (int)ffcbit;
45      fcbit = fcbit & 1;
                                              /* Temp: change -1
    to -2 */
                                              /* to avoid the
    noise  => change back */
50      /* 10/12: Changed this line: make ">=" ==> even, "<" ==> odd, to
    have less visual impact. Change fcbit. No Change later*/
        if( ( fcbit == 0 && *(fcinimage+coefcnt- StEmbedPos) == -1) ||
              (fcbit == 1 && *(fcinimage+coefcnt- StEmbedPos) == 1) )
            {
55  /*  printf("(%d, %d, %d, %d, %d)\n",x0, y0, coefcnt, fcbit,
    *(fcinimage+coefcnt- StEmbedPos)); */
        fal++;
```

```
        falbits++;
       }
     }
     ZigZag(&i,&j,&direction);
     coefcnt++;
   } usedcount = usedcount + CodesPerBlock;

*(errormap+x0+y0*(Imwidth/8)) = fal;

}
/*   for(j=0;j<Imheight;j++)
     for(i=0;i<Imwidth;i++)
       *(*(ImgY+i)+j) = *(*(orgImg+i)+j) & 0xff;

DealErrorMap(ImgY, errormap, newerrormap, Imwidth, Imheight);

for(j=0;j<Imheight;j++)
     for(i=0;i<Imwidth;i++) {
      PxY=*(*(ImgY+i)+j);
      PxYi=(int)PxY;
      *(*(Img+i)+j)=(PxYi<<16) | (PxYi<<8) | (PxYi) | 0xff000000;
     } */ for(j=0;j<Imheight;j++)
     for(i=0;i<Imwidth;i++)
       *(*(Img+i)+j) = *(*(orgImg+i)+j);

DealErrorMap(Img, errormap, newerrormap, Imwidth, Imheight);

return falbits;
 } void ReadAuthBits(Imwidth, Imheight, hratio, vratio, Ncolor,
                    Img, fcodes)
   int Imwidth, Imheight;
   int hratio, vratio;
   int Ncolor;
   int **Img;
   char *fcodes;
   {
   int i,j, x0, y0, refDCT[64], prevDCT[64], isgray, pxl, flrefDCTquant,
   flisEven, PxYi, PxYiorg;
   int direction, coefcnt;
   int codecount, prevcoef, refcoef;
   int AuthEqualBits, TotalAuthBits;

if( hratio == 1 && vratio == 1) isgray = 1;
     else isgray = 0;
     codecount = 0;

AuthEqualBits=0; TotalAuthBits=0;
```

```
     for( y0=0; y0<(Imheight/8); y0++)
     for( x0=0; x0<(Imwidth/8); x0++) {

GetDCTcoefficients( Img, x0, y0, refDCT, vratio, hratio, isgray);

/* if( (x0==31 || x0==30 )&& y0==31)
     for(j=0; j<8; j++) {
     for(i=0; i<8; i++)
      printf("%d ", refDCT[i+j*8]);
     printf("\n");
     } */ if( x0%2 == 0 ) {
         for(i=0; i<64; i++) prevDCT[i] = refDCT[i];
     }
     else
     {
     i=0; j=0;  direction=1;  coefcnt = 0;
     while (coefcnt< (2*CodesPerBlock) ) {

/* Debug */
  /*    if(x0==5 && y0==0) printf("(%d,%d,%d)", coefcnt,
     (prevDCT[i+j*8]+4)/8, (refDCT[i+j*8]+4)/8); */

/*     if (prevDCT[i+j*8]>=0) prevcoef = (prevDCT[i+j*8]+4)/8;
         else prevcoef = - ((prevDCT[i+j*8]-4)/8);

if( refDCT[i+j*8]>=0) refcoef = (refDCT[i+j*8]+4)/8;
         else refcoef = - ((refDCT[i+j*8]-4)/8); */ /* This is in fact,
     requantization */

/* this makes perferct for non-quantized ones */ if (prevDCT[i+j*8]>=0) prevcoef = prevDCT[i+j*8];
         else prevcoef = -prevDCT[i+j*8];

if( refDCT[i+j*8]>=0) refcoef = refDCT[i+j*8];
         else refcoef = -refDCT[i+j*8];

/*     prevcoef = (prevcoef+3)/8;
         refcoef = (refcoef+3)/8;   */

/*   if(x0 == 31 && y0==10) printf("prev:%d ref:%d\n",prevcoef,
     refcoef); */ if( prevcoef > refcoef )  /*Make it more precise */
           *(fcodes+codecount) = 1;
         else if( prevcoef == refcoef )
           { *(fcodes+codecount) = 0; AuthEqualBits++;}
         else  *(fcodes+codecount) = -1;

TotalAuthBits++;
```

```
      ZigZag(&i,&j,&direction);
      coefcnt++;
      codecount++;
    }
  }
}

DoNotAuthenticate = 0;
  if ( ((float)AuthEqualBits / (float) TotalAuthBits) >= NoAuthRatio)
    DoNotAuthenticate = 1;

} void RecoverRawManipulatedData( Imwidth, Imheight,
            hratio, vratio, Ncolor, orgImg, Img,
            DeQT, DeColorQT, newerrormap)
int Imwidth, Imheight;
int hratio, vratio;
int Ncolor;
int orgImg, Img;
unsigned char DeQT[8][8], DeColorQT[8][8];
char *newerrormap;
{
int i,j, x0, y0, refDCT[64], isgray, pxl;
int direction, coefcnt, V, coefsign;
int fcbit, usedcount, fal, PxYi, falbits;
char **RecWmkCodes;
float ffcbit;

RecWmkCodes = (char **)malloc(Imwidth/8*Imheight/8 * 8L);
  for (i=0; i< Imwidth/8*Imheight/8; i++)
    *(RecWmkCodes+i) = (char *)malloc(64 - StEmbedRecPos +1);

if( hratio == 1 && vratio == 1) isgray = 1;
  else isgray = 0;

falbits=0;

for( y0=0; y0<(Imheight/8); y0++)
  for( x0=0; x0<(Imwidth/8); x0++) {

GetDCTcoefficients( orgImg, x0, y0, refDCT, vratio, hratio,
isgray);

i=0; j=0; direction=1;
  fal=0;
  coefcnt = 0;
  while ( coefcnt < 65) {
      if( coefcnt >= StEmbedRecPos) {
        V = refDCT[i+j*8];
        if(V>=0) coefsign = 1;
```

```
              else{ coefsign = -1; V=-V;}
            V=(V+4)/8; V=V*coefsign;
            ffcbit = floor( ( (float)V / (float)(DeQT[i][j]) )+0.5);
            fcbit = (int)ffcbit;
            fcbit = fcbit & 1;
            *(*(RecWmkCodes+x0+y0*Imwidth/8)+ (coefcnt-StEmbedRecPos) ) =
    (char)fcbit;
        }
            ZigZag(&i,&j,&direction);
            coefcnt++;
       }
      }

ConstructRecoveryImage( RecWmkCodes, newerrormap, Img, Imwidth,
    Imheight);

} void GetQualFactorSets(MQFset, MQF2set)
    int MQFset[], MQF2set[];
    {
      MQFset[0] = defaultMQFset1; MQF2set[0] = defaultMQF2set1;
      MQFset[1] = defaultMQFset2; MQF2set[1] = defaultMQF2set2;
      MQFset[2] = defaultMQFset3; MQF2set[2] = defaultMQF2set3;
      MQFset[3] = defaultMQFset4; MQF2set[3] = defaultMQF2set4;
      MQFset[4] = defaultMQFset5; MQF2set[4] = defaultMQF2set5;
    } void detectRawwatermarkMain(orgImg, Img, Imwidth, Imheight, authmode)
    int orgImg, Img;
    int Imwidth, Imheight, authmode;
    /* authmode = 0 => Authentication Only, authmode = 1 => + Recovery
       authmode = 2 => Decide MQF, MQF2 */
    {
     unsigned char
    data,fp,*HuffmanCodes,*dcV[16],*dcCW[16],*acV[300],*acCW[300];
     unsigned char
    *ColordcV[16],*ColordcCW[16],*ColoracV[300],*ColoracCW[300], hratio,
    vratio;
     unsigned char *dqt, QT[8][8], ColorQT[8][8], HuffCodeType, Ncolor,
    DQTType, impar[2];
     int DRI, num, i,j, direction, DetNoNoiseCoefNum, px;
     long offset, datastart;
     char *fcode;
     FILE *Infile;
     unsigned char NoNoiseCoef;
     int quality, MQFset[TotalMQFsets], MQF2set[TotalMQFsets], mqfnum,
    minmqf, minfbs, mqffbs;
     unsigned char DeQT[8][8], DeColorQT[8][8], DeQT2[8][8],
    DeColorQT2[8][8], fc;
     char *Errormap;

/* Set Global Parameters */
```

```
    StEmbedPos = CodesPerBlock*2;
    EndEmbedPos = CodesPerBlock*3-1;
    StEmbedRecPos = CodesPerBlock*3;
    GetQualFactorSets(MQFset, MQF2set);

/*Decide Color or mono */
    vratio = 1;  hratio = 1; Ncolor = 1; i=0;
    while(i< Imwidth*Imheight && Ncolor ==1) {
       px = *(*(orgImg+(i%Imwidth))+(i/Imwidth));
       if( (px & 0xff) != ((px & 0xff00) >> 8) ||
           ((px & 0xff00) >> 8) != ((px & 0xff0000) >> 16) ||
           (px & 0xff) != ((px & 0xff0000) >> 16) )
           {hratio = 2; vratio = 2; Ncolor = 3;}
       i++;
    } fcode = (char *)malloc(Imwidth*Imheight/64*CodesPerBlock);
    Errormap = (char *)malloc( (int)Imwidth * (int)Imheight /64);

if(authmode == 0 || authmode == 1) {

/* Reconstruct Auth Bits */
    ReadAuthBits( Imwidth, Imheight,
                 (int)hratio, (int)vratio, Ncolor, orgImg, fcode);

RearrangeAuthBits(fcode, (int)Imwidth, (int)Imheight);

/* printf("hr=%d, vr=%d, Nc=%d\n", hratio, vratio, Ncolor);

Infile = fopen("fcodes.dat","rb");
    for(i=0; i<CodesPerBlock*Imwidth*Imheight/64; i++) {
      fc = fscanf(Infile, "%c", &fc);
      if( (*(fcode+i) == -1 && fc == 1) || (*(fcode+i) == 1 && fc == 0) )
        printf("(%d, %d, %d, %d, %d)\n", (i/CodesPerBlock)%(Imwidth/8),
                (i/CodesPerBlock)/(Imwidth/8), i%CodesPerBlock, fc,
    *(fcode+i));
    }
    fclose(Infile); */

/* Extract Authbit Watermark */ quality = MinQualityFactor;
    GetQuantizationTable(quality, DeQT, DeColorQT);

DetectRawWatermarkData( (int)Imwidth, (int)Imheight,
             (int)hratio, (int)vratio, Ncolor, orgImg, Img, fcode,
             DeQT, DeColorQT, Errormap);

}

/* Reconstruct Ercovery Bits */
```

```
    if(authmode == 1) { quality = MinQF2;
        GetQuantizationTable(quality, DeQT2, DeColorQT2);

RecoverRawManipulatedData( (int)Imwidth, (int)Imheight,
                (int)hratio, (int)vratio, Ncolor, orgImg, Img,
                DeQT2, DeColorQT2, Errormap);
    } if(authmode == 2) {  /* This process should be done first to decide
QFs */

/* Reconstruct Auth Bits */
    ReadAuthBits(Imwidth, Imheight,
                (int)hratio, (int)vratio, Ncolor, orgImg, fcode);
    RearrangeAuthBits(fcode, (int)Imwidth, (int)Imheight);

/* Extract Authbit Watermark */
    minfbs = Imwidth/8*Imheight/8*CodesPerBlock;
    for(mqfnum=0; mqfnum<TotalMQFsets; mqfnum++) {
        quality = MQFset[mqfnum];
        GetQuantizationTable(quality, DeQT, DeColorQT);

mqffbs = DetectRawWatermarkData( (int)Imwidth, (int)Imheight,
                (int)hratio, (int)vratio, Ncolor, orgImg, Img, fcode,
                DeQT, DeColorQT, Errormap);
        if(mqffbs < minfbs) {minmqf = mqfnum; minfbs = mqffbs;}
    }
    /* printf("minfbs = %d\n", minfbs); */
    MinQualityFactor= MQFset[minmqf];
    MinQF2 = MQF2set[minmqf];

}
} void detectRawwatermark(orgImg, Img, Imwidth, Imheight, authmode,
errorBound)
int **orgImg, **Img;
int Imwidth, Imheight, authmode, errorBound;
{
  Tau = errorBound;
  detectRawwatermarkMain(orgImg, Img, Imwidth, Imheight, 2);
  detectRawwatermarkMain(orgImg, Img, Imwidth, Imheight, authmode);
}
```

APPENDIX C:

SOURCE CODE OF SOFTWARE FOR ENCODING RECOVERY DATA, DECODING RECOVERY DATA, DCT, INVERSE DCT, AND OTHER PROCEDURES RELATED TO WATERMARKING, AUTHENTICATION, AND DATA RECOVERY

```
include <math.h> define SEEK_CUR 1
define PI 3.1416
#define CbOffset 128.0
#define CrOffset 128.0
define saveJPEGdirectly 0 void ZigZag(int *i, int *j, int *direction);

int fblock = 0;

/* Variables for reconstructed Huffman Table. 4 groups. Each group
includes */
/* V, CW, and symbol. */
unsigned char *dcV[16],*dcCW[16],*acV[300],*acCW[300];
unsigned char
*ColordcV[16],*ColordcCW[16],*ColoracV[300],*ColoracCW[300];
unsigned int dcsymbol[16],acsymbol[16], Colordcsymbol[16],
Coloracsymbol[16];
unsigned char wbitDCRVlength[16], RSTsymbol;
int InWatermarking, firstblock;

int xxx;

long HuffmanRestore(HuffmanCodes,offset,V,CW,symbol)
unsigned char *HuffmanCodes;
long offset;
unsigned char *V[],*CW[];
unsigned int symbol[];
{
  unsigned char instance,sm, fp;
  int k, Codeword, prev, prevlength;
  long i,j,sum;

instance=*(HuffmanCodes+offset);

sum=0;
  prevlength=0;

for(i=0;i<16;i++)
  {
```

```
      symbol[i]=*(HuffmanCodes+1+i+offset);
      V[i]=(unsigned char *)malloc(symbol[i]);

5    for(j=0;j<symbol[i];j++)
      {

*(V[i]+j)=*(HuffmanCodes+17L+sum+j+offset);
        CW[*(V[i]+j)]=(unsigned char *)malloc(i+1);
10 if(prevlength==0)
          for(k=0;k<(i+1);k++)
              *(CW[*(V[i]+j)]+k)=0;
15      else
        {
        for(k=0;k<prevlength;k++)
              *(CW[*(V[i]+j)]+k)=*(CW[prev]+k);
        *(CW[*(V[i]+j)]+prevlength)=*(CW[prev]+prevlength)+1;
20      for(k=prevlength;k>0;k--)
        {
         if(*(CW[*(V[i]+j)]+k)==2)
            {
              *(CW[*(V[i]+j)]+k)=0;
25            *(CW[*(V[i]+j)]+k-1)=*(CW[*(V[i]+j)]+k-1)+1;
            }
        } if(j==0)
30       *(CW[*(V[i]+j)]+i)=0;

} prev=*(V[i]+j);
35      prevlength=i;

} sum+=symbol[i];
40    } return sum+17L+offset;

}
45 int Skipto(Infile,fpp1,fpp2)
    FILE *Infile;
50  unsigned char fpp1,fpp2;
    {
     unsigned char fp, fp1;
     long bytesread;
     int Place;
55
     Place=0;
     bytesread=0;
```

```
    while(Place==0 && feof(Infile)==0)
    {
     fscanf(Infile,"%c",&fp);
     bytesread++;
5    if(fp==fpp1)
     {
      fscanf(Infile,"%c",&fp1);
      bytesread++;
      if (fp1==fpp2)
10        Place=1;
     }
    } if(Place==0)
15    fseek(Infile,-bytesread,SEEK_CUR);

return Place;
    }

20  /* Read a byte and place it as bits in ibit */
    int ReadData(Infile, ibit, bitp, prevEOI)
    FILE *Infile;
    unsigned char ibit[];
    int *bitp, prevEOI;
25  {
     unsigned char fp0,fp, ib;
     int i,EOI, bitpos;
     FILE *Outfile;

30   EOI=0;

if(prevEOI==0)
     {
     fscanf(Infile,"%c",&fp0);
35
     if(fp0==0xff)
     {
      fscanf(Infile,"%c",&fp);

40    if(fp==0xd9) EOI=1;
      else if(fp>=0xd0 && fp<=0xd7)
      {
       fp0=0;
       EOI=2; RSTsymbol=fp;
45    /* printf("here, RST %d!!\n", RSTsymbol); */
      }   /* RST */
     }
     }

50   else {fp0=0;EOI=prevEOI;} for(bitpos=0; bitpos<8; bitpos++)
     {
55    ib= fp0 << bitpos;
      ib = ib >> 7;
      ibit[bitpos+*bitp]=ib;
```

```
        }
        *bitp+=8;

return EOI;

} int GetCodewordLength(Infile,V,CW,symbol,ibit,bitpos)
    FILE *Infile;
    unsigned char *V[],*CW[];
    unsigned int symbol[];
    unsigned char ibit[];
    int *bitpos;
    {
        int i,j,k,ii,HCread,Match, Dcl;

/* It seems that V is the chart of Fig 5.22(b), CW is its
    corresponding value */
        /* i is the rank of symbol, i+1 is the no of bits for each rank */ i=0;
        HCread=0; /* HCread: Huffman Code has been Read */
        while(HCread==0)
        {
        if(symbol[i]>0)
        {
        j=0;
        while(HCread==0 && j<symbol[i])
        {
          Match=1;
          for(k=0;k<(i+1);k++)
              if(ibit[k]!=*(CW[*(V[i]+j)]+k)) Match=0;

if(Match==1) HCread=1;
          else j++;
        }
        }
        if(HCread!=1) i++;
        if(i>15) HCread=2; /* Add this to avoid bad numbers */
        } if(saveJPEGdirectly) {
          wbitDCRVlength[0] = (unsigned char)i+1;
          for(ii=0; ii<(i+1); ii++)
             wbitDCRVlength[ii+1] = ibit[ii];
        }   /* Record those covered i+1 bits in the next step */ for(ii=0;ii<*bitpos;ii++)
           ibit[ii]=ibit[ii+i+1]; /* ibit (information of bits) shifts i+1
    bits */
        *bitpos-=i+1;
```

```
    /*  <R, V_length>: The first 4 bits of Dcl is R, the others are
V_length */
      if(HCread!=2)  Dcl=*(V[i]+j);  /* <R, V_length> */
      else Dcl=0;

return Dcl;
    } int GetCodeValue(ibit,bitpos,Clength)
    unsigned char ibit[];
    int *bitpos,Clength;
    {
       int i,positive, Cvalue, ii;

positive=ibit[0];
       Cvalue=0;
       for(i=0;i<Clength;i++)
         if(positive==1)
             Cvalue= Cvalue*2 + ibit[i];
         else
             Cvalue= Cvalue*2 - (1-ibit[i]);

for(ii=0;ii<*bitpos;ii++)
          ibit[ii]=ibit[ii+Clength];
       *bitpos-=Clength;

return Cvalue;
    } void ZigZag(i,j,direction)
    int *i,*j,*direction;
    {

*i=*i+*direction;
       *j=*j-*direction;

if(*j<0)
       { *j=0; *direction=*direction*(-1);}
       else if(*j>7)
       { *j=7; *i+=2;*direction=*direction*(-1);} if(*i<0)
       { *i=0; *direction=*direction*(-1);}
       else if(*i>7)
       { *i=7; *j+=2; *direction=*direction*(-1);}

} void DecodeHuffmanBitStream(ibit, ibitlength, DecodedValues,
    V,CW,symbol)
    char *ibit;   /* ibit is the Huffman information bitstream */
    int ibitlength;
```

```
    short DecodedValues[8][8];
    {
      FILE *Infile;
      int i,j,k,ii,HCread,Match, Acl, R, V_length, positive, Cvalue;
5     int direction, zzlength, EOB, ZRL, InsertZero, istzero, zzzrl;

direction=-1; zzlength=2;  i=1;  j=0;  EOB=0;  ZRL=0;
10    InsertZero=0;
      while(zzlength<=64)
      { if(EOB==0 && ZRL==0 && InsertZero==0)
15    {
          Acl = GetCodewordLength(Infile,V,CW,symbol,ibit,&ibitlength);
                  /* Infile is not used. That is a historical reminence
    */
          R = (Acl>>4) & 0x0f;
20        V_length= Acl & 0x0f;
                   /*======  The above process get the codeword length
    =====*/ if(R==0 && V_length==0) EOB=1;
25        else if(R==15 && V_length==0)
                 { ZRL=1; zzzrl=zzlength; }
          else if(R!=0)
                 { InsertZero=1; istzero=zzlength;}
      }
30
      if(zzlength-istzero==R) InsertZero=0;

if(EOB==0 && ZRL==0 && InsertZero==0)
         DecodedValues[i][j]=GetCodeValue(ibit,&ibitlength,V_length);  /*
35    Get V[i][j] */
      else DecodedValues[i][j]=0;

if(zzlength-zzzrl==15) ZRL=0;

40    /* Zig-Zag */

ZigZag(&i,&j,&direction);
      zzlength++;
      }   /* Finish decoding AC coefficients */
45

} void DecodeACHuffmanBitStream(codewords, ibitlength, DecodedValues)
50  char *codewords;
    int ibitlength;
    short DecodedValues[8][8];
    {
     DecodeHuffmanBitStream(codewords, ibitlength, DecodedValues, acV,
55  acCW, acsymbol);
    }
```

```
void DequantizeAndShiftDCT(V, QT)
short V[8][8];
unsigned char QT[8][8];
{
  int i,j;
  unsigned char qtv;

for(j=0;j<8;j++)
  for(i=0;i<8;i++)
  {
   qtv=QT[i][j];
   V[i][j]=V[i][j]*(int)qtv;
  }

/*  printf("DC[0][0] = %d \n",V[0][0]); */ idct(V);

for(i=0;i<8;i++)
  for(j=0;j<8;j++)
    V[i][j]+=128;
} void SaveDefaultHummanTables()
{
 unsigned char *HuffmanCodes, HuffCodeType, Ncolor, impar[2];
 unsigned short int HuffCodeLength;
 FILE *Infile, *Outfile;

Infile = fopen("images/clena256.jpg","rb");
 Outfile = fopen("HuffmanTable.dat","ab");

while(Skipto(Infile,0xff,0xc4)!=0){   /* DHT */
 fprintf(Outfile,"%c%c",0xff,0xc4);
 fread(impar,2L,1L,Infile);
 fwrite(impar,2L,1L,Outfile);
  HuffCodeLength= impar[1]+impar[0]*256;
 HuffmanCodes=(unsigned char *)malloc((long)HuffCodeLength-2);
 fread(HuffmanCodes, (long)HuffCodeLength-2, 1L, Infile);
 fwrite(HuffmanCodes, (long)HuffCodeLength-2, 1L, Outfile);

free(HuffmanCodes);
 } fclose(Infile);
 fclose(Outfile);
}
```

```
void ReadDefaultHummanTables( )
{
  unsigned char *HuffmanCodes, HuffCodeType, Ncolor, impar[2];
  unsigned short int HuffCodeLength;
  FILE *Infile;
  long offset;
  int i;

Infile = fopen("HuffmanTable.dat","rb");
/*  Infile = fopen("images/lena128q25.jpg","rb"); */
  Ncolor = 3;

/*  while(Skipto(Infile,0xff,0xc4)!=0){ */
  Skipto(Infile,0xff,0xc4);
  fread(impar,2L,1L,Infile);
     HuffCodeLength= impar[1]+impar[0]*256;
  fread(&HuffCodeType,1L,1L,Infile);
  fseek(Infile,-1L,SEEK_CUR);
  HuffmanCodes=(unsigned char *)malloc((long)HuffCodeLength-2);
  fread(HuffmanCodes, (long)HuffCodeLength-2, 1L, Infile);
  offset=0L;
  if(HuffCodeType == 0x00) {
   offset=HuffmanRestore(HuffmanCodes,offset,dcV,dcCW,dcsymbol);
   if(Ncolor==3) {   /* Color Huffman Tables (for photoshop) */ offset=HuffmanRestore(HuffmanCodes,offset,ColordcV,ColordcCW,Colordcs
ymbol);
   offset=HuffmanRestore(HuffmanCodes,offset,acV,acCW,acsymbol);

offset=HuffmanRestore(HuffmanCodes,offset,ColoracV,ColoracCW,Coloracs
ymbol);
   }
   else offset=HuffmanRestore(HuffmanCodes,offset,acV,acCW,acsymbol);
     /* Read BW AC Huffman Table Only (for photoshop) */
  }
  else if(HuffCodeType == 0x10) {
   offset=HuffmanRestore(HuffmanCodes,offset,acV,acCW,acsymbol);
  }
  else if(HuffCodeType == 0x01) { offset=HuffmanRestore(HuffmanCodes,offset,ColordcV,ColordcCW,Colordcs
ymbol);
  }
  else if(HuffCodeType == 0x11) { offset=HuffmanRestore(HuffmanCodes,offset,ColoracV,ColoracCW,Coloracs
ymbol);
  }
//  printf("HuffCodeType = %d \n", HuffCodeType);
//  printf(""); /* This is wierd. Program does not work unless we put
this line */
// }
}
```

```c
  free(HuffmanCodes);
  fclose(Infile);
} void WriteSymbol(s1,s2, wbitpos, Prevbits)
unsigned char s1,s2;
int *wbitpos;
int *Prevbits;
{
 unsigned char pb;
 int wb;
 FILE *Outfile;

Outfile = fopen("output_temp.jpg","ab");

wb = *wbitpos;
  /* printf("wbitpos=%d ",wb); */
   if(wb >0) {
   pb = (unsigned char) (*Prevbits & 0xff);
   pb = ( pb << (8 - wb) ); /*Photoshop fill the empty with one, I use zero */
     fprintf(Outfile,"%c",pb);  fblock++;
     *wbitpos=0; *Prevbits=0;
   } fprintf(Outfile,"%c%c",s1,s2); fblock++; fblock++;
  fclose(Outfile);
} void WriteBit(bittowrite, wbitpos, Prevbits)
int bittowrite;
int *wbitpos;
int *Prevbits;
{
 unsigned char pb;
 FILE *Outfile;

*Prevbits = ( *Prevbits << 1 ) | bittowrite;
 *wbitpos = *wbitpos +1;

if( *wbitpos == 8) {
   Outfile = fopen("output_temp.jpg","ab");
   pb = (unsigned char) (*Prevbits & 0xff);
   fprintf(Outfile,"%c",pb); fblock++;
   if(pb == 255) {fprintf(Outfile,"%c",(unsigned char)0); fblock++;}
   fclose(Outfile);

*wbitpos = 0;
   *Prevbits = 0;
  }
}
```

```
      int PutCodeword( ACcoeff,Vchart,CW,symbol,wbitpos,Prevbits,
      firstblock)
5     short ACcoeff[8][8];
      unsigned char *Vchart[],*CW[];
      unsigned int symbol[];
      int *wbitpos, *Prevbits;
      int *firstblock;
10    {
         int i,j,k, direction, zzlength, rn;
         int RV[63][2], R, V, V_length, runnumber, RVlengthV[63][3], tmpV;
         int HCread, RVlengthpair, EOB;

15       *firstblock = fblock;

if(ACcoeff[7][7]!=0) EOB=0;
         else EOB=1;  /* A particular situation.
                         If runs include all coeff, we don't need EOB */
20

/* RLE */ i=1; j=0; direction=-1; zzlength=2; runnumber=0; R=0; RV[0][0] = 0;
25    RV[0][1]=0;
         while(zzlength<=64) {
            if(ACcoeff[i][j] == 0) { R++;}
            else {
               while(R>=16) {
30                RV[runnumber][0] = 15;
                  RV[runnumber][1] = 0;
                  runnumber++; R=R-16;
               } /* ZRL */
               RV[runnumber][0] = R;
35             RV[runnumber][1] = (int)ACcoeff[i][j];
               runnumber++; R=0;
            }

ZigZag(&i,&j,&direction);
40          zzlength++;
         }

45
         /* Write RLE to the form of <R,V_length><V> */ for( i=0; i< runnumber; i++) {

50          V = RV[i][1];
            if(V==0) {V_length=0;}
            else
            {
               tmpV = V; if(V<0) tmpV = -V;
55             V_length = 10;
               while( (( tmpV & (0x1 << V_length)) << V_length )== 0 &&
      V_length>=0)
```

```
              V_length--;
           V_length++;
         }
         if(V<0) {
            V = -V; tmpV=0;
            for (j=0; j<V_length; j++)   tmpV += !( V & (0x1 << j)) << j;
            V=tmpV;
         }

RVlengthV[i][0] = RV[i][0];
         RVlengthV[i][1] = V_length;
         RVlengthV[i][2] = V;

}

/* VLC */ for(rn=0; rn<runnumber+1; rn++) { if(rn<runnumber) {
            R = RVlengthV[rn][0];
            V_length = RVlengthV[rn][1];
            V = RVlengthV[rn][2];
         }
         else {R=0; V_length=0; } /* EOB */ i=0;
         HCread=0; /* HCread: Huffman Code has been Read */
         while(HCread==0) /* From the chart to look for a pair of
      <R,V_length> */
         {
            if(symbol[i]>0)
            {
               j=0;
               while(HCread==0 && j<symbol[i])
               {
                  RVlengthpair = *(Vchart[i]+j);
                  if( (RVlengthpair >> 4) == R   &&
                      (RVlengthpair & 0x0f) == V_length) HCread=1;
                  else j++;
               }
            }
            if(HCread!=1) i++;
         }

/* Huffman Codeword will be *(CW[RVlengthpair]+....), totally
      symbol[i]+1 bits */ if( rn<runnumber || EOB == 1) {
         for( k=0; k<i+1; k++)
            WriteBit(*(CW[RVlengthpair]+k), wbitpos, Prevbits);
         }
```

```
    if(rn<runnumber && !(R==15 && V_length==0) ) {
        for( k=V_length-1; k>=0; k--)
            WriteBit((V & (0x1 << k)) >> k, wbitpos, Prevbits);
    } /* Write Codes except the EOB & ZRL */

/*  if(fblock<1760 && fblock>1730) { printf("fblock=%d",fblock);
        printf("\nAC: <%d,%d,%d>", R, V_length,V);
        for( k=0; k<i+1; k++)
          printf("%d",*(CW[RVlengthpair]+k));
        printf("\n");
        if(rn<runnumber) {
        for( k=V_length-1; k>=0; k--)
           printf("%d", ((V & (0x1 << k)) >> k));
        }
        } */

} return 1;

} void GetACEntropyCode(ACcoeff, Vchart, CW, symbol, entropycode,
ecbitnumber)
short ACcoeff[8][8];
unsigned char *Vchart[],*CW[];
unsigned int symbol[];
unsigned char *entropycode;
int *ecbitnumber;
{
   int i,j,k, direction, zzlength, rn;
   int RV[64][2], R, V, V_length, runnumber, RVlengthV[64][3], tmpV,
Vb;
   int HCread, RVlengthpair, EOB;
   int bitcount;

if(ACcoeff[7][7]!=0) EOB=0;
   else EOB=1;  /* A particular situation.
                   If runs include all coeff, we don't need EOB */

/* RLE */
```

```
      i=1; j=0; direction=-1; zzlength=2; runnumber=0; R=0; RV[0][0] = 0;
   RV[0][1]=0;
      while(zzlength<=64) {
         if(ACcoeff[i][j] == 0) { R++;}
         else {
            while(R>=16) {
               RV[runnumber][0] = 15;
               RV[runnumber][1] = 0;
               runnumber++; R=R-16;
            } /* ZRL */
            RV[runnumber][0] = R;
            RV[runnumber][1] = (int)ACcoeff[i][j];
            runnumber++; R=0;
         }

ZigZag(&i,&j,&direction);
         zzlength++;
      }

/* Write RLE to the form of <R,V_length><V> */ for( i=0; i< runnumber; i++) {

V = RV[i][1];

/*    if(xxx==0) printf("%d ",V); */ if(V==0) {V_length=0;}
      else
      {
      /*  V_length = (int)floor( log( (double)abs(V) ) / log(2.0) ) +
   1; */
         tmpV = V; if(V<0) tmpV = -V;
         V_length = 10;
         while( (( tmpV & (0x1 << V_length)) << V_length )== 0 &&
   V_length>=0)
                  V_length--;
         V_length++;
      } if(V<0) {
         V = -V; tmpV=0;
         for (j=0; j<V_length; j++)  tmpV += !( V & (0x1 << j)) << j;
         V=tmpV;
      }

RVlengthV[i][0] = RV[i][0];
      RVlengthV[i][1] = V_length;
      RVlengthV[i][2] = V;

}
```

```
    /* VLC */
    /* for(i=0;i<15;i++) printf("%d ",symbol[i]); */

5
    bitcount = 0;
    for(rn=0; rn<runnumber+1; rn++) {

10      if(rn<runnumber) {
            R = RVlengthV[rn][0];
            V_length = RVlengthV[rn][1];
            V = RVlengthV[rn][2];
        }
15      else {R=0; V_length=0; } /* EOB */ i=0;
20      HCread=0; /* HCread: Huffman Code has been Read */
        /* From the chart to look for a pair of <R,V_length> */
        while(HCread==0)
        {
            if(symbol[i]>0)
25          {
                j=0;
                while(HCread==0 && j<symbol[i])
                {
                    RVlengthpair = *(Vchart[i]+j);
30
                    if( (RVlengthpair >> 4) == R &&
                        (RVlengthpair & 0x0f) == V_length) HCread=1;
                    else j++;
                }
35          }
            if(HCread!=1) i++;

/* if(i>=16) { HCread = 1;  printf("( R=%d,
    V_length=%d)\n",R,V_length); } */
40      }

/* Huffman Codeword will be *(CW[RVlengthpair]+....), totally
    symbol[i]+1 bits */

45      if( rn<runnumber || EOB == 1) {
            for( k=0; k<i+1; k++) {
                *(entropycode+bitcount) = *(CW[RVlengthpair]+k);
                bitcount++;
            }
50      }   /* Write <R,V_length> */ if(rn<runnumber && !(R==15 && V_length==0) ) {
            for( k=V_length-1; k>=0; k--) {
                *(entropycode+bitcount) = (V & (0x1 << k)) >> k;
55              bitcount++;
            }
        }       /* Write Codes except the EOB & ZRL */
```

```
/*      if(xxx==15) {
           printf("fblock=%d",xxx);
           printf("\nAC: <%d,%d,%d>", R, V_length,V);
           for( k=0; k<i+1; k++)
             printf("%d",*(CW[RVlengthpair]+k));
           printf("\n");
           if(rn<runnumber) {
           for( k=V_length-1; k>=0; k--)
              printf("%d", ((V & (0x1 << k)) >> k));
           }
           } */
        }

*ecbitnumber = bitcount;

} void GetDCEntropyCode(DCcoeff, Vchart, CW, symbol, entropycode,
ecbitnumber)
short DCcoeff;
unsigned char *Vchart[],*CW[];
unsigned int symbol[];
unsigned char *entropycode;
int *ecbitnumber;
{
  int i,j,k;
  int V, V_length, tmpV;
  int HCread, RVlengthpair;
  int bitcount;

V = (int)DCcoeff;

if(V==0) {V_length=0;}
     else
     { tmpV = V; if(V<0) tmpV = -V;
        V_length = 10;
        while( (( tmpV & (0x1 << V_length)) << V_length )== 0 &&
V_length>=0)
              V_length--;
        V_length++;
     } if(V<0) {
        V = -V; tmpV=0;
        for (j=0; j<V_length; j++)   tmpV += !( V & (0x1 << j)) << j;
        V=tmpV;
     }

/* VLC */
     i=0;
     HCread=0; /* HCread: Huffman Code has been Read */
```

```
    /* From the chart to look for a pair of <R,V_length> */
    while(HCread==0)
    {
       if(symbol[i]>0)
       {
          j=0;
          while(HCread==0 && j<symbol[i])
          {
               RVlengthpair = *(Vchart[i]+j);
               if( (RVlengthpair & 0x0f) == V_length) HCread=1;
               else j++;
          }
       }
       if(HCread!=1) i++;
    }

/* Huffman Codeword will be *(CW[RVlengthpair]+....), totally
symbol[i]+1 bits */
   bitcount = 0;
       for( k=0; k<i+1; k++) {
          *(entropycode+bitcount) = *(CW[RVlengthpair]+k);
          bitcount++;
       }   /* Write <R,V_length> */ for( k=V_length-1; k>=0; k--) {
         *(entropycode+bitcount) = (V & (0x1 << k)) >> k;
         bitcount++;
       }    /* Write Codes except the EOB & ZRL */

*ecbitnumber = bitcount;

} void GetDCPCMCode(DCcoeff, dccode, dcbitnumber)
short DCcoeff;
unsigned char *dccode;
int dcbitnumber;
{
  int i;
  char dcvalue;

dcvalue = (char)DCcoeff;
  if(dcvalue>=0) *dccode = 0;
  else {*dccode = 1; dcvalue = -dcvalue;} for (i=1; i<dcbitnumber; i++)
    *(dccode+i) = (dcvalue >> (dcbitnumber-1-i) ) & 1 ;
} void InitialHuffmanTables()
{
 int i,j;
/* SaveDefaultHummanTables(); */
 ReadDefaultHummanTables();
```

```
      xxx=0;

}
    void GetBlockEntropyCode(DCTcoef, ecbits, ecbitnums, dcbitnum)
    int DCTcoef[64];
    unsigned char *ecbits;
    int *ecbitnums;
    int dcbitnum;
    {
     int i,j;
     unsigned char *entropycode, *dcentropycode;
     short DCTcoeff[8][8];
     int ecbitnumber;

for(i=0;i<8;i++) for(j=0;j<8;j++) DCTcoeff[i][j] =
    (short)DCTcoef[i+j*8];

entropycode = (unsigned char *)malloc(1024L);
     dcentropycode = (unsigned char *)malloc(64L);

/*   if(xxx==15) {
         for(j=0;j<8;j++) { printf("\n");
         for(i=0;i<8;i++) printf("%d ",DCTcoeff[i][j]); }
       } */

GetACEntropyCode(DCTcoeff, acV, acCW, acsymbol, entropycode,
    &ecbitnumber);

/* GetDCEntropyCode(DCTcoeff[0][0], dcV, dcCW, dcsymbol,
    dcentropycode, &dcbitnum); */

/* Use PCM of each value instead of Entropy Coding */
     GetDCPCMCode(DCTcoeff[0][0], dcentropycode, dcbitnum);

*ecbitnums = dcbitnum+ecbitnumber;

for(i=0; i< dcbitnum; i++) *(ecbits+i) = *(dcentropycode+i);
     for(i=0; i< ecbitnumber; i++) *(ecbits+dcbitnum+i) =
    *(entropycode+i);

/* if(xxx == 14 || xxx==15 || xxx==122) {
     printf("\n(%d, DC%d, E%d) ", xxx, dcbitnum, dcbitnum+ecbitnumber);
     for(i=0;i<dcbitnum+ecbitnumber;i++) printf("%d",*(ecbits+i));
     } */ xxx++;

free(entropycode);
     free(dcentropycode);
    }
```

What is claimed is:

1. An image-processing method, comprising:

comparing a first transformed-domain image datum to a second transformed-domain image datum, for deriving a first authentication code, the first transformed-domain image datum having a first transformed-domain location, and the second transformed-domain image datum having a second transformed-domain location; and using a replacement code to replace at least a portion of a third transformed-domain image datum, for converting the third transformed-domain image datum into a fourth transformed-domain image datum, the replacement code comprising at least one of the first authentication code, a code derived from the first authentication code, a code selected based upon at least the first authentication code, and a code selected based upon at least the code derived from the first authentication code, the fourth transformed-domain image datum having a third transformed-domain location, the first transformed-domain image datum being for deriving a fifth transformed-domain image datum having a fourth transformed-domain location, the second transformed-domain image datum being for deriving a sixth transformed-domain image datum having a fifth transformed-domain location, the fourth transformed-domain image datum being for deriving a seventh transformed-domain image datum having a sixth transformed-domain location, the fourth transformed-domain location being approximately equal to the first transformed-domain location, the fifth transformed-domain location being approximately equal to the second transformed-domain location, and the sixth transformed-domain location being approximately equal to the third transformed-domain location, wherein the fifth, sixth, and seventh transformed-domain image data are for being authenticated by an authentication procedure comprising the steps of:

using an authentication code extraction function to extract a second authentication code from the seventh transformed-domain image datum, comparing the fifth transformed-domain image datum to the sixth transformed-domain image datum, for deriving a first comparison result, based on the second authentication code, selecting a set of at least one acceptable value of the first comparison result, and if the first comparison result is not within the set of at least one acceptable value of the first comparison result, determining that at least one of the fifth, sixth, and seventh transformed-domain image data has been improperly altered.

2. A method according to claim 1, wherein the first transformed-domain image datum is included in a first set of transformed-domain image data, the second transformed-domain image datum is included in a second set of transformed-domain image data, the fifth transformed-domain image datum is included in a third set of transformed-domain image data, and the sixth transformed-domain image datum is included in a fourth set of transformed-domain image data, the method further comprising:

using a first secret mapping to form an association between the first and second sets of transformed-domain image data; and using the association between the first and second sets of transformed-domain image data for selecting at least one of the first and second transformed-domain image data to be compared in the step of comparing the first transformed-domain image datum to the second transformed-domain image datum, wherein the authentication procedure further comprises the steps of:

using the first secret mapping to form an association between the third and fourth sets of transformed-domain image data, and using the association between the third and fourth sets of transformed-domain image data for selecting at least one of the fifth and sixth transformed-domain image data to be compared in the step of comparing the fifth transformed-domain image datum to the sixth transformed-domain image datum.

3. A method according to claim 2, wherein the first and second sets of transformed-domain image data are included in a fifth set of transformed-domain image data, the third transformed-domain image datum is included in a sixth set of transformed-domain image data, the third and fourth sets of transformed-domain image data are included in a seventh set of transformed-domain image data, and the seventh transformed-domain image datum is included in an eighth set of transformed-domain image data, the method further comprising:

using a second secret mapping to form an association between the fifth and sixth sets of transformed-domain image data; and using the association between the fifth and sixth sets of transformed-domain image data for selecting the third transformed-domain image datum to be converted, in the step of using the replacement code, into the fourth transformed-domain image datum, wherein the authentication procedure further comprises the steps of:

using the second secret mapping to form an association between the seventh and eighth sets of transformed-domain image data, and using the association between the seventh and eighth sets of transformed-domain image data for selecting the seventh transformed-domain image datum to be a datum from which the second authentication code is extracted in the step of using the authentication code extraction function to extract the second authentication code.

4. A method according to claim 1, wherein the first and second transformed-domain image data are included in a first set of transformed-domain image data, the third transformed-domain image datum is included in a second set of transformed-domain image data, the fifth and sixth transformed-domain image data are included in a third set of transformed-domain image data, and the seventh transformed-domain image datum is included in a fourth set of transformed-domain image data, the method further comprising:

using a first secret mapping to form an association between the first and second sets of transformed-domain image data; and using the association between the first and second sets of transformed-domain image data for selecting the third transformed-domain image datum to be converted, in the step of using the replacement code, into the fourth transformed-domain image datum, wherein the authentication procedure further comprises the steps of:

using the first secret mapping to form an association between the third and fourth sets of transformed-domain image data, and using the association between the third and fourth sets of transformed-domain image data for selecting the seventh transformed-domain image datum to be a datum from which the second authentication code is extracted in the step of using the authentication code extraction function to extract the second authentication code.

5. A method according to claim 1, wherein the first transformed-domain image datum is included in a first set of transformed-domain image data, the second transformed-domain image datum is included in a second set of transformed-domain image data, the fifth transformed-domain image datum is included in a third set of transformed-domain image data, and the sixth transformed-domain image datum is included in a fourth set of transformed-domain image data, the method further comprising:

using a first secret transformed-domain location selection pattern for selecting the first transformed-domain image datum to be compared in the step of comparing the first transformed-domain image datum to the second transformed-domain image datum, the first secret transformed-domain location selection pattern comprising at least a first datum selection location, the first transformed-domain location being approximately equal to the first datum selection location in a coordinate system of the first set of transformed-domain image data; and using the first secret transformed-domain location selection pattern for selecting the second transformed-domain image datum to be compared in the step of comparing the first transformed-domain image datum to the second transformed-domain image datum, the second transformed-domain location being approximately equal to the first datum selection location in a coordinate system of the second set of transformed-domain image data, wherein the authentication procedure further comprises the steps of:

using the first secret transformed-domain location selection pattern for selecting the fifth transformed-domain image datum to be compared in the step of comparing the fifth transformed-domain image datum to the sixth transformed-domain image datum, the fourth transformed-domain location being approximately equal to the first datum selection location in a coordinate system of the third set of transformed-domain image data, and using the first secret transformed-domain location selection pattern for selecting the sixth transformed-domain image datum to be compared in the step of comparing the fifth transformed-domain image datum to the sixth transformed-domain image datum, the fifth transformed-domain location being approximately equal to the first datum selection location in a coordinate system of the fourth set of transformed-domain image data.

6. A method according to claim 5, wherein the third transformed-domain image datum is included in a fifth set of transformed-domain image data, and the seventh transformed-domain image datum is included in a sixth set of transformed-domain image data, the method further comprising using a second secret transformed-domain location selection pattern for selecting the third transformed-domain image datum to be converted, in the step of using the replacement code, into the fourth transformed-domain image datum, the third transformed-domain image datum having the third transformed-domain location, the second secret transformed-domain location selection pattern comprising at least a second datum selection location, the third transformed-domain location being approximately equal to the second datum selection location in a coordinate system of the fifth set of transformed-domain image data, wherein the authentication procedure further comprises using the second secret transformed-domain location selection pattern for selecting the seventh transformed-domain image datum to be a datum from which the second authentication code is extracted in the step of using the authentication code extraction function to extract the second authentication code, the sixth transformed-domain location being approximately equal to the second datum selection location in a coordinate system of the sixth set of transformed-domain image data.

7. A method according to claim 1, wherein the third transformed-domain image datum is included in a first set of transformed-domain image data, and the seventh transformed-domain image datum is included in a second set of transformed-domain image data, the method further comprising using a secret transformed-domain location selection pattern for selecting the third transformed-domain image datum to be converted, in the step of using the replacement code, into the fourth transformed-domain image datum, the third transformed-domain image datum having the third transformed-domain location, the secret transformed-domain location selection pattern comprising at least a datum selection location, the third transformed-domain location being approximately equal to the datum selection location in a coordinate system of the first set of transformed-domain image data, wherein the authentication procedure further comprises using the secret transformed-domain location selection pattern for selecting the seventh transformed-domain image datum to be a datum from which the second authentication code is extracted in the step of using the authentication code extraction function to extract the second authentication code, the sixth transformed-domain location being approximately equal to the datum selection location in a coordinate system of the second set of transformed-domain image data.

8. A method according to claim 1, wherein the portion of the third transformed-domain image datum comprises a bit of the third transformed-domain image datum, and the first authentication code comprises an authentication bit, the method further comprising processing the authentication bit and a bit of a secret key by a binary operation, for deriving an encrypted bit, the replacement code comprising at least one of the encrypted bit, a code derived from the encrypted bit, and a code selected based upon the encrypted bit.

9. A method according to claim 1, wherein the portion of the third transformed-domain image datum comprises a bit of the third transformed-domain image datum, and the replacement code comprises at least one of a bit of the first authentication code and a code selected based upon the bit of the first authentication code.

10. A method according to claim 1, wherein the authentication procedure further comprises:

using the authentication code extraction function to extract a first set of authentication codes from at least one portion of a first set of transformed-domain image data, the first set of transformed-domain image data including the sixth transformed-domain image datum;

comparing at least one portion of a second set of transformed-domain image data to at least one portion of a third set of transformed-domain image data, for deriving a first set of comparison results;

based on each of the first set of authentication codes, selecting a set of at least one acceptable value of a member of the first set of comparison results associated with the each of the first set of authentication codes;

if the member of the first set of comparison results associated with the each of the first set of authentication codes is within the set of at least one acceptable value of the member of the first set of comparison results associated with the each of the first set of authentication codes, determining that the first set of transformed-domain image data has not been improperly altered.

11. A method according to claim 10, wherein the authentication procedure further comprises:
  using the authentication code extraction function to extract a second set of authentication codes from at least one portion of a fourth set of transformed-domain image data;
  comparing at least one portion of a fifth set of transformed-domain image data to at least one portion of a sixth set of transformed-domain image data, for deriving a second set of comparison results, the fifth set of transformed-domain image data including the seventh transformed-domain image datum;
  based on each of the second set of authentication codes, selecting a set of at least one acceptable value of a member of the second set of comparison results associated with the each of the second set of authentication codes;
  if the member of the second set of comparison results associated with the each of the second set of authentication codes is within the set of at least one acceptable value of the member of the second set of comparison results associated with the each of the second set of authentication codes, determining that the fifth set of transformed-domain image data has not been improperly altered.

12. A method according to claim 11, wherein the authentication procedure further comprises the step of: if the member of the first set of comparison results associated with the each of the first set of authentication codes is within the set of at least one acceptable value of the member of the first set of comparison results associated with the each of the first set of authentication codes, and if the member of the second set of comparison results associated with the each of the second set of authentication codes is within the set of at least one acceptable value of the member of the second set of comparison results associated with the each of the second set of authentication codes, determining that a seventh set of transformed-domain image data has been improperly altered, the seventh set of transformed-domain image data including the fifth transformed-domain image datum.

13. A method according to claim 10, wherein the authentication procedure further comprises:
  using the authentication code extraction function to extract a second set of authentication codes from at least one portion of a fourth set of transformed-domain image data, the fourth set of transformed-domain image data including the fifth transformed-domain image datum;
  comparing at least one portion of a fifth set of transformed-domain image data to at least one portion of a sixth set of transformed-domain image data, for deriving a second set of comparison results;
  based on each of the second set of authentication codes, selecting a set of at least one acceptable value of a member of the second set of comparison results associated with the each of the second set of authentication codes;
  if the member of the second set of comparison results associated with the each of the second set of authentication codes is within the set of at least one acceptable value of the member of the second set of comparison results associated with the each of the second set of authentication codes, determining that the fourth set of transformed-domain image data has not been improperly altered.

14. A method according to claim 13, wherein the authentication procedure further comprises the step of: if the member of the first set of comparison results associated with the each of the first set of authentication codes is within the set of at least one acceptable value of the member of the first set of comparison results associated with the each of the first set of authentication codes, and if the member of the second set of comparison results associated with the each of the second set of authentication codes is within the set of at least one acceptable value of the member of the second set of comparison results associated with the each of the second set of authentication codes, determining that a seventh set of transformed-domain image data has been improperly altered, the seventh set of transformed-domain image data including the seventh transformed-domain image datum.

15. An image-processing method, comprising:
  encoding by an encoding function a first set of transformed-domain image data, for deriving a set of image data recovery codes comprising a first image data recovery code, the first set of transformed-domain image data being included in a second set of transformed-domain image data, the second set of transformed-domain image data being derived from a first set of spatial domain image data; and
  using a replacement code to replace at least a portion of a first transformed-domain image datum, for converting the first transformed-domain image datum into a second transformed-domain image datum, the first transformed-domain image datum being included in a third set of transformed-domain image data, the third set of transformed-domain image data being derived from the first set of spatial domain image data, the replacement code comprising at least one of the first image data recovery code, a code derived from the first image data recovery code, a code selected based upon at least the first image data recovery code, and a code selected based upon at least the code derived from the first image data recovery code, the second transformed-domain image datum being for deriving a third transformed-domain image datum, the first set of spatial domain image data being for deriving a fourth set of transformed-domain image data, the third transformed-domain image datum being for deriving, by a recovery procedure, an approximation data set for replacing the fourth set of transformed-domain image data, and the recovery procedure comprising the steps of:
    using a recovery code extraction function to extract a second image data recovery code from the third transformed-domain image datum, the second image data recovery code being approximately equal to the first image data recovery code; and
    decoding by a decoding function at least the second image data recovery code, for deriving the approximation data set, the decoding function comprising a functional inverse of the encoding function.

16. A method according to claim 15, further comprising:
  averaging a second set of spatial domain image data, for deriving a first reduced image datum;
  averaging a third set of spatial domain image data, for deriving a second reduced image datum, the first and second reduced image data being included in a reduced set of spatial domain image data, and the second and third sets of spatial domain image data being included in the first set of spatial domain image data;

domain-transforming the reduced set of spatial domain image data, for deriving a fifth set of transformed-domain image data; and quantizing the fifth set of transformed-domain image data, for deriving the first set of transformed-domain image data.

17. A method according to claim 16, wherein the portion of the first transformed-domain image datum comprises a bit of the first transformed-domain image datum, and the first image data recovery code comprises a data recovery bit.

18. A method according to claim 17, further comprising processing the data recovery bit and a bit of a secret key by a binary operation, for deriving an encrypted bit, the replacement code comprising at least one of the encrypted bit, a code derived from the encrypted bit, and a code selected based upon the encrypted bit.

19. A method according to claim 15, wherein the portion of the first transformed-domain image datum comprises a bit of the first transformed-domain image datum, and the first image data recovery code comprises a data recovery bit.

20. A method according to claim 19, further comprising processing the data recovery bit and a bit of a secret key by a binary operation, for deriving an encrypted bit, the replacement code comprising at least one of the encrypted bit, a code derived from the encrypted bit, and a code selected based upon the encrypted bit.

21. A method according to claim 15, wherein the encoding function comprises an entropy encoding function.

22. A method according to claim 21, wherein the entropy encoding function comprises at least one of a Huffman encoding function and a JPEG entropy encoding function.

23. An image-processing method, comprising:
quantizing a first set of transformed-domain image data based on a first quantization step size, for deriving a second set of transformed-domain image data, the second set of transformed-domain image data including at least a first transformed-domain image datum; and using a replacement code to replace at least a portion of the first transformed-domain image datum, for converting the first transformed-domain image datum into a second transformed-domain image datum, the second transformed-domain image datum being included in a third set of transformed-domain image data, the replacement code comprising at least one of a watermark code, a code derived from the watermark code, a code selected based on the watermark code, and a code selected based upon at least the code derived from the watermark code, wherein the third set of transformed-domain image data is for being altered by an alteration procedure for deriving a fourth set of transformed-domain image data, the alteration procedure comprising at least one of: (1) quantizing the third set of transformed-domain image data based on a second quantization step size, the second quantization step size being no greater than the first quantization step size, (2) transforming a data encoding format of the third set of transformed-domain image data into a different data encoding format, and (3) filtering the third set of transformed domain image data, the fourth set of transformed-domain image data including at least a third transformed-domain image datum, and the third transformed-domain image datum being derived from the second transformed-domain image datum, wherein the third transformed-domain image datum is for being processed by a watermark extraction procedure for extracting the watermark code from the third transformed-domain image datum, the watermark extraction procedure comprising the steps of:
requantizing the third transformed-domain image datum based on the first quantization step size, for generating a fourth transformed-domain image datum, and
processing the fourth transformed-domain image datum by a watermark extraction function, for deriving an extracted code approximately equal to the watermark code.

24. A method according to claim 23, wherein the first set of transformed domain image data includes a fifth transformed-domain image datum, the first transformed-domain datum being derived from the fifth transformed-domain image datum, and the method further comprising deriving the watermark code based on at least one datum derived from at least a first portion of a set of spatial domain image data, the fifth transformed-domain image datum being derived from a second portion of the set of spatial domain image data.

25. A method according to claim 24, further comprising:
using a secret mapping to form an association between at least the first transformed-domain image datum and at least the datum derived from the first portion of the set of spatial domain image data; and
using the association between the at least the first transformed-domain image datum and the at least the datum derived from the first portion of the set of spatial domain image data for selecting the first transformed-domain image datum to be converted, in the step of using the first replacement code, into the second transformed-domain image datum.

26. A method according to claim 23, wherein the first transformed-domain image datum has a secret transformed-domain location.

27. An image-processing apparatus, comprising:
a first processor for comparing a first transformed-domain image datum to a second transformed-domain image datum, for deriving a first authentication code, the first transformed-domain image datum having a first transformed-domain location, and the second transformed-domain image datum having a second transformed-domain location; and a second processor for using a replacement code to replace at least a portion of a third transformed-domain image datum, for converting the third transformed-domain image datum into a fourth transformed-domain image datum, the replacement code comprising at least one of the first authentication code, a code derived from the first authentication code, a code selected based upon at least the first authentication code, and a code selected based upon at least the code derived from the first authentication code, the fourth transformed-domain image datum having a third transformed-domain location, the first transformed-domain image datum being for deriving a fifth transformed-domain image datum having a fourth transformed-domain location, the second transformed-domain image datum being for deriving a sixth transformed-domain image datum having a fifth transformed-domain location, the fourth transformed-domain image datum being for deriving a seventh transformed-domain image datum having a sixth transformed-domain location, the fourth transformed-domain location being approximately equal to the first transformed-domain location, the fifth transformed-domain location being approximately equal to the second transformed-domain location, and the sixth transformed-domain location being approximately equal to the third transformed-domain location, wherein the fifth, sixth, and seventh transformed-domain image data are for being authenticated by an authentication processor comprising:
- a third processor for using an authentication code extraction function to extract a second authentication code from the seventh transformed-domain image datum,
- a fourth processor for comparing the fifth transformed-domain image datum to the sixth transformed-domain image datum, for deriving a first comparison result,
- a fifth processor for selecting, based on the second authentication code, a set of at least one acceptable value of the first comparison result, and
- a sixth processor for determining that at least one of the fifth, sixth, and seventh transformed-domain image data has been improperly altered if the first comparison result is not within the set of at least one acceptable value of the first comparison result.

28. An apparatus according to claim 27, wherein the first transformed-domain image datum is included in a first set of transformed-domain image data, the second transformed-domain image datum is included in a second set of transformed-domain image data, the fifth transformed-domain image datum is included in a third set of transformed-domain image data, and the sixth transformed-domain image datum is included in a fourth set of transformed-domain image data, the apparatus further comprising:
- a seventh processor for using a first secret mapping to form an association between the first and second sets of transformed-domain image data; and
- an eighth processor for using the association between the first and second sets of transformed-domain image data for selecting at least one of the first and second transformed-domain image data to be compared by the first processor, wherein the authentication processor further comprises:
  - a ninth processor for using the first secret mapping to form an association between the third and fourth sets of transformed-domain image data, and
  - a tenth processor for using the association between the third and fourth sets of transformed-domain image data for selecting at least one of the fifth and sixth transformed-domain image data to be compared by the fourth processor.

29. An apparatus according to claim 28, wherein the first and second sets of transformed-domain image data are included in a fifth set of transformed-domain image data, the third transformed-domain image datum is included in a sixth set of transformed-domain image data, the third and fourth sets of transformed-domain image data are included in a seventh set of transformed-domain image data, and the seventh transformed-domain image datum is included in an eighth set of transformed-domain image data, the apparatus further comprising:
- an eleventh processor for using a second secret mapping to form an association between the fifth and sixth sets of transformed-domain image data; and
- a twelfth processor for using the association between the fifth and sixth sets of transformed-domain image data for selecting the third transformed-domain image datum to be converted, by the second processor, into the fourth transformed-domain image datum, wherein the authentication processor further comprises:
  - a thirteenth processor for using the second secret mapping to form an association between the seventh and eighth sets of transformed-domain image data, and
  - a fourteenth processor for using the association between the seventh and eighth sets of transformed-domain image data for selecting the seventh transformed-domain image datum to be a datum from which the second authentication code is extracted by the third processor.

30. An apparatus according to claim 27, wherein the first and second transformed-domain image data are included in a first set of transformed-domain image data, the third transformed-domain image datum is included in a second set of transformed-domain image data, the fifth and sixth transformed-domain image data are included in a third set of transformed-domain image data, and the seventh transformed-domain image datum is included in a fourth set of transformed-domain image data, the apparatus further comprising:
- a seventh processor for using a first secret mapping to form an association between the first and second sets of transformed-domain image data; and
- an eighth processor for using the association between the first and second sets of transformed-domain image data for selecting the third transformed-domain image datum to be converted, by the second processor, into the fourth transformed-domain image datum, wherein the authentication processor further comprises:
  - a ninth processor for using the first secret mapping to form an association between the third and fourth sets of transformed-domain image data, and
  - a tenth processor for using the association between the third and fourth sets of transformed-domain image data for selecting the seventh transformed-domain image datum to be a datum from which the second authentication code is extracted by the third processor.

31. An apparatus according to claim 27, wherein the first transformed-domain image datum is included in a first set of transformed-domain image data, the second transformed-domain image datum is included in a second set of transformed-domain image data, the fifth transformed-domain image datum is included in a third set of transformed-domain image data, and the sixth transformed-domain image datum is included in a fourth set of transformed-domain image data, the apparatus further comprising:
- a seventh processor for using a first secret transformed-domain location selection pattern for selecting the first transformed-domain image datum to be compared by the first processor, the first secret transformed-domain location selection pattern comprising at least a first datum selection location, the first transformed-domain location being approximately equal to the first datum selection location in a coordinate system of the first set of transformed-domain image data; and
- an eighth processor for using the first secret transformed-domain location selection pattern for selecting the second transformed-domain image datum to be compared by the first processor, the second transformed-domain location being approximately equal to the first datum selection location in a coordinate system of the second set of transformed-domain image data, wherein the authentication processor further comprises:
  - a ninth processor for using the first secret transformed-domain location selection pattern for selecting the fifth transformed-domain image datum to be compared by the fourth processor, the fourth transformed-domain location being approximately equal to the first datum selection location in a coordinate system of the third set of transformed-domain image data, and a tenth processor for using the first secret transformed-domain location selection pattern for selecting the sixth transformed-domain image datum to be compared by the fourth processor, the fifth transformed-domain location being approximately equal to the first datum selection location in a coordinate system of the fourth set of transformed-domain image data.

32. An apparatus according to claim 31, wherein the third transformed-domain image datum is included in a fifth set of transformed-domain image data, and the seventh transformed-domain image datum is included in a sixth set of transformed-domain image data, the apparatus further comprising an eleventh processor for using a second secret transformed-domain location selection pattern for selecting the third transformed-domain image datum to be converted, by the second processor, into the fourth transformed-domain image datum, the third transformed-domain image datum having the third transformed-domain location, the second secret transformed-domain location selection pattern comprising at least a second datum selection location, the third transformed-domain location being approximately equal to the second datum selection location in a coordinate system of the fifth set of transformed-domain image data, wherein the authentication processor further comprises a twelfth processor for using the second secret transformed-domain location selection pattern for selecting the seventh transformed-domain image datum to be a datum from which the second authentication code is extracted by the third processor, the sixth transformed-domain location being approximately equal to the second datum selection location in a coordinate system of the sixth set of transformed-domain image data.

33. An apparatus according to claim 27, wherein the third transformed-domain image datum is included in a first set of transformed-domain image data, and the seventh transformed-domain image datum is included in a second set of transformed-domain image data, the apparatus further comprising a seventh processor for using a secret transformed-domain location selection pattern for selecting the third transformed-domain image datum to be converted, by the second processor, into the fourth transformed-domain image datum, the third transformed-domain image datum having the third transformed-domain location, the secret transformed-domain location selection pattern comprising at least a datum selection location, the third transformed-domain location being approximately equal to the datum selection location in a coordinate system of the first set of transformed-domain image data, wherein the authentication processor further comprises an eighth processor for using the secret transformed-domain location selection pattern for selecting the seventh transformed-domain image datum to be a datum from which the second authentication code is extracted by the third processor, the sixth transformed-domain location being approximately equal to the datum selection location in a coordinate system of the second set of transformed-domain image data.

34. An apparatus according to claim 27, wherein the portion of the third transformed-domain image datum comprises a bit of the third transformed-domain image datum, and the first authentication code comprises an authentication bit, the apparatus further comprising a seventh processor for using a binary operation to process the authentication bit and a bit of a secret key, for deriving an encrypted bit, the replacement code comprising at least one of the encrypted bit, a code derived from the encrypted bit, and a code selected based upon the encrypted bit.

35. An apparatus according to claim 27, wherein the portion of the third transformed-domain image datum comprises a bit of the third transformed-domain image datum, and the replacement code comprises at least one of a bit of the first authentication code and a code selected based upon the bit of the first authentication code.

36. An apparatus according to claim 27, wherein the authentication processor further comprises:
a seventh processor for using the authentication code extraction function to extract a first set of authentication codes from at least one portion of a first set of transformed-domain image data, the first set of transformed-domain image data including the sixth transformed-domain image datum;
an eighth processor for comparing at least one portion of a second set of transformed-domain image data to at least one portion of a third set of transformed-domain image data, for deriving a first set of comparison results;
a ninth processor for selecting, based on each of the first set of authentication codes, a set of at least one acceptable value of a member of the first set of comparison results associated with the each of the first set of authentication codes;
a tenth processor for determining that the first set of transformed-domain image data has not been improperly altered if the member of the first set of comparison results associated with the each of the first set of authentication codes is within the set of at least one acceptable value of the member of the first set of comparison results associated with the each of the first set of authentication codes.

37. An apparatus according to claim 36, wherein the authentication processor further comprises:
an eleventh processor for using the authentication code extraction function to extract a second set of authentication codes from at least one portion of a fourth set of transformed-domain image data;
a twelfth processor for comparing at least one portion of a fifth set of transformed-domain image data to at least one portion of a sixth set of transformed-domain image data, for deriving a second set of comparison results, the fifth set of transformed-domain image data including the seventh transformed-domain image datum;
a thirteenth processor for selecting, based on each of the second set of authentication codes, a set of at least one acceptable value of a member of the second set of comparison results associated with the each of the second set of authentication codes;
a fourteenth processor for determining that the fifth set of transformed-domain image data has not been improperly altered if the member of the second set of comparison results associated with the each of the second set of authentication codes is within the set of at least one acceptable value of the member of the second set of comparison results associated with the each of the second set of authentication codes.

38. An apparatus according to claim 37, wherein the authentication processor further comprises a fifteenth processor for determining that a seventh set of transformed-domain image data has been improperly altered if: (a) the member of the first set of comparison results associated with the each of the first set of authentication codes is within the set of at least one acceptable value of the member of the first set of comparison results associated with the each of the first set of authentication codes; and (b) the member of the second set of comparison results associated with the each of the second set of authentication codes is within the set of at least one acceptable value of the member of the second set of comparison results associated with the each of the second set of authentication codes, the seventh set of transformed-domain image data including the fifth transformed-domain image datum.

39. An apparatus according to claim 36, wherein the authentication processor further comprises:
- an eleventh processor for using the authentication code extraction function to extract a second set of authentication codes from at least one portion of a fourth set of transformed-domain image data, the fourth set of transformed-domain image data including the fifth transformed-domain image datum;
- a twelfth processor for comparing at least one portion of a fifth set of transformed-domain image data to at least one portion of a sixth set of transformed-domain image data, for deriving a second set of comparison results;
- a thirteenth processor for selecting, based on each of the second set of authentication codes, a set of at least one acceptable value of a member of the second set of comparison results associated with the each of the second set of authentication codes;
- a fourteenth processor for determining that the fourth set of transformed-domain image data has not been improperly altered if the member of the second set of comparison results associated with the each of the second set of authentication codes is within the set of at least one acceptable value of the member of the second set of comparison results associated with the each of the second set of authentication codes.

40. An apparatus according to claim 39, wherein the authentication processor further comprises a fifteenth processor for determining that a seventh set of transformed-domain image data has been improperly altered if: (a) the member of the first set of comparison results associated with the each of the first set of authentication codes is within the set of at least one acceptable value of the member of the first set of comparison results associated with the each of the first set of authentication codes; and (b) the member of the second set of comparison results associated with the each of the second set of authentication codes is within the set of at least one acceptable value of the member of the second set of comparison results associated with the each of the second set of authentication codes, the seventh set of transformed-domain image data including the seventh transformed-domain image datum.

41. An image-processing apparatus, comprising:
- a first processor for using an encoding function to encode a first set of transformed-domain image data, for deriving a set of image data recovery codes comprising a first image data recovery code, the first set of transformed-domain image data being included in a second set of transformed-domain image data, the second set of transformed-domain image data being derived from a first set of spatial domain image data; and
- a second processor for using a replacement code to replace at least a portion of a first transformed-domain image datum, for converting the first transformed-domain image datum into a second transformed-domain image datum, the first transformed-domain image datum being included in a third set of transformed-domain image data, the third set of transformed-domain image data being derived from the first set of spatial domain image data, the replacement code comprising at least one of the first image data recovery code, a code derived from the first image data recovery code, a code selected based upon at least the first image data recovery code, and a code selected based upon at least the code derived from the first image data recovery code, the second transformed-domain image datum being for deriving a third transformed-domain image datum, the first set of spatial domain image data being for deriving a fourth set of transformed-domain image data, the third transformed-domain image datum being for deriving, by a recovery processor, an approximation data set for replacing the fourth set of transformed-domain image data, and the recovery processor comprising:
  - a third processor for using a recovery code extraction function to extract a second image data recovery code from the third transformed-domain image datum, the second image data recovery code being approximately equal to the first image data recovery code; and
  - a fourth processor for using a decoding function to decode at least the second image data recovery code, for deriving the approximation data set, the decoding function comprising a functional inverse of the encoding function.

42. An apparatus according to claim 41, further comprising:
- a fifth processor for averaging a second set of spatial domain image data, for deriving a first reduced image datum;
- a sixth processor for averaging a third set of spatial domain image data, for deriving a second reduced image datum, the first and second reduced image data being included in a reduced set of spatial domain image data, and the second and third sets of spatial domain image data being included in the first set of spatial domain image data;
- a seventh processor for domain-transforming the reduced set of spatial domain image data, for deriving a fifth set of transformed-domain image data; and
- an eighth processor for quantizing the fifth set of transformed-domain image data, for deriving the first set of transformed-domain image data.

43. An apparatus according to claim 42, wherein the portion of the first transformed-domain image datum comprises a bit of the first transformed-domain image datum, and the first image data recovery code comprises a data recovery bit.

44. An apparatus according to claim 43, further comprising a ninth processor for using a binary operation to process the data recovery bit and a bit of a secret key, for deriving an encrypted bit, the replacement code comprising at least one of the encrypted bit, a code derived from the encrypted bit, and a code selected based upon the encrypted bit.

45. An apparatus according to claim 41, wherein the portion of the first transformed-domain image datum comprises a bit of the first transformed-domain image datum, and the first image data recovery code comprises a data recovery bit.

46. An apparatus according to claim 45, further comprising a fifth processor for using a binary operation to process the data recovery bit and a bit of a secret key, for deriving an encrypted bit, the replacement code comprising at least one of the encrypted bit, a code derived from the encrypted bit, and a code selected based upon the encrypted bit.

47. An apparatus according to claim 41, wherein the encoding function comprises an entropy encoding function.

48. An apparatus according to claim 47, wherein the entropy encoding function comprises at least one of a Huffman encoding function and a JPEG entropy encoding function.

49. An image-processing apparatus, comprising:

a first processor for quantizing a first set of transformed-domain image data based on a first quantization step size, for deriving a second set of transformed-domain image data, the second set of transformed-domain image data including at least a first transformed-domain image datum; and a second processor for using a replacement code to replace at least a portion of the first transformed-domain image datum, for converting the first transformed-domain image datum into a second transformed-domain image datum, the second transformed-domain image datum being included in a third set of transformed-domain image data, the replacement code comprising at least one of a watermark code, a code derived from the watermark code, a code selected based on the watermark code, and a code selected based upon at least the code derived from the watermark code, wherein the third set of transformed-domain image data is for being altered by an alteration processor for deriving a fourth set of transformed-domain image data, the alteration processor comprising at least one of: (1) a quantization processor for quantizing the third set of transformed-domain image data based on a second quantization step size, the second quantization step size being no greater than the first quantization step size, (2) a data encoding format transformation processor for transforming a data encoding format of the third set of transformed-domain image data into a different data encoding format, and (3) an image filtering processor for filtering the third set of transformed-domain image data, the fourth set of transformed-domain image data including at least a third transformed-domain image datum, and the third transformed-domain image datum being derived from the second transformed-domain image datum, wherein the third transformed-domain image datum is for being processed by a watermark extraction processor for extracting the watermark code from the third transformed-domain image datum, the watermark extraction processor comprising:

a third processor for requantizing the third transformed-domain image datum based on the first quantization step size, for generating a fourth transformed-domain image datum, and a fourth processor for processing the fourth transformed-domain image datum by a watermark extraction function, for deriving an extracted code approximately equal to the watermark code.

50. An apparatus according to claim 49, wherein the first set of transformed-domain image data includes a fifth transformed-domain image datum, the first transformed-domain datum being derived from the fifth transformed-domain image datum, and the apparatus further comprising a fifth processor for deriving the watermark code based on at least one datum derived from at least a first portion of a set of spatial domain image data, the fifth transformed-domain image datum being derived from a second portion of the set of spatial domain image data.

51. An apparatus according to claim 50, further comprising:

a sixth processor for using a secret mapping to form an association between at least the first transformed-domain image datum and at least the datum derived from the first portion of the set of spatial domain image data; and a seventh processor for using the association between the at least the first transformed-domain image datum and the at least the datum derived from the first portion of the set of spatial domain image data for selecting the first transformed-domain image datum to be converted, by the second processor, into the second transformed-domain image datum.

52. An apparatus according to claim 49, wherein the first transformed-domain image datum has a secret transformed-domain location.

53. A computer-readable medium having a set of instructions operable to direct a processor to perform the steps of:

comparing a first transformed-domain image datum to a second transformed-domain image datum, for deriving a first authentication code, the first transformed-domain image datum having a first transformed-domain location, and the second transformed-domain image datum having a second transformed-domain location; and using a replacement code to replace at least a portion of a third transformed-domain image datum, for converting the third transformed-domain image datum into a fourth transformed-domain image datum, the replacement code comprising at least one of the first authentication code, a code derived from the first authentication code, a code selected based upon at least the first authentication code, and a code selected based upon at least the code derived from the first authentication code, the fourth transformed-domain image datum having a third transformed-domain location, the first transformed-domain image datum being for deriving a fifth transformed-domain image datum having a fourth transformed-domain location, the second transformed-domain image datum being for deriving a sixth transformed-domain image datum having a fifth transformed-domain location, the fourth transformed-domain image datum being for deriving a seventh transformed-domain image datum having a sixth transformed-domain location, the fourth transformed-domain location being approximately equal to the first transformed-domain location, the fifth transformed-domain location being approximately equal to the second transformed-domain location, and the sixth transformed-domain location being approximately equal to the third transformed-domain location, wherein the fifth, sixth, and seventh transformed-domain image data are for being authenticated by an authentication procedure comprising the steps of:

using an authentication code extraction function to extract a second authentication code from the seventh transformed-domain image datum, comparing the fifth transformed-domain image datum to the sixth transformed-domain image datum, for deriving a first comparison result, based on the second authentication code, selecting a set of at least one acceptable value of the first comparison result, and if the first comparison result is not within the set of at least one acceptable value of the first comparison result, determining that at least one of the fifth, sixth, and seventh transformed-domain image data has been improperly altered.

54. A computer-readable medium according to claim 53, wherein the first transformed-domain image datum is included in a first set of transformed-domain image data, the second transformed-domain image datum is included in a second set of transformed-domain image data, the fifth transformed-domain image datum is included in a third set of transformed-domain image data, the sixth transformed-domain image datum is included in a fourth set of transformed-domain image data, and the set of instructions is further operable to direct the processor to perform the steps of:

using a first secret mapping to form an association between the first and second sets of transformed-domain image data; and using the association between the first and second sets of transformed-domain image data for selecting at least one of the first and second transformed-domain image data to be compared in the step of comparing the first transformed-domain image datum to the second transformed-domain image datum, wherein the authentication procedure further comprises the steps of:

using the first secret mapping to form an association between the third and fourth sets of transformed-domain image data, and using the association between the third and fourth sets of transformed-domain image data for selecting at least one of the fifth and sixth transformed-domain image data to be compared in the step of comparing the fifth transformed-domain image datum to the sixth transformed-domain image datum.

55. A computer-readable medium according to claim 54, wherein the first and second sets of transformed-domain image data are included in a fifth set of transformed-domain image data, the third transformed-domain image datum is included in a sixth set of transformed-domain image data, the third and fourth sets of transformed-domain image data are included in a seventh set of transformed-domain image data, the seventh transformed-domain image datum is included in an eighth set of transformed-domain image data, and the set of instructions is further operable to direct the processor to perform the steps of:

using a second secret mapping to form an association between the fifth and sixth sets of transformed-domain image data; and using the association between the fifth and sixth sets of transformed-domain image data for selecting the third transformed-domain image datum to be converted, in the step of using the replacement code, into the fourth transformed-domain image datum, wherein the authentication procedure further comprises the steps of:

using the second secret mapping to form an association between the seventh and eighth sets of transformed-domain image data, and using the association between the seventh and eighth sets of transformed-domain image data for selecting the seventh transformed-domain image datum to be a datum from which the second authentication code is extracted in the step of using the authentication code extraction function to extract the second authentication code.

56. A computer-readable medium according to claim 53, wherein the first and second transformed-domain image data are included in a first set of transformed-domain image data, the third transformed-domain image datum is included in a second set of transformed-domain image data, the fifth and sixth transformed-domain image data are included in a third set of transformed-domain image data, the seventh transformed-domain image datum is included in a fourth set of transformed-domain image data, and the set of instructions is further operable to direct the processor to perform the steps of:

using a first secret mapping to form an association between the first and second sets of transformed-domain image data; and using the association between the first and second sets of transformed-domain image data for selecting the third transformed-domain image datum to be converted, in the step of using the replacement code, into the fourth transformed-domain image datum, wherein the authentication procedure further comprises the steps of:

using the first secret mapping to form an association between the third and fourth sets of transformed-domain image data, and using the association between the third and fourth sets of transformed-domain image data for selecting the seventh transformed-domain image datum to be a datum from which the second authentication code is extracted in the step of using the authentication code extraction function to extract the second authentication code.

57. A computer-readable medium according to claim 53, wherein the first transformed-domain image datum is included in a first set of transformed-domain image data, the second transformed-domain image datum is included in a second set of transformed-domain image data, the fifth transformed-domain image datum is included in a third set of transformed-domain image data, the sixth transformed-domain image datum is included in a fourth set of transformed-domain image data, and the set of instructions is further operable to direct the processor to perform the steps of:

using a first secret transformed-domain location selection pattern for selecting the first transformed-domain image datum to be compared in the step of comparing the first transformed-domain image datum to the second transformed-domain image datum, the first secret transformed-domain location selection pattern comprising at least a first datum selection location, the first transformed-domain location being approximately equal to the first datum selection location in a coordinate system of the first set of transformed-domain image data; and using the first secret transformed-domain location selection pattern for selecting the second transformed-domain image datum to be compared in the step of comparing the first transformed-domain image datum to the second transformed-domain image datum, the second transformed-domain location being approximately equal to the first datum selection location in a coordinate system of the second set of transformed-domain image data, wherein the authentication procedure further comprises the steps of:

using the first secret transformed-domain location selection pattern for selecting the fifth transformed-domain image datum to be compared in the step of comparing the fifth transformed-domain image datum to the sixth transformed-domain image datum, the fourth transformed-domain location being approximately equal to the first datum selection location in a coordinate system of the third set of transformed-domain image data, and using the first secret transformed-domain location selection pattern for selecting the sixth transformed-domain image datum to be compared in the step of comparing the fifth transformed-domain image datum to the sixth transformed-domain image datum, the fifth transformed-domain location being approximately equal to the first datum selection location in a coordinate system of the fourth set of transformed-domain image data.

58. A computer-readable medium according to claim 57, wherein the third transformed-domain image datum is included in a fifth set of transformed-domain image data, the seventh transformed-domain image datum is included in a sixth set of transformed-domain image data, and the set of instructions is further operable to direct the processor to perform the step of using a second secret transformed-domain location selection pattern for selecting the third transformed-domain image datum to be converted, in the step of using the replacement code, into the fourth transformed-domain image datum, the third transformed-domain image datum having the third transformed-domain location, the second secret transformed-domain location selection pattern comprising at least a second datum selection location, the third transformed-domain location being approximately equal to the second datum selection location in a coordinate system of the fifth set of transformed-domain image data, wherein the authentication procedure further comprises using the second secret transformed-domain location selection pattern for selecting the seventh transformed-domain image datum to be a datum from which the second authentication code is extracted in the step of using the authentication code extraction function to extract the second authentication code, the sixth transformed-domain location being approximately equal to the second datum selection location in a coordinate system of the sixth set of transformed-domain image data.

59. A computer-readable medium according to claim 53, wherein the third transformed-domain image datum is included in a first set of transformed-domain image data, the seventh transformed-domain image datum is included in a second set of transformed-domain image data, and the set of instructions is further operable to direct the processor to perform the step of using a secret transformed-domain location selection pattern for selecting the third transformed-domain image datum to be converted, in the step of using the replacement code, into the fourth transformed-domain image datum, the third transformed-domain image datum having the third transformed-domain location, the secret transformed-domain location selection pattern comprising at least a datum selection location, the third transformed-domain location being approximately equal to the datum selection location in a coordinate system of the first set of transformed-domain image data, wherein the authentication procedure further comprises using the secret transformed-domain location selection pattern for selecting the seventh transformed-domain image datum to be a datum from which the second authentication code is extracted in the step of using the authentication code extraction function to extract the second authentication code, the sixth transformed-domain location being approximately equal to the datum selection location in a coordinate system of the second set of transformed-domain image data.

60. A computer-readable medium according to claim 53, wherein the portion of the third transformed-domain image datum comprises a bit of the third transformed-domain image datum, the first authentication code comprises an authentication bit, and the set of instructions is further operable to direct the processor to perform the step of processing the authentication bit and a bit of a secret key by a binary operation, for deriving an encrypted bit, the replacement code comprising at least one of the encrypted bit, a code derived from the encrypted bit, and a code selected based upon the encrypted bit.

61. A computer-readable medium according to claim 53, wherein the portion of the third transformed-domain image datum comprises a bit of the third transformed-domain image datum, and the replacement code comprises at least one of a bit of the first authentication code and a code selected based upon the bit of the first authentication code.

62. A computer-readable medium according to claim 53, wherein the authentication procedure further comprises:
using the authentication code extraction function to extract a first set of authentication codes from at least one portion of a first set of transformed-domain image data, the first set of transformed-domain image data including the sixth transformed-domain image datum;
comparing at least one portion of a second set of transformed-domain image data to at least one portion of a third set of transformed-domain image data, for deriving a first set of comparison results;
based on each of the first set of authentication codes, selecting a set of at least one acceptable value of a member of the first set of comparison results associated with the each of the first set of authentication codes;
if the member of the first set of comparison results associated with the each of the first set of authentication codes is within the set of at least one acceptable value of the member of the first set of comparison results associated with the each of the first set of authentication codes, determining that the first set of transformed-domain image data has not been improperly altered.

63. A computer-readable medium according to claim 62, wherein the authentication procedure further comprises:
using the authentication code extraction function to extract a second set of authentication codes from at least one portion of a fourth set of transformed-domain image data;
comparing at least one portion of a fifth set of transformed-domain image data to at least one portion of a sixth set of transformed-domain image data, for deriving a second set of comparison results, the fifth set of transformed-domain image data including the seventh transformed-domain image datum;
based on each of the second set of authentication codes, selecting a set of at least one acceptable value of a member of the second set of comparison results associated with the each of the second set of authentication codes;
if the member of the second set of comparison results associated with the each of the second set of authentication codes is within the set of at least one acceptable value of the member of the second set of comparison results associated with the each of the second set of authentication codes, determining that the fifth set of transformed-domain image data has not been improperly altered.

64. A computer-readable medium according to claim 63, wherein the authentication procedure further comprises:
if the member of the first set of comparison results associated with the each of the first set of authentication codes is within the set of at least one acceptable value of the member of the first set of comparison results associated with the each of the first set of authentication codes, and if the member of the second set of comparison results associated with the each of the second set of authentication codes is within the set of at least one acceptable value of the member of the second set of comparison results associated with the each of the second set of authentication codes, determining that a seventh set of transformed-domain image data has been improperly altered, the seventh set of transformed-domain image data including the fifth transformed-domain image datum.

65. A computer-readable medium according to claim 62, wherein the authentication procedure further comprises:
using the authentication code extraction function to extract a second set of authentication codes from at least one portion of a fourth set of transformed-domain image data, the fourth set of transformed-domain image data including the fifth transformed-domain image datum;

comparing at least one portion of a fifth set of transformed-domain image data to at least one portion of a sixth set of transformed-domain image data, for deriving a second set of comparison results;

based on each of the second set of authentication codes, selecting a set of at least one acceptable value of a member of the second set of comparison results associated with the each of the second set of authentication codes;

if the member of the second set of comparison results associated with the each of the second set of authentication codes is within the set of at least one acceptable value of the member of the second set of comparison results associated with the each of the second set of authentication codes, determining that the fourth set of transformed-domain image data has not been improperly altered.

66. A computer-readable medium according to claim 65, wherein the authentication procedure further comprises:

if the member of the first set of comparison results associated with the each of the first set of authentication codes is within the set of at least one acceptable value of the member of the first set of comparison results associated with the each of the first set of authentication codes, and if the member of the second set of comparison results associated with the each of the second set of authentication codes is within the set of at least one acceptable value of the member of the second set of comparison results associated with the each of the second set of authentication codes, determining that a seventh set of transformed-domain image data has been improperly altered, the seventh set of transformed-domain image data including the seventh transformed-domain image datum.

67. A computer-readable medium having a set of instructions operable to direct a processor to perform the steps of:

encoding by an encoding function a first set of transformed-domain image data, for deriving a set of image data recovery codes comprising a first image data recovery code, the first set of transformed-domain image data being included in a second set of transformed-domain image data, the second set of transformed-domain image data being derived from a first set of spatial domain image data; and using a replacement code to replace at least a portion of a first transformed-domain image datum, for converting the first transformed-domain image datum into a second transformed-domain image datum, the first transformed-domain image datum being included in a third set of transformed-domain image data, the third set of transformed-domain image data being derived from the first set of spatial domain image data, the replacement code comprising at least one of the first image data recovery code, a code derived from the first image data recovery code, a code selected based upon at least the first image data recovery code, and a code selected based upon at least the code derived from the first image data recovery code, the second transformed-domain image datum being for deriving a third transformed-domain image datum, the first set of spatial domain image data being for deriving a fourth set of transformed-domain image data, the third transformed-domain image datum being for deriving, by a recovery procedure, an approximation data set for replacing the fourth set of transformed-domain image data, and the recovery procedure comprising the steps of:

using a recovery code extraction function to extract a second image data recovery code from the third transformed-domain image datum, the second image data recovery code being approximately equal to the first image data recovery code; and decoding by a decoding function at least the second image data recovery code, for deriving the approximation data set, the decoding function comprising a functional inverse of the encoding function.

68. A computer-readable medium according to claim 67, wherein the set of instructions is further operable to direct the processor to perform the steps of:

averaging a second set of spatial domain image data, for deriving a first reduced image datum;

averaging a third set of spatial domain image data, for deriving a second reduced image datum, the first and second reduced image data being included in a reduced set of spatial domain image data, and the second and third sets of spatial domain image data being included in the first set of spatial domain image data;

domain-transforming the reduced set of spatial domain image data, for deriving a fifth set of transformed-domain image data; and quantizing the fifth set of transformed-domain image data, for deriving the first set of transformed-domain image data.

69. A computer-readable medium according to claim 68, wherein the portion of the first transformed-domain image datum comprises a bit of the first transformed-domain image datum, and the first image data recovery code comprises a data recovery bit.

70. A computer-readable medium according to claim 69, wherein the set of instructions is further operable to direct the processor to perform the step of processing the data recovery bit and a bit of a secret key by a binary operation, for deriving an encrypted bit, the replacement code comprising at least one of the encrypted bit, a code derived from the encrypted bit, and a code selected based upon the encrypted bit.

71. A computer-readable medium according to claim 67, wherein the portion of the first transformed-domain image datum comprises a bit of the first transformed-domain image datum, and the first image data recovery code comprises a data recovery bit.

72. A computer-readable medium according to claim 71, wherein the set of instructions is further operable to direct the processor to perform the step of processing the data recovery bit and a bit of a secret key by a binary operation, for deriving an encrypted bit, the replacement code comprising at least one of the encrypted bit, a code derived from the encrypted bit, and a code selected based upon the encrypted bit.

73. A computer-readable medium according to claim 67, wherein the encoding function comprises an entropy encoding function.

74. A computer-readable medium according to claim 73, wherein the entropy encoding function comprises at least one of a Huffman encoding function and a JPEG entropy encoding function.

75. A computer-readable medium having a set of instructions operable to direct a processor to perform the steps of:

quantizing a first set of transformed-domain image data based on a first quantization step size, for deriving a second set of transformed-domain image data, the second set of transformed-domain image data including at least a first transformed-domain image datum; and using a replacement code to replace at least a portion of the first transformed-domain image datum, for converting the first transformed-domain image datum into a second transformed-domain image datum, the second transformed-domain image datum being included in a third set of transformed-domain image data, the replacement code comprising at least one of a watermark code, a code derived from the watermark code, a code selected based on the watermark code, and a code selected based upon at least the code derived from the watermark code, wherein the third set of transformed-domain image data is for being altered by an alteration procedure for deriving a fourth set of transformed-domain image data, the alteration procedure comprising at least one of: (1) quantizing the third set of transformed-domain image data based on a second quantization step size, the second quantization step size being no greater than the first quantization step size, (2) transforming a data encoding format of the third set of transformed-domain image data into a different data encoding format, and (3) filtering the third set of transformed-domain image data, the fourth set of transformed-domain image data including at least a third transformed-domain image datum, and the third transformed-domain image datum being derived from the second transformed-domain image datum, wherein the third transformed-domain image datum is for being processed by a watermark extraction procedure for extracting the watermark code from the third transformed-domain image datum, the watermark extraction procedure comprising the steps of:

requantizing the third transformed-domain image datum based on the first quantization step size, for generating a fourth transformed-domain image datum, and processing the fourth transformed-domain image datum by a watermark extraction function, for deriving an extracted code approximately equal to the watermark code.

76. A computer-readable medium according to claim 75, wherein the first set of transformed-domain image data includes a fifth transformed-domain image datum, the first transformed-domain datum is derived from the fifth transformed-domain image datum, and the set of instructions is further operable to direct the processor to perform the the step of deriving the watermark code based on at least one datum derived from at least a first portion of a set of spatial domain image data, the fifth transformed-domain image datum being derived from a second portion of the set of spatial domain image data.

77. A computer-readable medium according to claim 76, wherein the set of instructions is further operable to direct the processor to perform the steps of:

using a secret mapping to form an association between at least the first transformed-domain image datum and at least the datum derived from the first portion of the set of spatial domain image data; and using the association between the at least the first transformed-domain image datum and the at least the datum derived from the first portion of the set of spatial domain image data for selecting the first transformed-domain image datum to be converted, in the step of using the first replacement code, into the second transformed-domain image datum.

78. A computer-readable medium according to claim 75, wherein the first transformed-domain image datum has a secret transformed-domain location.

* * * * *